US011244324B2

(12) United States Patent
Lee et al.

(10) Patent No.: US 11,244,324 B2
(45) Date of Patent: *Feb. 8, 2022

(54) METHOD AND SYSTEM TO FACILITATE AN ONLINE PROMOTION RELATING TO A NETWORK-BASED MARKETPLACE

(71) Applicant: eBay Inc., San Jose, CA (US)

(72) Inventors: Stacy A. Lee, San Jose, CA (US); Justin Christopher Early, Portland, OR (US); Kevin McSpadden, San Jose, CA (US); Greg Pedone, San Jose, CA (US)

(73) Assignee: eBay Inc., San Jose, CA (US)

( * ) Notice: Subject to any disclaimer, the term of this patent is extended or adjusted under 35 U.S.C. 154(b) by 281 days.

This patent is subject to a terminal disclaimer.

(21) Appl. No.: 15/848,300

(22) Filed: Dec. 20, 2017

(65) Prior Publication Data

US 2018/0114230 A1    Apr. 26, 2018

Related U.S. Application Data

(63) Continuation of application No. 10/412,017, filed on Apr. 11, 2003, now Pat. No. 9,881,308.

(51) Int. Cl.
*G06Q 30/02* (2012.01)
*G06Q 40/08* (2012.01)

(52) U.S. Cl.
CPC ............. *G06Q 30/02* (2013.01); *G06Q 40/08* (2013.01)

(58) Field of Classification Search
CPC .................................. G06Q 30/02; G06Q 40/08
See application file for complete search history.

(56) References Cited

U.S. PATENT DOCUMENTS

| 3,573,747 A | 4/1971 | Adams et al. |
| 3,581,072 A | 5/1971 | Nymeyer |
| 3,652,795 A | 3/1972 | Wolf et al. |
| 3,687,256 A | 8/1972 | Jones |
| 4,251,867 A | 2/1981 | Uchida et al. |
| 4,412,287 A | 10/1983 | Braddock, III |
| 4,674,044 A | 6/1987 | Kalmus et al. |
| 4,677,552 A | 6/1987 | Sibley, Jr. |

(Continued)

FOREIGN PATENT DOCUMENTS

| DE | 4308597 A1 | 8/1993 |
| EP | 00/44226 A1 | 1/1982 |

(Continued)

OTHER PUBLICATIONS

U.S. Appl. No. 09/734,044, filed Dec. 12, 2000, System and Method for Incentivizing Online Sales.

(Continued)

*Primary Examiner* — Arthur Duran
(74) *Attorney, Agent, or Firm* — Schwegman Lundberg & Woessner

(57) ABSTRACT

A method and system to facilitate an online promotion in a network-based marketplace. A user-provided election to participate in the online promotion is recorded on a client machine associated with a user. Responsive to a trigger event, a determination of the user-provided election as recorded on the client machine associated with the user is made. The determination causes a presentation of the online promotion if so elected.

20 Claims, 33 Drawing Sheets

(56) References Cited

U.S. PATENT DOCUMENTS

| | | |
|---|---|---|
| 4,766,293 A | 8/1988 | Boston |
| 4,789,928 A | 12/1988 | Fujisaki |
| 4,799,156 A | 1/1989 | Shavit et al. |
| 4,812,628 A | 3/1989 | Boston et al. |
| 4,823,264 A | 4/1989 | Deming |
| 4,823,265 A | 4/1989 | Nelson |
| 4,833,607 A | 5/1989 | Dethloff et al. |
| 4,837,422 A | 6/1989 | Dethloff et al. |
| 4,864,516 A | 9/1989 | Gaither et al. |
| 4,877,947 A | 10/1989 | Mori |
| 4,903,201 A | 2/1990 | Wagner |
| 4,949,256 A | 8/1990 | Humble |
| 4,968,873 A | 11/1990 | Dethloff et al. |
| 4,982,346 A | 1/1991 | Girouard et al. |
| 4,992,940 A | 2/1991 | Dworkin |
| 5,056,019 A | 10/1991 | Schultz |
| 5,063,507 A | 11/1991 | Lindsey et al. |
| 5,076,433 A | 12/1991 | Howes |
| 5,077,665 A | 12/1991 | Silverman et al. |
| 5,101,353 A | 3/1992 | Lupien et al. |
| 5,128,752 A | 7/1992 | Von Kohorn |
| 5,136,501 A | 8/1992 | Silverman et al. |
| 5,168,446 A | 12/1992 | Wiseman |
| 5,202,826 A | 4/1993 | Mccarthy |
| 5,205,200 A | 4/1993 | Wright |
| 5,243,515 A | 9/1993 | Lee |
| 5,258,908 A | 11/1993 | Hartheimer et al. |
| 5,262,942 A | 11/1993 | Earle |
| 5,280,305 A | 1/1994 | Monroe et al. |
| 5,280,422 A | 1/1994 | Moe et al. |
| 5,283,731 A | 2/1994 | Lalonde et al. |
| 5,285,383 A | 2/1994 | Lindsey et al. |
| 5,287,268 A | 2/1994 | Mccarthy |
| 5,297,026 A | 3/1994 | Hoffman |
| 5,297,031 A | 3/1994 | Gutterman et al. |
| 5,297,032 A | 3/1994 | Trojan et al. |
| 5,305,200 A | 4/1994 | Hartheimer et al. |
| 5,325,297 A | 6/1994 | Bird et al. |
| 5,329,589 A | 7/1994 | Fraser et al. |
| 5,335,170 A | 8/1994 | Petteruti et al. |
| 5,345,091 A | 9/1994 | Craig et al. |
| 5,369,705 A | 11/1994 | Bird et al. |
| 5,375,055 A | 12/1994 | Togher et al. |
| 5,380,991 A | 1/1995 | Valencia et al. |
| 5,383,113 A | 1/1995 | Kight et al. |
| 5,394,324 A | 2/1995 | Clearwater |
| 5,401,946 A | 3/1995 | Weinblatt |
| 5,402,336 A | 3/1995 | Spiegelhoff et al. |
| 5,418,949 A | 5/1995 | Suzuki |
| 5,424,944 A | 6/1995 | Kelly et al. |
| 5,426,281 A | 6/1995 | Abecassis |
| 5,440,634 A | 8/1995 | Jones et al. |
| 5,442,782 A | 8/1995 | Malatesta et al. |
| 5,453,601 A | 9/1995 | Rosen |
| 5,453,926 A | 9/1995 | Stroschin et al. |
| 5,455,407 A | 10/1995 | Rosen |
| 5,485,510 A | 1/1996 | Colbert |
| 5,497,319 A | 3/1996 | Chong et al. |
| 5,521,815 A | 5/1996 | Rose, Jr. |
| 5,526,479 A | 6/1996 | Barstow et al. |
| 5,535,276 A | 7/1996 | Ganesan |
| 5,537,314 A | 7/1996 | Kanter |
| 5,553,145 A | 9/1996 | Micali |
| 5,557,518 A | 9/1996 | Rosen |
| 5,557,728 A | 9/1996 | Garrett et al. |
| 5,567,740 A | 10/1996 | Free |
| 5,592,375 A | 1/1997 | Salmon et al. |
| 5,596,994 A | 1/1997 | Bro |
| 5,598,557 A | 1/1997 | Doner et al. |
| 5,638,457 A | 6/1997 | Deaton et al. |
| 5,640,569 A | 6/1997 | Miller et al. |
| 5,644,721 A | 7/1997 | Chung et al. |
| 5,652,896 A | 7/1997 | Yamauchi et al. |
| 5,657,389 A | 8/1997 | Houvener |
| 5,659,165 A | 8/1997 | Jennings et al. |
| 5,664,111 A | 9/1997 | Nahan et al. |
| 5,664,115 A | 9/1997 | Fraser |
| 5,671,364 A | 9/1997 | Turk |
| 5,675,784 A | 10/1997 | Maxwell et al. |
| 5,687,323 A | 11/1997 | Hodroff |
| 5,689,652 A | 11/1997 | Lupien |
| 5,694,546 A | 12/1997 | Reisman |
| 5,706,457 A | 1/1998 | Dwyer et al. |
| 5,708,780 A | 1/1998 | Levergood et al. |
| 5,710,886 A | 1/1998 | Christensen et al. |
| 5,710,889 A | 1/1998 | Clark et al. |
| 5,715,314 A | 2/1998 | Payne et al. |
| 5,715,399 A | 2/1998 | Bezos |
| 5,715,402 A | 2/1998 | Popolo |
| 5,717,989 A | 2/1998 | Tozzoli et al. |
| 5,722,418 A | 3/1998 | Bro |
| 5,724,524 A | 3/1998 | Hunt et al. |
| 5,727,165 A | 3/1998 | Ordish et al. |
| 5,729,594 A | 3/1998 | Klingman |
| 5,734,838 A | 3/1998 | Robinson et al. |
| 5,740,252 A | 4/1998 | Minor et al. |
| 5,757,917 A | 5/1998 | Rose et al. |
| 5,758,126 A | 5/1998 | Daniels et al. |
| 5,761,648 A | 6/1998 | Golden et al. |
| 5,771,291 A | 6/1998 | Newton et al. |
| 5,771,380 A | 6/1998 | Tanaka et al. |
| 5,774,553 A | 6/1998 | Rosen |
| 5,774,870 A | 6/1998 | Storey |
| 5,778,178 A | 7/1998 | Arunachalam |
| 5,778,213 A | 7/1998 | Shakib et al. |
| 5,787,402 A | 7/1998 | Potter et al. |
| 5,790,790 A | 8/1998 | Smith et al. |
| 5,794,207 A | 8/1998 | Walker et al. |
| 5,794,210 A * | 8/1998 | Goldhaber ......... G06Q 30/0207 705/14.69 |
| 5,794,219 A | 8/1998 | Brown |
| 5,799,285 A | 8/1998 | Klingman |
| 5,803,500 A | 9/1998 | Mossberg |
| 5,806,044 A | 9/1998 | Powell |
| 5,818,914 A | 10/1998 | Fujisaki |
| 5,822,737 A | 10/1998 | Ogram |
| 5,826,241 A | 10/1998 | Stein et al. |
| 5,826,244 A | 10/1998 | Huberman |
| 5,835,896 A | 11/1998 | Fisher et al. |
| 5,845,265 A | 12/1998 | Woolston |
| 5,845,266 A | 12/1998 | Lupien et al. |
| 5,846,265 A | 12/1998 | Mcgregor et al. |
| 5,848,396 A * | 12/1998 | Gerace .................. G06Q 30/02 705/7.33 |
| 5,850,442 A | 12/1998 | Muftic |
| 5,855,007 A | 12/1998 | Jovicic et al. |
| 5,855,008 A | 12/1998 | Goldhaber et al. |
| 5,857,188 A | 1/1999 | Douglas |
| 5,857,201 A | 1/1999 | Wright, Jr. et al. |
| 5,857,203 A | 1/1999 | Kauffman et al. |
| 5,872,848 A | 2/1999 | Romney et al. |
| 5,873,069 A | 2/1999 | Reuhl et al. |
| 5,874,412 A | 2/1999 | Priebe et al. |
| 5,883,620 A | 3/1999 | Hobbs et al. |
| 5,884,056 A | 3/1999 | Steele |
| 5,884,247 A | 3/1999 | Christy |
| 5,884,277 A | 3/1999 | Khosla |
| 5,890,138 A | 3/1999 | Godin et al. |
| 5,897,621 A | 4/1999 | Boesch et al. |
| 5,897,622 A | 4/1999 | Blinn et al. |
| 5,903,874 A | 5/1999 | Leonard et al. |
| 5,905,974 A | 5/1999 | Fraser et al. |
| 5,905,975 A | 5/1999 | Ausubel |
| 5,909,544 A | 6/1999 | Anderson, II et al. |
| 5,913,040 A | 6/1999 | Rakavy et al. |
| 5,913,203 A | 6/1999 | Wong et al. |
| 5,922,074 A | 7/1999 | Richard et al. |
| 5,924,072 A | 7/1999 | Havens |
| 5,926,794 A | 7/1999 | Fethe |
| 5,933,811 A | 8/1999 | Angles et al. |
| 5,944,790 A | 8/1999 | Levy |
| 5,945,652 A | 8/1999 | Ohki et al. |
| 5,945,653 A | 8/1999 | Walker et al. |
| 5,953,423 A | 9/1999 | Rosen |

(56) References Cited

U.S. PATENT DOCUMENTS

| | | | |
|---|---|---|---|
| 5,956,694 A | 9/1999 | Powell | |
| 5,960,409 A | 9/1999 | Wexler | |
| 5,963,647 A | 10/1999 | Downing et al. | |
| 5,963,917 A | 10/1999 | Ogram | |
| 5,963,923 A | 10/1999 | Garber | |
| 5,966,685 A | 10/1999 | Flanagan et al. | |
| 5,969,974 A | 10/1999 | Vandenbelt et al. | |
| 5,970,469 A | 10/1999 | Scroggie et al. | |
| 5,971,274 A | 10/1999 | Milchman | |
| 5,974,412 A | 10/1999 | Hazlehurst et al. | |
| 5,983,196 A | 11/1999 | Wendkos | |
| 5,987,500 A | 11/1999 | Arunachalam | |
| 5,991,739 A | 11/1999 | Cupps et al. | |
| 5,999,913 A | 12/1999 | Goodwin, III | |
| 6,009,412 A | 12/1999 | Storey | |
| 6,014,634 A | 1/2000 | Scroggie et al. | |
| 6,014,635 A | 1/2000 | Harris et al. | |
| 6,016,955 A | 1/2000 | De Rooij et al. | |
| 6,018,721 A | 1/2000 | Aziz et al. | |
| 6,018,742 A | 1/2000 | Herbert, III | |
| 6,029,015 A | 2/2000 | Ishiguro | |
| 6,029,141 A | 2/2000 | Bezos et al. | |
| 6,029,150 A | 2/2000 | Kravitz | |
| 6,032,130 A | 2/2000 | Alloul et al. | |
| 6,035,280 A | 3/2000 | Christensen | |
| 6,035,288 A | 3/2000 | Solomon | |
| 6,035,402 A | 3/2000 | Vaeth et al. | |
| 6,039,244 A | 3/2000 | Finsterwald | |
| 6,044,363 A | 3/2000 | Mori et al. | |
| 6,047,264 A | 4/2000 | Fisher et al. | |
| 6,047,274 A | 4/2000 | Johnson et al. | |
| 6,049,785 A | 4/2000 | Gifford | |
| 6,052,670 A | 4/2000 | Johnson | |
| 6,055,518 A | 4/2000 | Franklin et al. | |
| 6,058,379 A | 5/2000 | Odom et al. | |
| 6,058,417 A | 5/2000 | Hess et al. | |
| 6,061,448 A | 5/2000 | Smith et al. | |
| 6,073,117 A | 6/2000 | Oyanagi et al. | |
| 6,085,176 A | 7/2000 | Woolston | |
| 6,095,410 A | 8/2000 | Andersen et al. | |
| 6,101,485 A | 8/2000 | Fortenberry et al. | |
| 6,104,815 A | 8/2000 | Alcorn et al. | |
| 6,105,001 A | 8/2000 | Masi et al. | |
| 6,105,008 A | 8/2000 | Davis et al. | |
| 6,119,137 A | 9/2000 | Smith et al. | |
| 6,119,229 A | 9/2000 | Martinez et al. | |
| 6,122,355 A | 9/2000 | Strohl | |
| 6,134,533 A | 10/2000 | Shell | |
| 6,138,106 A | 10/2000 | Walker et al. | |
| 6,138,107 A | 10/2000 | Elgamal | |
| 6,144,984 A | 11/2000 | DeBenedictis et al. | |
| 6,151,589 A | 11/2000 | Aggarwal et al. | |
| 6,161,082 A | 12/2000 | Goldberg et al. | |
| 6,173,267 B1 | 1/2001 | Cairns | |
| 6,178,408 B1 | 1/2001 | Copple et al. | |
| 6,192,407 B1 | 2/2001 | Smith et al. | |
| 6,199,079 B1 | 3/2001 | Gupta et al. | |
| 6,202,051 B1 | 3/2001 | Woolston | |
| 6,205,418 B1 | 3/2001 | Li et al. | |
| 6,205,433 B1 | 3/2001 | Boesch et al. | |
| 6,212,556 B1 | 4/2001 | Arunachalam | |
| 6,237,145 B1 | 5/2001 | Narasimhan et al. | |
| 6,243,691 B1 | 6/2001 | Fisher et al. | |
| 6,246,996 B1 | 6/2001 | Stein et al. | |
| 6,266,651 B1 | 7/2001 | Woolston | |
| 6,266,652 B1 | 7/2001 | Godin et al. | |
| 6,269,345 B1 | 7/2001 | Riboud | |
| 6,275,789 B1 | 8/2001 | Moser et al. | |
| 6,278,980 B1 | 8/2001 | Wendkos | |
| 6,282,507 B1 | 8/2001 | Horiguchi et al. | |
| 6,292,769 B1 | 9/2001 | Flanagan et al. | |
| 6,301,554 B1 | 10/2001 | Christy | |
| 6,317,727 B1 | 11/2001 | May | |
| 6,321,208 B1 | 11/2001 | Barnett et al. | |
| 6,321,210 B1 | 11/2001 | O'Brien et al. | |
| 6,326,985 B1 | 12/2001 | Tazoe et al. | |
| 6,330,543 B1 | 12/2001 | Kepecs | |
| 6,332,126 B1 | 12/2001 | Peirce et al. | |
| 6,336,009 B1 | 1/2002 | Suzumi et al. | |
| 6,336,098 B1 | 1/2002 | Fortenberry et al. | |
| 6,336,099 B1 | 1/2002 | Barnett et al. | |
| 6,336,105 B1 | 1/2002 | Conklin et al. | |
| 6,363,337 B1 | 3/2002 | Amith | |
| 6,379,251 B1* | 4/2002 | Auxier | G06Q 30/02 273/269 |
| 6,386,446 B1 | 5/2002 | Himmel et al. | |
| 6,389,427 B1 | 5/2002 | Faulkner | |
| 6,401,077 B1 | 6/2002 | Godden et al. | |
| 6,405,174 B1 | 6/2002 | Walker et al. | |
| 6,415,270 B1 | 7/2002 | Rackson et al. | |
| 6,421,653 B1 | 7/2002 | May | |
| 6,446,048 B1 | 9/2002 | Wells et al. | |
| 6,450,407 B1 | 9/2002 | Freeman et al. | |
| 6,460,015 B1 | 10/2002 | Hetherington et al. | |
| 6,460,020 B1 | 10/2002 | Pool et al. | |
| 6,463,404 B1 | 10/2002 | Appleby | |
| 6,473,729 B1 | 10/2002 | Gastaldo et al. | |
| 6,490,602 B1 | 12/2002 | Kraemer | |
| 6,505,168 B1 | 1/2003 | Rothman et al. | |
| 6,507,813 B2 | 1/2003 | Veditz et al. | |
| 6,523,012 B1 | 2/2003 | Glassman et al. | |
| 6,556,975 B1 | 4/2003 | Wittsche | |
| 6,571,216 B1 | 5/2003 | Garg et al. | |
| 6,571,241 B1 | 5/2003 | Nosohara | |
| 6,574,239 B1 | 6/2003 | Dowling et al. | |
| 6,578,011 B1 | 6/2003 | Forward | |
| 6,578,012 B1 | 6/2003 | Storey | |
| 6,594,640 B1 | 7/2003 | Postrel | |
| 6,598,026 B1 | 7/2003 | Ojha et al. | |
| 6,598,028 B1 | 7/2003 | Sullivan et al. | |
| 6,604,131 B1 | 8/2003 | Warris et al. | |
| 6,628,307 B1 | 9/2003 | Fair | |
| 6,643,624 B2 | 11/2003 | Philippe et al. | |
| 6,647,373 B1 | 11/2003 | Carlton-Foss | |
| 6,721,715 B2 | 4/2004 | Nemzow | |
| 6,732,161 B1 | 5/2004 | Hess et al. | |
| 6,748,367 B1 | 6/2004 | Lee | |
| 6,771,291 B1 | 8/2004 | DiStefano | |
| 6,799,165 B1 | 9/2004 | Boesjes | |
| 6,839,683 B1 | 1/2005 | Walker et al. | |
| 6,842,739 B2 | 1/2005 | Postrel | |
| 6,857,022 B1 | 2/2005 | Scanlan | |
| 6,865,547 B1 | 3/2005 | Brake, Jr. et al. | |
| 6,882,999 B2* | 4/2005 | Cohen | G06F 16/9566 707/694 |
| 6,895,386 B1 | 5/2005 | Bachman et al. | |
| 6,915,271 B1* | 7/2005 | Meyer | G06Q 30/02 705/14.35 |
| 6,980,962 B1* | 12/2005 | Arganbright | G06Q 30/02 705/14.23 |
| 7,076,453 B2 | 7/2006 | Jammes et al. | |
| 7,162,436 B1 | 1/2007 | Eckel, Jr. | |
| 7,206,768 B1 | 4/2007 | deGroeve et al. | |
| 7,240,022 B1* | 7/2007 | Bistriceanu | G06Q 30/0225 705/14.19 |
| 7,318,049 B2 | 1/2008 | Iannacci | |
| 7,359,871 B1* | 4/2008 | Paasche | G06Q 30/02 705/26.8 |
| 7,398,229 B2 | 7/2008 | Budish | |
| 7,458,507 B2 | 12/2008 | Fillinger et al. | |
| 7,540,408 B2 | 6/2009 | Levine et al. | |
| 7,599,857 B2 | 10/2009 | Bishop et al. | |
| 7,624,038 B1* | 11/2009 | Wood | G06Q 30/0225 705/14.39 |
| 7,644,037 B1 | 1/2010 | Ostrovsky | |
| 7,742,985 B1 | 6/2010 | Digrigoli et al. | |
| 7,801,816 B2 | 9/2010 | Alarcon-Luther et al. | |
| 7,856,384 B1 | 12/2010 | Kulasooriya et al. | |
| 8,055,582 B2 | 11/2011 | Digrigoli et al. | |
| 8,249,990 B2 | 8/2012 | Digrigoli et al. | |
| 8,712,913 B2 | 4/2014 | Digrigoli et al. | |
| 9,881,308 B2 | 1/2018 | Lee et al. | |

(56) References Cited

U.S. PATENT DOCUMENTS

| | | | |
|---|---|---|---|
| 2001/0003100 A1* | 6/2001 | Yacenda | G07F 17/3251 463/41 |
| 2001/0007099 A1 | 7/2001 | Rau et al. | |
| 2001/0009005 A1 | 7/2001 | Godin et al. | |
| 2001/0011241 A1 | 8/2001 | Nemzow | |
| 2001/0023407 A1 | 9/2001 | Liyanearachchi et al. | |
| 2001/0025265 A1 | 9/2001 | Takayasu | |
| 2001/0027436 A1 | 10/2001 | Tenembaum | |
| 2001/0029455 A1 | 10/2001 | Chin et al. | |
| 2001/0032164 A1 | 10/2001 | Kim | |
| 2001/0032878 A1 | 10/2001 | Tsiounis et al. | |
| 2001/0034694 A1 | 10/2001 | Elias | |
| 2001/0039531 A1 | 11/2001 | Aoki | |
| 2001/0047308 A1 | 11/2001 | Kaminsky et al. | |
| 2001/0049620 A1* | 12/2001 | Blasko | G06Q 10/10 705/14.53 |
| 2001/0049628 A1 | 12/2001 | Icho | |
| 2001/0049634 A1 | 12/2001 | Stewart | |
| 2001/0049647 A1 | 12/2001 | Sheehan et al. | |
| 2002/0002538 A1 | 1/2002 | Ling | |
| 2002/0010621 A1* | 1/2002 | Bell | H04L 67/20 705/14.11 |
| 2002/0010627 A1 | 1/2002 | Lerat | |
| 2002/0013767 A1 | 1/2002 | Katz | |
| 2002/0013774 A1 | 1/2002 | Morimoto | |
| 2002/0026423 A1 | 2/2002 | Maritzen et al. | |
| 2002/0029339 A1 | 3/2002 | Rowe | |
| 2002/0038282 A1 | 3/2002 | Montgomery | |
| 2002/0040344 A1 | 4/2002 | Preiser et al. | |
| 2002/0042835 A1 | 4/2002 | Pepin et al. | |
| 2002/0046137 A1 | 4/2002 | Odom et al. | |
| 2002/0046157 A1 | 4/2002 | Solomon | |
| 2002/0049664 A1 | 4/2002 | Hoffman et al. | |
| 2002/0055912 A1* | 5/2002 | Buck | G06Q 20/3821 705/76 |
| 2002/0069134 A1 | 6/2002 | Solomon et al. | |
| 2002/0069184 A1 | 6/2002 | Tilly et al. | |
| 2002/0072968 A1 | 6/2002 | Gorelick et al. | |
| 2002/0073015 A1 | 6/2002 | Chan et al. | |
| 2002/0073111 A1 | 6/2002 | Heyliger | |
| 2002/0082953 A1 | 6/2002 | Batham et al. | |
| 2002/0082977 A1 | 6/2002 | Hammond et al. | |
| 2002/0091580 A1 | 7/2002 | Wang | |
| 2002/0091762 A1* | 7/2002 | Sohn | G06F 3/0481 709/203 |
| 2002/0099562 A1 | 7/2002 | Michael, Sr. | |
| 2002/0099656 A1 | 7/2002 | Poh Wong | |
| 2002/0103831 A1* | 8/2002 | Iyer | G06F 16/951 715/234 |
| 2002/0111889 A1 | 8/2002 | Buxton et al. | |
| 2002/0111907 A1 | 8/2002 | Ling et al. | |
| 2002/0120548 A1 | 8/2002 | Etkin | |
| 2002/0120554 A1 | 8/2002 | Vega | |
| 2002/0123959 A1 | 9/2002 | Mozley et al. | |
| 2002/0138649 A1 | 9/2002 | Cartmell et al. | |
| 2002/0143612 A1 | 10/2002 | Barik et al. | |
| 2002/0143614 A1 | 10/2002 | Maclean et al. | |
| 2002/0147655 A1 | 10/2002 | Say | |
| 2002/0174031 A1 | 11/2002 | Weiss | |
| 2002/0174050 A1 | 11/2002 | Eynard et al. | |
| 2002/0193162 A1* | 12/2002 | Walker | G07F 17/32 463/42 |
| 2003/0004809 A1 | 1/2003 | Palcic et al. | |
| 2003/0014350 A1 | 1/2003 | Duell et al. | |
| 2003/0018885 A1 | 1/2003 | Landsman et al. | |
| 2003/0022719 A1 | 1/2003 | Donald et al. | |
| 2003/0050861 A1 | 3/2003 | Martin et al. | |
| 2003/0083943 A1 | 5/2003 | Adams et al. | |
| 2003/0083952 A1 | 5/2003 | Simpson et al. | |
| 2003/0105677 A1* | 6/2003 | Skinner | G06Q 30/0256 705/26.1 |
| 2003/0105705 A1 | 6/2003 | Eyre | |
| 2003/0110047 A1 | 6/2003 | Santosuosso | |
| 2003/0139975 A1 | 7/2003 | Perkowski | |
| 2003/0163575 A1* | 8/2003 | Perkins | G06F 9/5055 709/229 |
| 2003/0167213 A1 | 9/2003 | Jammes et al. | |
| 2003/0171991 A1* | 9/2003 | Robbins | G06Q 30/0242 705/14.41 |
| 2003/0233278 A1* | 12/2003 | Marshall | G06Q 30/0212 705/14.35 |
| 2004/0039639 A1 | 2/2004 | Walker et al. | |
| 2004/0039692 A1 | 2/2004 | Shields et al. | |
| 2004/0049423 A1 | 3/2004 | Kawashima et al. | |
| 2004/0103024 A1* | 5/2004 | Patel | G06Q 30/0241 705/14.53 |
| 2004/0107137 A1* | 6/2004 | Skinner | G06Q 30/08 705/14.46 |
| 2004/0122943 A1* | 6/2004 | Error | H04L 67/02 709/224 |
| 2004/0193605 A1* | 9/2004 | Weisman | G06F 21/33 |
| 2004/0199421 A1 | 10/2004 | Oda et al. | |
| 2004/0204967 A1 | 10/2004 | Lee et al. | |
| 2004/0204990 A1 | 10/2004 | Lee et al. | |
| 2004/0204991 A1 | 10/2004 | Monahan et al. | |
| 2004/0215467 A1 | 10/2004 | Coffman et al. | |
| 2004/0254942 A1* | 12/2004 | Error | G06F 16/958 |
| 2005/0021455 A1 | 1/2005 | Webster | |
| 2005/0043994 A1* | 2/2005 | Walker | G06Q 10/087 705/14.19 |
| 2005/0102151 A1 | 5/2005 | Fuwa et al. | |
| 2005/0240392 A1 | 10/2005 | Munro, Jr. et al. | |
| 2006/0015452 A1 | 1/2006 | Kulasooriya et al. | |
| 2006/0089897 A1 | 4/2006 | Maas et al. | |
| 2006/0136301 A1 | 6/2006 | Grovit | |
| 2006/0294005 A1 | 12/2006 | Drepak | |
| 2007/0112643 A1 | 5/2007 | Veres et al. | |
| 2007/0156523 A1 | 7/2007 | Liu et al. | |
| 2007/0198391 A1 | 8/2007 | Dreyer et al. | |
| 2007/0295903 A1 | 12/2007 | Schwartz | |
| 2008/0147479 A1 | 6/2008 | Johnson | |
| 2010/0312695 A1 | 12/2010 | Digrigoli et al. | |
| 2011/0307384 A1 | 12/2011 | Digrigoli et al. | |
| 2012/0303529 A1 | 11/2012 | Digrigoli et al. | |
| 2013/0018738 A1 | 1/2013 | Faires et al. | |
| 2013/0117093 A1 | 5/2013 | Oda et al. | |
| 2014/0236815 A1 | 8/2014 | Digrigoli et al. | |

FOREIGN PATENT DOCUMENTS

| | | |
|---|---|---|
| EP | 0251619 A2 | 1/1988 |
| EP | 0254812 A2 | 2/1988 |
| EP | 0273099 A1 | 7/1988 |
| EP | 0520695 A2 | 12/1992 |
| EP | 0542298 A2 | 5/1993 |
| EP | 0590861 A2 | 4/1994 |
| GB | 1341693 A | 12/1973 |
| GB | 1380420 A | 1/1975 |
| GB | 2261579 A | 5/1993 |
| GB | 2296413 A | 6/1996 |
| GB | 2301919 A | 12/1996 |
| JP | 2000-322490 A | 11/2000 |
| JP | 2001-000469 A | 1/2001 |
| JP | 2001-319098 A | 11/2001 |
| JP | 2001-338179 A | 12/2001 |
| JP | 2001-357248 A | 12/2001 |
| JP | 2002-92390 A | 3/2002 |
| JP | 2002-109286 A | 4/2002 |
| JP | 2002-207898 A | 7/2002 |
| JP | 2004-94643 A | 3/2004 |
| NL | 9300266 A | 9/1994 |
| WO | 88/09350 A1 | 12/1988 |
| WO | 91/16691 A1 | 10/1991 |
| WO | 92/15174 A1 | 9/1992 |
| WO | 95/12169 A1 | 5/1995 |
| WO | 95/17711 A1 | 6/1995 |
| WO | 96/33568 A1 | 10/1996 |
| WO | 96/34356 A1 | 10/1996 |
| WO | 96/36024 A1 | 11/1996 |
| WO | 96/41315 A1 | 12/1996 |
| WO | 97/04411 A1 | 2/1997 |
| WO | 97/37315 A1 | 10/1997 |

(56) References Cited

FOREIGN PATENT DOCUMENTS

| | | |
|---|---|---|
| WO | 97/43727 A1 | 11/1997 |
| WO | 97/48078 A1 | 12/1997 |
| WO | 98/09447 A2 | 3/1998 |
| WO | 98/09447 A3 | 5/1998 |
| WO | 99/60503 A1 | 11/1999 |
| WO | 99/63461 A1 | 12/1999 |
| WO | 00/42550 A1 | 7/2000 |
| WO | 00/58862 A2 | 10/2000 |
| WO | 00/62231 A1 | 10/2000 |
| WO | 00/73935 A1 | 12/2000 |
| WO | 00/79461 A1 | 12/2000 |
| WO | 01/16815 A2 | 3/2001 |
| WO | 01/29750 A1 | 4/2001 |
| WO | 01/37171 A1 | 5/2001 |
| WO | 01/39059 A1 | 5/2001 |
| WO | 01/52135 A1 | 7/2001 |
| WO | 01/53929 A1 | 7/2001 |
| WO | 01/71579 A1 | 9/2001 |
| WO | 01/71580 A1 | 9/2001 |
| WO | 01/73665 A1 | 10/2001 |
| WO | 01/80111 A1 | 10/2001 |
| WO | 01/82115 A1 | 11/2001 |
| WO | 02/05179 A1 | 1/2002 |
| WO | 02/31737 A1 | 4/2002 |
| WO | 02/48828 A2 | 6/2002 |
| WO | 02/069101 A2 | 9/2002 |
| WO | 02/097582 A2 | 12/2002 |
| WO | 2002/048828 A3 | 4/2003 |
| WO | 03/038560 A2 | 5/2003 |
| WO | 2004/090666 A2 | 10/2004 |
| WO | 2004/092894 A2 | 10/2004 |
| WO | 2004/093329 A2 | 10/2004 |
| WO | 2004/090666 A3 | 5/2005 |
| WO | 2004/092894 A3 | 3/2006 |
| WO | 2004/093329 A3 | 5/2006 |

OTHER PUBLICATIONS

U.S. Appl. No. 10/412,017 U.S. Pat. No. 9,881,308, filed Apr. 11, 2003, Method and System to Facilitate an Online Promotion Relating to a Network-Based Marketplace.

U.S. Appl. No. 10/412,194, filed Apr. 11, 2003, Method and System to Incentivize a Seller to Perform an Activity Relating to a Network-Based Marketplace.

U.S. Appl. No. 10/412,188, filed Apr. 11, 2003, Method and System to Incentivize a User to Perform an Activity Relating to a Network-Based Marketplace in a Timely Manner.

U.S. Appl. No. 10/407,756, filed Apr. 4, 2003, Method and System to Discharge a Liability Associated With a Proprietary Currency.

U.S. Appl. No. 09/969,449, filed Oct. 1, 2001, Method and Apparatus for Conducting a Discount Program in an On-Line Auction Environment.

U.S. Appl. No. 13/565,606, filed Aug. 2, 2012, Method and System to Discharge a Liability Associated With a Proprietary Currency.

Schneider et al., "An Introduction to Programming and Problem Solving with Pascal", An Introduction to Programming and Problem Solving with Pascal, Second Edition, John Wiley & Sons, Inc., New York, (1982), 3 pages.

Siegmann, "Nowhere To Go But Up", PC Week; vol. 12(42), Oct. 23, 1995, 3 pages.

Song et al., "Learning Block Importance Models for Web Pages", Proceedings of the 13th International Conference on World Wide Web, 2004, 9 pages.

Tapscott, "Ebay Endagners Traditional Papers Auctioneer Can Pack Far More Punch In Your Sales Pitch", Oct. 9, 1999, 3 pages.

Tjostheim, "A Case Study of an On-line Auction for the World Wide Web", Norwegian Computing Center (NR), pp. 1-10.

Turban, "Auctions and Bidding on the Internet: An Assessment", EM—Electronic Auctions. EM—Electronic Markets, 7(4), Dec. 1997, pp. 7-11.

Heck et al., "Experiences with Electronic Auctions in the Dutch Flower Industry", EM—Electronic Auctions. EM—Electronic Markets, 7(4), 1997, pp. 29-34.

"Aucnet: TV Auction Network System", Harvard Business School Case/Study, Apr. 12, 1996, pp. 1-16.

Wilson, "Act Globally, Think Locally", InternetWeek, Issue 789, Nov. 12, 1999, 5 pages.

Wilson, "Going . . . going . . . gone!bargain-hunters and Collectors Can Scour Auctions From Home Via The Internet", Apr. 27, 1999, 4 pages.

Zwass, "Electronic Commerce: Structures and Issues", International Journal of Electronic Commerce; vol. 1(1), 1996, pp. 3-23.

Patel et al., "New Platform Options Fuel E-Commerce", Information Week, Retrieved from the Internet URL : <http://www.informationweek.com/shared/printHTMLArticle.jhtml&articl-e=/779/precomme>, vol. 779, Mar. 27, 2000,4 pages.

Piccinelli et al., "E-service Composition: Supporting Dynamic Definition of Process-oriented Negotiation Parameters", 12th International Workshop on Database and Expert System Applications, Hewlett-Packard Laboratories, Conference Paper, Munich, Germany,Sep. 3, 2001, 1 page.

Queree, "Bid It Out—annotated Title: Purchasers Will Be Able To Gain Control With "Dynamics Due To The Growth Of Online Auctions"", Global Finance, vol. 14, No. 1, British Library, Jan. 2000, pp. 36-37.

Seminerio, "When You Gotta Take Stock", eWeek Enterprise News & Reviews, Retrieved from the Internet URL: <http://\\eweek.com/print.sub.-article/0,1761,a=13253,00.asp>, vol. 17, No. 55, Copyright 2004 Ziff Davis Media, Inc., Dec. 11, 2000, 2 pages.

Strassmann, "The Impact of B2b", Computerworld, Retrieved from the Internet URL: <http://www.computerworld.com/printthis/2000/0,4814,51535,00.html>, Vo. 34, No. 44, Oct. 2, 2000, 3 pages.

Turek, "Online Portals Offer Bandwidth and Voice Services Annotated", Small and midsize firms are turning to online access to serivces that they might have problems, Information Week.com, Retrieved from the Internet URL: <http://www.informationweek.com/shared/printHTMLArticle.jhtml?article=/784- /prb.andwid>, May 1, 2000, 4 pages.

Weiss, "Pam Am FF Program", Retrieved from the Internet URL: <http://groups.goole.com/groups?q=mileage+combine+redeem&hl=en&lr=&ie=UTF—8&oe=UTF-8&selm=54303h%247r2%40news.bu.edu&mum=1>, 3 pages.

Wilson, "B2B Sellers Fight Back on Pricing", InternetWeek.com, Retrieved from the Internet URL: <http://www.internetweek.com/lead/lead121200.htm vol. 841, Dec. 12, 2000 ,3 pages.

Wilson, "Hubs Rate Poorly on Feature Depth: Many Offer Little Beyond Auctions", InternetWeek.com, Retrieved from the Internet URL: <http://www.internetweek.com/lead/lead100900.htm>, vol. 832, Oct. 9, 2000 ,4 pages.

Brown, "What Does It Take To Make A Buck Off Of Usenet?", salon.com > Technology, Retrieved from the Internet: URL: <www.salon.com/tech/feature/1999/05/24/deja>, May 24, 1999, 4 pages.

Advisory Action received for U.S. Appl. No. 09/734,044, dated Mar. 23, 2009, 2 pages.

Advisory Action received for U.S. Appl. No. 09/734,044, dated Nov. 19, 2008, 2 pages.

Appeal Brief for U.S. Appl. No. 09/734,044, filed on Aug. 25, 2008, 27 pages.

Appeal Brief for U.S. Appl. No. 09/734,044, filed on Dec. 17, 2008, 27 pages.

Final Office Action received for U.S. Appl. No. 09/734,044, dated Jan. 4, 2008, 14 pages.

Final Office Action received for U.S. Appl. No. 09/734,044, dated Jan. 5, 2004, 7 pages.

Final Office Action received for U.S. Appl. No. 09/734,044, dated Mar. 7, 2007, 14 pages.

Final Office Action received for U.S. Appl. No. 09/734,044, dated Apr. 25, 2005, 11 pages.

Non-Final Office Action received for U.S. Appl. No. 09/734,044, dated Aug. 29, 2006, 14 pages.

Non-Final Office Action received for U.S. Appl. No. 09/734,044, dated Aug. 11, 2004, 13 pages.

(56) References Cited

OTHER PUBLICATIONS

Non-Final Office Action received for U.S. Appl. No. 09/734,044, dated Aug. 18, 2003, 7 pages.
Non-Final Office Action received for U.S. Appl. No. 09/734,044, dated Sep. 13, 2007, 15 pages.
Pre-Appeal Brief Request for U.S. Appl. No. 09/734,044, Filed on May 20, 2008, 5 pages.
Reply Brief filed on Jun. 3, 2009, for U.S. Appl. No. 09/734,044, in response to Examiner's Answer to Appeal Brief dated Apr. 3, 2009, 6 pages.
Response to Final Office Action filed on Mar. 10, 2008, for U.S. Appl. No. 09/734,044, dated Jan. 4, 2008, 16 pages.
Response to Final Office Action filed on May 6, 2004, for U.S. Appl. No. 09/734,044, dated Jan. 5, 2004, 15 pages.
Response to Final Office Action filed on Jun. 27, 2007, for U.S. Appl. No. 09/734,044, dated Mar. 7, 2007, 13 pages.
Response to Final Office Action filed on Aug. 26, 2005, for U.S. Appl. No. 09/734,044, dated Apr. 25, 2005, 12 pages.
Response to Non-Final Office Action filed on Oct. 14, 2003, for U.S. Appl. No. 09/734,044, dated Aug. 18, 2003, 12 pages.
Response to Non-Final Office Action filed on Oct. 22, 2007, for U.S. Appl. No. 09/734,044, dated Sep. 13, 2007, 17 pages.
Response to Non-Final Office Action filed on Dec. 16, 2004, for U.S. Appl. No. 09/734,044, dated Aug. 11, 2004, 13 pages.
Appeal Brief for U.S. Appl. No. 09/734,044, filed on Feb. 4, 2010, 25 pages.
Reply Brief filed on Jun. 23, 2010, for U.S. Appl. No. 09/734,044, in response to Examiner's Answer to Appeal Brief dated Apr. 23, 2010, 7 pages.
Final Office Action received for U.S. Appl. No. 09/734,044, dated Feb. 13, 2014, 53 pages.
Response to Non-Final Office Action filed on Dec. 4, 2006, for U.S. Appl. No. 09/734,044, dated Aug. 29, 2006, 7 pages.
Advisory Action received for U.S. Appl. No. 09/969,449, dated Jun. 22, 2009, 3 pages.
Appeal Brief for U.S. Appl. No. 09/969,449, filed on Apr. 25, 2006, 29 pages.
Appeal Brief for U.S. Appl. No. 09/969,449, filed on Aug. 9, 2006, 30 pages.
Examiner Initiated Interview Summary received for U.S. Appl. No. 09/969,449, dated Mar. 4, 2008, 4 pages.
Examiner Initiated Interview Summary received for U.S. Appl. No. 09/969,449, dated May 19, 2009, 4 pages.
Final Office Action received for U.S. Appl. No. 09/969,449, dated Mar. 17, 2009, 11 pages.
Final Office Action received for U.S. Appl. No. 09/969,449, dated Nov. 3, 2004, 10 pages.
Final Office Action received for U.S. Appl. No. 09/969,449, dated Nov. 21, 2005, 9 pages.
Final Office Action received for U.S. Appl. No. 09/969,449, dated Nov. 29, 2007, 10 pages.
Final Office Action received for U.S. Appl. No. 09/969,449, dated Dec. 29, 2003, 8 pages.
Non-Final Office Action received for U.S. Appl. No. 09/969,449, dated Apr. 25, 2005, 9 pages.
Non-Final Office Action received for U.S. Appl. No. 09/969,449, dated May 11, 2004, 8 pages.
Non-Final Office Action received for U.S. Appl. No. 09/969,449, dated Jul. 9, 2003, 8 pages.
Non-Final Office Action received for U.S. Appl. No. 09/969,449, dated Aug. 5, 2008, 9 pages.
Roberson, "AA/US Alliance Question", Retrieved from the Internet: <URL: http://groups.google.com/q=mileage+combine+redeem&hl=en&lr=&ie=UTF-8&oe=U- TF-8&selm=6s1oa8%24v66%241%40nnrp1.dejanews.com&mum=9>, Aug. 26, 1998, 1 page.
"@wards Online", Canadian Airlines, Copyright (c) 1994-1997—Canadian Airlines International Ltd., Retrieved from the Internet: <URL: http://web.archive.org/web/19970704234541/www.cdnair.ca/cpi.html->, 1 page.

"Aviation Competition: Effects on Consumers from Domestic Airline Alliances Vary", Retrieved from the Internet: <URL: http://groups.google.com/groups?q=mileage+combine+redeem&hl=en&lr=&ie=UTF--8&oe=UTF-8&selm=GAORPTrc99037.txtp2%40us.govnews.org&mum=6>, Feb. 2, 1999, 25 pages.
"Biz-to-Biz Buzz (News Briefs)", Newsbytes PM, May 24, 2000, 2 pages.
"Business Roundup", News Briefs, InternetWeek, Apr. 5, 1999, 7 pages.
"Continental Airlines OnePass—Interactive Reward Charts", web site, transferred in, pp. 1-8.
"Combinable Miles Are the Stuff of Frequent Flyers' Dreams", FrequentFlier.com—helpinq frequent flyers earn more miles and travel awards throuqh free, Retrieved from the Internet URL: <http://frequentflier.com/ff052498.htm>, May 25, 1998, 4 pages.
Tadjr, "Delta . . . a long relationship ends", Retrieved from the Internet: <URL: http://groups.google.com/groups?q=mileage+combine+redeem&hl=en&lr=&ie=UTF- -8&oe=UTF-8&selm=7adhof%24me8%241%40news-1.news.gte.net&rnum=5>, Feb. 17, 1999, 1 page.
Pacek, "American Express Membership Rewards: A Good Deal or Not?", Retrieved from the Internet: <URL: http://groups.google.com/groups?q=combine+points+programs&hl=en&lr=&ie=UTF-F-8&oe=UTF-8&selm=crazyone-2509972357090001%40async83.city-net.com&mum=4&- gt, Sep. 25, 1997, 2 pages.
"Exchange of Ideas: Why the street is in love with Purchasepro.com's congeries of revenue models", Red Herring, vol. 76, Mar. 1, 2000, 2 pages.
"Family of Web rental applications unveiled", KM World, vol. 9, No. 2, Mar. 1, 2000, 1 page.
"Family of Web Rental Applications Unveiled", KM World, vol. 7 No. 1, Jan. 1, 1998, 2 pages.
"Government agencies can procure materials. (BidTheWorld.com)", Link-Up, Vo. 17, No. 1, Jan. 1, 2000, 19 pages.
"Keeping You Informed", Canadian membership guide, pp. 6-7, Retrieved from the Internet URL: <www.cdnair.ca>, pp. 6-7.
"Last Minute Gift Ideas And Stocking Stuffers from AT&T", AT&T News Release, Retrieved from the Internet: <URL: http://www.att.com/news/1294/941221.csa.html>, Dec. 21, 1994, 2 pages.
"OnePass Online Auction", Continental Airlines, transferred in, 2002, 1 page.
Baumann, "Personal Optimized Decision/Transaction Program", IBM Technical Disclosure Bulletin, Jan. 1995, pp. 83-84.
"Requesting a Reward", Continental Airlines OnePass—Requesting a Reward, transferred in, Jul. 28, 2004, Copyright 2001, 2 pages.
"Service Helps Hospitals Shop Online. (Company Business and Marketing)", Link-Up, May/Jun. 2000, vol. 17, No. 3, Supplied by the British Library—"The world's knowledge", 14 pages.
"Web beacon", Retrieved from the Internet URL: <http://www.webopedia.com/TERM/W/Web.sub.--beacon.html, Webopedia.com>, Last modified: Aug. 21, 2003, Copyright 2003 Jupitermedia Corporation.,(Jan. 22, 2002), 3 pages.
"Welcome to ShopOnePass", Continental Airlines ShopOnePass, transferred in, Copyright (c) 2002 Continental Airlines, Inc., 1 page.
"Welcome to the Sloan Career Development Office Interview Bidding and Scheduling System", CDO Interview Bidding & Scheduling—Login, transferred in, 3 pages.
Asbrand, "Taking Stock in Trading Exchanges (Industry Trend on Event)", Electronic Business, Retrieved from the Internet URL: <http://www.reed-electronics.com/eb-mag/index.asp?layout=articlePrint&arti- cleID=CA42124>, Apr. 15, 2004, 2 pages.
Chan, "Design and Implementation of a Mobile Agent-Based Auction", IEEE Pac RIM Conf Commun Comp Proc, vol. II, 2001, pp. 740-743.
Chen et al., "Bidder's Strategy Under Group-Buying Auction On the Internet", IEEE Transactions on Systems, Man & Cybernetics, A (Systems and Humans), vol. 32, No. 6,(Nov. 2002), pp. 680-690.
Creed, "Haggling Online in the Philippines. (Magtawaran Auction) (Company Business and Marketing) (Brief Article)", Newsbytes, May 1, 2000, 2 pages.
Dalton, "Going, Going, Gone!: E-commerce is leading to an anything goes", Information Week, vol. 755, Oct. 4, 1999, 44 pages.

(56) References Cited

OTHER PUBLICATIONS

Davidow, "The Dynamics of Pricing/Annotated Title: There Are Many Forms of Dynamic Pricing Marketplaces, bid-ask, and auctions; Electronic Commerce and Technology has Affected the Art of Pricing", E-Commerce Business, Journal, Feb. 2000, 42 pages.
Edwards, "New B2B Players Spreads Benefits of E-Commerce", Communications News, vol. 38, No. 1, Jan. 1, 2001, 98 pages.
Edwards, "Your Web Browser is Bugged", Retrieved from the Internet: <www.ntsecurity.net/Articles/Index.cfm?ArticleID=9543, Jul. 13, 2000, 3 pages.
Fisher, "More Goods On The Block: Waybid, Bid.com Open A Wider Range To Buyers", eWeek, vol. 17, No. 55, Dec. 18, 2000, 39 pages.
Franse, "Distribution Briefs", VARbusiness, Retrieved from the Internet URL:<http://www.varbusiness.com/Components/printArticle.asp?ArticleID=33901>, Apr. 7, 2004, 2 pages.
Furger, "Working the Web Bazaar", PC World.com—Working the Web Bazaar, PC World magazine, Retrieved from the Internet URL:<http://www.pcworld.com/resource/printable/article/0,aid,15823,00.asp>, vol. 18, No. 5, May 1, 2001, 10 pages.
Furger, "Working the Web Browser", PC World, vol. 18, No. 5, May 1, 2000, 135 pages.
Goldsborough, "Internet Auctions Examined", Link-Up, vol. 17, No. 6, Retrieved from the Internet URL : <reidgold@netaxs.com>, Nov./Dec. 2000, 1 page.
Goldstein, "Medical E-Procurement-Navigating in a B2B Market", Health Management Technology, vol. 21, No. 8, Aug. 2000, pp. 30-36.
Greengard, "What Traffic Will Bear: Companies Are Using New Strategies", Business Finance, vol. 7, No. 3, Mar. 1, 2001, 48 pages.
Gupta, "Most Flexible FF", Retrieved from the Internet URL : <http://groups.google.com/groups?q=combine+points+programs&hl=en&lr=&ie=UT- F-8&oe=UTF-8&selm=555t5k%24r1j%40hpax.cup.hp.com&mum=8,%202/20/2004, Google Search: combine points programs, 2 pages.
Jaroneczyk, "Sold on an old idea. (Internet/Web/Online Service Information)", Internet World, Vo. 7, No. 4, Feb. 15, 2001, 22 pages.
Kalin, "How Low Can You Go? If your smart, you'll decide your online", Darwin Magazine, Apr. 2001, Retrieved from the Internet URL : <http://www.darwinmag.com/read/040101/low.html>, vol. 1, No. 7, Apr. 1, 2001, 5 pages.
Kumar et al., "Sales Promotions on the Internet", IBM Research. Division, T.J. Watson Research Center, Yorktown Heights, NY 10598, 11 pages.
Lindsay et al., "The Historic Use of Computerized Tools for Marketing and Market Research: A Brief Survey", Electronic Tools for Market Research: A Historical Survey, Retrieved from the Internet URL: <www.jefflindsay.com/market-research.shtml>, Kimberly-Clark Corporation, 2100 Winchester Road, Neenah, WI 54956, Updated Dec. 27, 2001, 20 pages.
McKendrick, "eMarket Shakeout: Old Economy Players Step Up", Electronic Commerce World, vol. 10, No. 11, Nov. 1, 2000, 34 pages.
Merlino, "Auction Anxiety", Upside, Oct. 1, 2000, 246 pages.
Mitchell, "BayBuilder Delivers Easy, Profitable Reverse Auctions", InfoWorld, vol. 22, No. 22, Jun. 5, 2000, 52 pages.
Mollison, "America West Airlines Opts for Reverse Auctions: The Airline Selected MaterialNet's Software to Control Spending with Key Suppliers and Cut Costs. (A case study)", Internet World, vol. 8, No. 4, Dec. 15, 1999, 42 pages.
Mollman, "Name Your Price: Are You Ready To Bicker Over The Cost of a Sandwich? In the New Economy, You Won't Pay Retail for Anything. (Industry or Trend Event)", PC/Computing, Jan. 1, 2000, 56 pages.
Mollman, "Sold! Never Pay Retail Again. Online Auctions Are Changing the Way Businesses Buy and Sell Everything", PC/Computing, vol. 11, No. 1, Feb. 1, 2000, 130 pages.
Morgan, "Pick Your Lot: Build Consumer-Oriented Auctions With AuctionBuilder", InternetWeek.com, vol. 829, Sep. 18, 2000, 4 pages.

Ohlson, "Looking Behind, Beyond B2B Marketplace Woes", Network WorldFusion, Retrived from the Internet URL: <http://www.nwfusion.com/cgi-bin/mailto/x.cgi>, vol. 18, No. 22, Jun. 11, 2001, 4 pages.
Response to Final Office Action filed on Jan. 11, 2010, for U.S. Appl. No. 10/412,017, dated Nov. 9, 2009, 16 pages.
Response to Non-Final Office Action filed on Aug. 6, 2014, for U.S. Appl. No. 10/412,017, dated May 6, 2014, 14 pages.
Response to Non-Final Office Action filed on May 24, 2010, for U.S. Appl. No. 10/412,017, dated Feb. 24, 2010, 13 pages.
Response to Non-Final Office Action filed on Sep. 28, 2009, for U.S. Appl. No. 10/412,017, dated Jun. 26, 2009, 13 pages.
Lassila, "Web metadata: A Matter of Semantics", IEEE Internet Computing, vol. 2, Issue: 4, Jul./Aug. 1998, 15 pages.
"HP Completes Online Strategy With Launch of E-commerce Site", M2 Presswire, Jun. 29, 1999, 3 pages.
"New Ebay-like Auction Software Released", Business Wire, Mar. 17, 1999, 1 page.
"Peerflix: How it Works", Copyright © 2004-2006 Peerflix, Inc. ,Retrieved from the Internet: <URL: http://www.peerflix.com/Default.aspx?tabid=64>, Accessed on Aug. 16, 2006, 2 pages.
"Peerflix: Netflix, Blockbuster and Peerflix: Compare Online DVD Rentals vs. Buying vs. Trading", Copyright © 2004-2006 Peerflix, Inc., Retrieved from the Internet: <URL:http://www.peerflix com/Default.aspx?tabid=171>, Accessed on Aug. 16, 2006, 2 pages.
"PSINet Teams with WorldPay Ltd. to Launch the World's First Secure Multi-Currency Solution for International Electronic Commerce", PR Newswire Association, Oct. 6, 1997, 3 pages.
"RSA Signs Deal With China", Internet Week, 2(7), Feb. 12, 1996, 2 pages.
"Yahoo Homepage", Internet Archive Wayback Machine, Retrieved from the Internet URL: <http://web.archive.org/web/19991003015603/http://www.yahoo.com/index.html, Oct. 3, 1999, 1 page.
"Yahoo!—Regionai:Countries:Afghanistan", Retrieved from the Internet URL: <http://web.archive.org/web/20060921181441/http://dir.yahoo.com/Regional/countries/afghanistan, Jun. 16, 1997, 1 page.
"Yahoo!—Regionai:Countries:Sweden", Retrieved from the Internet URL <http://web.archive.org/web/19970616194441/www.yahoo.com/Regionai/Countries/Sweden/, Jun. 16, 1997, 2 pages.
"Yahoo! Auctions Celebrates One-Year Anniversary; As Online Auction Usage Continues to Grow, Yahoo! Is Quickly Becoming the World Marketplace of the New Millennium", Business Wire, Sep. 14, 1999, 3 pages.
Akin, "Web Retailing Gains Market Muscle as Concerns Fade: Record Season: Increasing Number of Sites Catering for Canadian Dollars", Financial Post. p04, XP002905105, Dec. 26, 1998, 3 pages.
Bers, "Cyberspace: The New Promised Land", Bank Systems & Technology, 32(7), Jul. 1995, pp. 32-37.
Bidnbuy, "Going, going, virtually gone: The success of online auctions in the US such as eBay has prompted the rise of European auctioneers who want to emulate its model", Business and Finance, Jun. 17, 1999, 3 pages.
Business Wire, "Subasta.com Enters Into Strategic Partnership with From2.com", Business Wire, Obtained from Proquest, Document No. 43206061, Jul. 16, 1999, 2 pages.
Business Wire, "Subasta.com, the Premier Online Auction Board for Latin America, Spain, and the Hispanic Sector of the U.S., Has Attracted Over 60,000 Viewers in Less Than Two Months", Business Wire, Jul. 16, 1999, 2 pages.
Business Wire, "Yahoo! Launches Three New European Auctions Services; Yahoo! Italy, Yahoo! Spain and Yahoo! Sweden Unveil New Local Auctions", Business Wire. Obtained from Proquest, Sep. 23, 1999, 3 pages.
Chapman, Roqet's International Thesaurus Fourth, Thomas Y Crowell, Publishers New York sec 637, 1997, 3 pages.
Clemons, "Evaluating the Prospects for Alternative Electronic Securities", Proceedings of ICIS 91: 12th International Conference on Information Systems, Dec. 16-18, 1991, pp. 53-63.
Cohen, "Citibank's Bid to be The King of Cash (Citibank unveils Electronic Monetary System prototype, a digital currency system capable of replacing all current monetary systems)", Bank Technology News. Sep. 1996, 6 pages.

(56) References Cited

OTHER PUBLICATIONS

Cooper et al., "Playing Catch-Up: U.S. Web Firms Get Slow Start in Europe, Amid Crowded Field—Used to Being First and Best at Home, They Stumble in World's No. 2 Market—Pouncing on Amazon Delays", Wall Street Journal Europe, Obtained from Proquest, Nov. 15, 1999, 5 pages.
Graham,"The Emergence of Linked Fish Markets in Europe", EM—Electronic Commerce in Europe. EM—Electronic Markets, 8(2), Jul. 1998, pp. 29-32.
Grubbs, "Top 5 Auction Utilities", PC World.com San Francisco CA, Dec. 4, 2000, 2 pages.
Hess et al.,"Computerized Loan Organization System: An Industry Case Study of the Electronic Markets Hypothesis", MIS Quarterly, vol. 18(3), Sep. 1994, pp. 251-274.
Klein, "Introduction to Electronic Auctions", EM—Electronic Auctions. EM—Electronic Markets, vol. 7, No. 4, Dec. 1997, pp. 3-6.
Lee, "AUCNET: Electronic Intermediary for Used-Car Transactions", EM—Electronic Auctions. EM—Electronic Markets, 7(4), Dec. 1997, pp. 24-28.
Lee, "Considering Exchange Rate Movements In Economic Evaluation of Foreign Direct Investments", Engineering Economist, 40(2), 1995, 14 pages.
Lee, "Electronic Brokerage and Electronic Auction: The Impact of IT on Market Structures", Proceedings of the Twenty-Ninth Hawaii International Conference on System Sciences, 1996, pp. 397-406.
"United Technologies: UTC's Carrier Corp. Teams With Freemarkets to Create Largest Asian-Based B2B Online Auction Market To Date; UTC Division Identifies Average Annual Savings of More Than 16 Percent on Electric Motors Through Freemarkets B2B Emarketplace", M2 Presswire, Mar. 22, 2000, 2 pages.
Malone, "Electronic Markets and Electronic Hierarchies", Communications of the ACM, 14(25), Jun. 1987, pp. 484-497.
Mardesich, "Site Offers Clearance for End-of-Life Products—Onsale Takes Auction Gavel Electronic", Computer Reseller News, Jul. 8, 1996, 2 pages.
Massimb, "Electronic Trading, Market Structure and Liquidity", Financial Analysts Journal, 50(1), Jan./Feb. 1994, pp. 39-50.
Mcclenahen, "Net Gains", Industry Week, Cleveland, May 17, 1999, 8 pages.
Mcdougall, "Electronic Evolution", Canadian Banker, 102(5), Sep.-Oct. 1995, 10 pages.
Meade, "Visual 360: A Performance Appraisal System That's 'Fun'", HR Magazine, Jul. 1999, pp. 1-3.
Merrill, "GE Capital To Extend Integrator Buying Spree", Computer Reseller News, Jul. 8, 1996, 2 pages.
Neo, "The Implementation of an Electronic Market for Pig Trading in Singapore", Journal of Strategic Information Systems, vol. 1(5), Dec. 1992, pp. 278-288.
Pollick, "SOLD! on Ebay as Antique and Collectible Dealers See Their Sales Increase Through Online Auctions Such as Ebay, More of Them are Deciding That The Internet is not Something to be Afraid Of", Sarasota Herald Tribune, Oct. 11, 1999, 8 pages.
Post et al., "Application of Auctions as a Pricing Mechanism for the Interchange of Electric Power", IEEE Transactions on Power Systems, 10(3), Aug. 1995, pp. 1580-1584.
"Mitsubishi Venture, Wells Fargo Partner To Offer Multi-Currency E-Commerce Storefront", Retrieved from the Internet URL: <http://www.prnewswire.co.uk/cgi/news/release?id=41972>, Mar. 1, 1999, 3 pages.
Preist et al., "Adaptive Agents in a Persistent Shout Double Auction", International Conference on Information and Computation Economies, Proceedings of the First International Conference on Information and Computation Economies, 1998, pp. 11-18.
Pressler, "Sells On Ebay; Housewife Finds Herself Head of Multinational Software Firm", Washington Post, Sep. 5, 1999, 3 pages.
Raleigh, "Mediappraise Receives National Award for Web-based Technology That Enables Companies to Solve Thorny HR Problem", Business Wire Press Release, Dec. 14, 1998, 2 pages.
Reck, "Trading-Process Characteristics of Electronic Auctions", Focus Theme, vol. 7, No. 4, 1997, 7 pages.
Resnick, "Reputation Systems", Communications of the ACM, 43(12), Dec. 2000, pp. 45-48.
Rockoff et al., "Design of an Internet-based System for Remote Dutch Auctions", Internet Research: Electronic Networking Applications and Policy, 5(4), Jan. 1, 1995, pp. 10-16.
Non-Final Office Action received for U.S. Appl. No. 09/969,449, dated Oct. 6, 2009, 11 pages.
Pre-Appeal Brief Request filed on Jan. 12, 2006, for U.S. Appl. No. 09/969,449, 4 pages.
Reply Brief filed on Jan. 5, 2007, for U.S. Appl. No. 09/969,449, in response to Examiner's Answer to Appeal Brief dated Nov. 2, 2006, 7 pages.
Response to Final Office Action filed on Feb. 7, 2005, for U.S. Appl. No. 09/969,449, dated Nov. 3, 2004, 27 pages.
Response to Final Office Action filed on Apr. 1, 2004, for U.S. Appl. No. 09/969,449, dated Dec. 29, 2003, 12 pages.
Response to Final Office Action filed on May 1, 2008, for U.S. Appl. No. 09/969,449, dated Nov. 29, 2007, 16 pages.
Response to Final Office Action filed on May 18, 2009, for U.S. Appl. No. 09/969,449, dated Mar. 17, 2009, 14 pages.
Response to Advisory Action filed on Jul. 17, 2009, for U.S. Appl. No. 09/969,449, dated Jun. 22, 2009, 14 pages.
Response to Non-Final Office Action filed on Aug. 16, 2004, for U.S. Appl. No. 09/969,449, dated May 11, 2004, 15 pages.
Response to Non-Final Office Action filed on Aug. 11, 2015, for U.S. Appl. No. 09/969,449, dated Apr. 9, 2015, 27 pages.
Response to Non-Final Office Action filed on Aug. 29, 2005, for U.S. Appl. No. 09/969,449, dated Apr. 25, 2005, 12 pages.
Response to Non-Final Office Action filed on Oct. 14, 2003, for U.S. Appl. No. 09/969,449, dated Jul. 9, 2003, 12 pages.
Response to Non-Final Office Action filed on Dec. 10, 2008, for U.S. Appl. No. 09/969,449, dated Aug. 5, 2008, 16 pages.
Response to Non-Final Office Action filed on Feb. 8, 2010, for U.S. Appl. No. 09/969,449, dated Oct. 6, 2009, 17 pages.
Final Office Action received for U.S. Appl. No. 09/969,449, dated May 3, 2010, 10 pages.
Appeal Brief for U.S. Appl. No. 09/969,449, filed on Nov. 29, 2010, 28 pages.
Examiner's Answer to Appeal Brief for U.S. Appl. No. 09/969,449 dated Feb. 7, 2011, 16 pages.
Applicant Initiated Interview Summary received for U.S. Appl. No. 09/969,449, dated May 20, 2014, 4 pages.
Non-Final Office Action received for U.S. Appl. No. 09/969,449, dated Mar. 20, 2014, 15 pages.
Response to Non-Final Office Action filed on Jun. 20, 2014, for U.S. Appl. No. 09/969,449, dated Mar. 20, 2014, 11 pages.
Advisory Action received for U.S. Appl. No. 09/969,449, dated Apr. 26, 2016, 2 pages.
Applicant Initiated Interview Summary received for U.S. Appl. No. 09/969,449, dated Dec. 8, 2014, 4 pages.
Final Office Action received for U.S. Appl. No. 09/969,449, dated Nov. 6, 2015, 17 pages.
Final Office Action received for U.S. Appl. No. 09/969,449, dated Sep. 8, 2014, 14 pages.
Non-Final Office Action received for U.S. Appl. No. 09/969,449, dated Apr. 9, 2015, 16 pages.
Response to Final Office Action filed on Mar. 9, 2015, for U.S. Appl. No. 09/969,449, dated Sep. 8, 2014, 12 pages.
Response to Final Office Action filed on Apr. 6, 2016, for U.S. Appl. No. 09/969,449, dated Nov. 6, 2015, 20 pages.
Advisory Action received for U.S. Appl. No. 10/407,756, dated Apr. 3, 2009, 3 pages.
Final Office Action received for U.S. Appl. No. 10/407,756, dated Jan. 7, 2009, 16 pages.
Final Office Action received for U.S. Appl. No. 10/407,756, dated Jan. 15, 2010, 14 pages.
Non-Final Office Action received for U.S. Appl. No. 10/407,756, dated Aug. 6, 2009, 13 pages.
Non-Final Office Action received for U.S. Appl. No. 10/407,756, dated Jun. 27, 2008, 12 pages.
Preliminary Amendment received for U.S. Appl. No. 10/407,756, filed on Nov. 6, 2003, 12 pages.

(56) References Cited

OTHER PUBLICATIONS

Response to Advisory Action filed on May 7, 2009, for U.S. Appl. No. 10/407,756, dated Apr. 3, 2009, 14 pages.
Response to Final Office Action filed on Mar. 6, 2009, for U.S. Appl. No. 10/407,756, dated Jan. 7, 2009, 14 pages.
Response to Non-Final Office Action filed on Nov. 6, 2009, for U.S. Appl. No. 10/407,756, dated Aug. 6, 2009, 14 pages.
Response to Non-Final Office Action filed on Sep. 26, 2008, for U.S. Appl. No. 10/407,756, dated Jun. 27, 2008, 17 pages.
Pre-Appeal Brief Request for U.S. Appl. No. 10/407,756, Filed on Apr. 15, 2010, 5 pages.
Appeal Brief for U.S. Appl. No. 10/407,756, filed on Jul. 27, 2010, 27 pages.
Decision on Pre-Appeal Brief Request for U.S. Appl. No. 10/407,756 mailed on May 27, 2010, 2 pages.
Non-Final Office Action received for U.S. Appl. No. 10/412,188, dated Feb. 24, 2010, 13 pages.
Advisory Action received for U.S. Appl. No. 10/412,188, dated Oct. 1, 2010, 3 pages.
Response to Final Office Action filed on Sep. 7, 2010, for U.S. Appl. No. 10/412,188, dated Jul. 7, 2010, 14 pages.
Final Office Action received for U.S. Appl. No. 10/412,188, dated Jul. 7, 2010, 21 pages.
Response to Non-Final Office Action filed on Jun. 24, 2010, for U.S. Appl. No. 10/412,188, dated Feb. 24, 2010, 13 pages.
Non-Final Office Action received for U.S. Appl. No. 10/412,188, dated Jul. 9, 2014, 24 pages.
Applicant Initiated Interview Summary received for U.S. Appl. No. 10/412,188, dated Dec. 16, 2016, 4 pages.
Advisory Action received for U.S. Appl. No. 10/412,188, dated May 12, 2017, 3 pages.
Final Office Action received for U.S. Appl. No. 10/412,188, dated Dec. 24, 2014, 31 pages.
Final Office Action received for U.S. Appl. No. 10/412,188, dated Jan. 31, 2017, 35 pages.
Non-Final Office Action received for U.S. Appl. No. 10/412,188, dated Sep. 27, 2016, 35 pages.
Response to Final Office Action filed on Mar. 24, 2015, for U.S. Appl. No. 10/412,188, dated Dec. 24, 2014, 16 pages.
Response to Final Office Action filed on May 1, 2017, for U.S. Appl. No. 10/412,188, dated Jan. 31, 2017, 30 pages.
Response to Non-Final Office Action filed on Dec. 9, 2014, for U.S. Appl. No. 10/412,188, dated Jul. 9, 2014, 14 pages.
Response to Non-Final Office Action filed on Dec. 26, 2016, for U.S. Appl. No. 10/412,188, dated Sep. 27, 2016, 26 pages.
Final Office Action received for U.S. Appl. No. 10/412,188, dated Nov. 5, 2009, 13 pages.
Non-Final Office Action received for U.S. Appl. No. 10/412,188, dated Jun. 26, 2009, 25 pages.
Response to Final Office Action filed on Jan. 5, 2010, for U.S. Appl. No. 10/412,188, dated Nov. 5, 2009, 12 pages.
Response to Non-Final Office Action filed on Sep. 28, 2009, for U.S. Appl. No. 10/412,188, dated Jun. 26, 2009, 11 pages.
Advisory Action received for U.S. Appl. No. 10/412,194, dated Jul. 6, 2009, 3 pages.
Final Office Action received for U.S. Appl. No. 10/412,194, dated Apr. 22, 2009, 9 pages.
Non-Final Office Action received for U.S. Appl. No. 10/412,194, dated Mar. 13, 2008, 6 pages.
Non-Final Office Action received for U.S. Appl. No. 10/412,194, dated Sep. 24, 2009, 6 pages.
Non-Final Office Action received for U.S. Appl. No. 10/412,194, dated Oct. 10, 2008, 8 pages.
Response to Non-Final Office Action filed on Jan. 9, 2009, for U.S. Appl. No. 10/412,194, dated Oct. 10, 2008, 17 pages.
Response to Non-Final Office Action filed on Jun. 13, 2008, for U.S. Appl. No. 10/412,194, dated Mar. 13, 2008, 19 pages.
Response to Final Office Action filed on Jun. 22, 2009, for U.S. Appl. No. 10/412,194, dated Apr. 22, 2009, 16 pages.
Response to Advisory Action filed on Jul. 22, 2009, for U.S. Appl. No. 10/412,194, dated Jul. 6, 2009, 16 pages.
Non-Final Office Action received for U.S. Appl. No. 10/412,194, dated Nov. 1, 2010, 6 pages.
Response to Non-Final Office Action filed on Feb. 1, 2011, for U.S. Appl. No. 10/412,194, dated Nov. 1, 2010, 16 pages.
Response to Non-Final Office Action filed on Sep. 13, 2010, for U.S. Appl. No. 10/412,194, dated Sep. 24, 2009, 15 pages.
Final Office Action received for U.S. Appl. No. 10/412,194, dated May 12, 2014, 9 pages.
Response to Non-Final Office Action filed on Feb. 28, 2014, for U.S. Appl. No. 10/412,194, dated Oct. 28, 2013, 19 pages.
Appeal Brief for U.S. Appl. No. 10/412,194, filed on Dec. 8, 2014, 41 pages.
Decision on Pre-Appeal Brief Request for U.S. Appl. No. 10/412,19 mailed on Nov. 6, 2014, 2 pages.
Examiner's Answer to Appeal Brief for U.S. Appl. No. 10/412,194 dated Apr. 2, 2015, 12 pages.
Pre-Appeal Brief Request for U.S. Appl. No. 10/412,194, Filed on Sep. 12, 2014, 5 pages.
Reply Brief filed on Jun. 2, 2015, for U.S. Appl. No. 10/412,194, in response to Examiner's Answer to Appeal Brief dated Apr. 2, 2015, 51 pages.
Non-Final Office Action received for U.S. Appl. No. 13/565,606, dated Jan. 16, 2014, 9 pages.
Non-Final Office Action received for U.S. Appl. No. 13/565,606, dated Jul. 31, 2014, 10 pages.
Response to Non-Final Office Action filed on Apr. 3, 2014, for U.S. Appl. No. 13/565,606, dated Jan. 16, 2014, 11 pages.
Final Office Action received for U.S. Appl. No. 13/565,606, dated Feb. 1, 2016, 18 pages.
Final Office Action received for U.S. Appl. No. 13/565,606, dated Dec. 15, 2014, 12 pages.
Non-Final Office Action received for U.S. Appl. No. 13/565,606, dated Jul. 20, 2015, 14 pages.
Response to Final Office Action filed on Feb. 17, 2015, for U.S. Appl. No. 13/565,606, dated Dec. 15, 2014, 19 pages.
Response to Non-Final Office Action filed on Oct. 19, 2015, for U.S. Appl. No. 13/565,606, dated Jul. 20, 2015, 13 pages.
Response to Non-Final Office Action filed on Oct. 30, 2014, for U.S. Appl. No. 13/565,606, dated Jul. 31, 2014, 13 pages.
EBay:Internet Archive Wayback Machine, Retrieved from the Internet URL: <www.archive.org;www.ebay.com>; Oct. 1999, 23 pages.
OED Online Main entry text Frame, http://dictionary.oed.com/cgi/entry_main/50218727?query_type=word&queryword=select&first=1&max_to show+10&sort at Http://dictionary.oed.com/cgi/entry_main/50218727?query_type=word&queryword=approve&first=1&max_to show+10&sort>, 8 pages.
www.AuctionWatch.com, recovered from www.archive.org on Jun. 8, 2007, Aug. 15, 2000, 30 pages.
BarterBee.com: Buy, Sell, Why Points?, Retrieved from the Internet URL:<htttp://www.barterbee.com/xmain0003/?hp=trade >, Copyright 1948-2004, 1 page.
BarterBee.com: Help & FAQ, Retrieved from the Internet URL: <http ://www.barterbee.com/xmain0005/?_hp=faq_4_requesting>, Copyright 1948-2004, 2 pages.
BarterBee.com: Points Q & A, Retrieved from the Internet URL: <http://www.barterbee.com/xmain0003/? hp=point>, Copyright 1948-2004, 1 page.
"Hello Direct Store Joins Ebay Network Of Merchants", PR Newswire, New York, May 23, 2002, 2 pages.
Appeal Brief for U.S. Appl. No. 09/734,044, filed on Oct. 23, 2009, 25 pages.
Decision on Appeal for U.S. Appl. No. 09/734,044 mailed on May 1, 2012, 10 pages.
Decision on Appeal for U.S. Appl. No. 09/734,044 mailed on May 2, 2012, 10 pages.
Response to Non-Final Office Action filed on May 17, 2013, for U.S. Appl. No. 13/565,606, dated Feb. 19, 2013, 10 pages.
Response to Final Office Action filed on Sep. 6, 2013, for U.S. Appl. No. 13/565,606, dated Jun. 7, 2013, 10 pages.
Non-Final Office Action received for U.S. Appl. No. 13/565,606, dated Feb. 19, 2013, 10 pages.

(56) References Cited

OTHER PUBLICATIONS

Final Office Action received for U.S. Appl. No. 13/565,606, dated Jun. 7, 2013, 11 pages.
Advisory Action received for U.S. Appl. No. 10/412,194, dated Jan. 10, 2012, 3 pages.
Applicant Initiated Interview Summary received for U.S. Appl. No. 10/412,194, dated Sep. 8, 2011, 3 pages.
Decision on Pre-Appeal Brief Request for U.S. Appl. No. 10/412,194 mailed on Feb. 23, 2012, 2 pages.
Final Office Action received for U.S. Appl. No. 10/412,194, dated Mar. 25, 2011, 8 pages.
Final Office Action received for U.S. Appl. No. 10/412,194, dated Oct. 27, 2011, 7 pages.
Non-Final Office Action received for U.S. Appl. No. 10/412,194, dated Jun. 14, 2011, 8 pages.
Non-Final Office Action received for U.S. Appl. No. 10/412,194, dated Oct. 28, 2013, 7 pages.
Pre-Appeal Brief Request for U.S. Appl. No. 10/412,194, Filed on Jan. 27, 2012, 5 pages.
Response to Final Office Action filed on Apr. 27, 2012, for U.S. Appl. No. 10/412,194, dated Oct. 27, 2011, 18 pages.
Response to Final Office Action filed on Dec. 27, 2011, for U.S. Appl. No. 10/412,194, dated Oct. 27, 2011, 16 pages.
Response to Final Office Action filed on May 25, 2011, for U.S. Appl. No. 10/412,194, dated Mar. 25, 2011, 14 pages.
Response to Non-Final Office Action filed on Sep. 12, 2011, for U.S. Appl. No. 10/412,194, dated Jun. 14, 2011, 13 pages.
Decision on Appeal for U.S. Appl. No. 10/407,756 mailed on May 31, 2013, 10 pages.
Reply Brief filed on Dec. 28, 2010, for U.S. Appl. No. 10/407,756, in response to Examiner's Answer to Appeal Brief mailed on Oct. 28, 2010, 3 pages.
Appeal Decision for U.S. Appl. No. 09/969,449 dated Nov. 1, 2013, 5 pages.
Examiner's Answer to Appeal Brief for U.S. Appl. No. 09/969,449 dated Nov. 2, 2006, 10 pages.
Examiner's Answer to Appeal Brief received for U.S. Appl. No. 09/734,044, dated Apr. 3, 2009, 17 pages.
Examiner's Answer to Appeal Brief received for U.S. Appl. No. 09/734,044, dated Apr. 23, 2010, 17 pages.
Non-Final Office Action received for U.S. Appl. No. 09/734,044, dated Apr. 29, 2013, 41 pages.
Response to Final Office Action filed on Jun. 29, 2012, for U.S. Appl. No. 09/734,044, dated Jan. 4, 2008, 15 pages.
Response to Non-Final Office Action filed on Oct. 29, 2013, for U.S. Appl. No. 09/734,044, dated Apr. 29, 2013, 18 pages.
Advisory Action received for U.S. Appl. No. 10/412,017, dated Aug. 19, 2010, 3 pages.
Advisory Action received for U.S. Appl. No. 10/412,017, dated Jan. 29, 2010, 4 pages.
Appeal Brief for U.S. Appl. No. 10/412,017, filed on Apr. 27, 2015, 23 pages.
Examiner's Answer to Appeal Brief for U.S. Appl. No. 10/412,017 dated Jul. 13, 2015, 28 pages.
Final Office Action received for U.S. Appl. No. 10/412,017, dated Jun. 8, 2010, 15 pages.
Final Office Action received for U.S. Appl. No. 10/412,017, dated Nov. 9, 2009, 12 pages.
Final Office Action received for U.S. Appl. No. 10/412,017, dated Sep. 4, 2014, 12 pages.
Non-Final Office Action received for U.S. Appl. No. 10/412,017, dated Feb. 24, 2010, 12 pages.
Non-Final Office Action received for U.S. Appl. No. 10/412,017, dated Jun. 26, 2009, 8 pages.
Non-Final Office Action received for U.S. Appl. No. 10/412,017, dated May 6, 2014, 23 pages.
Notice of Allowance received for U.S. Appl. No. 10/412,017, dated Sep. 27, 2017, 9 pages.

Reply Brief filed on Sep. 14, 2015, for U.S. Appl. No. 10/412,017, in response to Examiner's Answer to Appeal Brief dated Jul. 13, 2015, 6 pages.
Response to Advisory Action and Final Office Action filed on Feb. 9, 2010, for U.S. Appl. No. 10/412,017, dated Jan. 29, 2010, Nov. 9, 2009, 17 pages.
Response to Advisory Action and Final Office Action filed on Sep. 8, 2010, for U.S. Appl. No. 10/412,017, dated Aug. 19, 2010, Jun. 8, 2010, 18 pages.
Response to Final Office Action filed on Aug. 9, 2010, for U.S. Appl. No. 10/412,017, dated Jun. 8, 2010, 17 pages.
Northwest-Continental alliance notes: Passengers who belong to both American's and US Airways' frequent flyer programs will be able to combine miles from both airlines to redeem an award for travel on either airline., 25 pages.
International Preliminary Report on Patentability received for PCT Application No. PCT/US2004/011067, dated Jan. 16, 2006, 4 pages.
International Written Opinion received for PCT Patent Application No. PCT/US2004/011067 dated Dec. 16, 2005, 3 pages.
International Search Report received for PCT Patent Application No. PCT/US2004/011066, dated Oct. 27, 2005, 2 pages.
International Written Opinion received for PCT Patent Application No. PCT/US2004/011066, dated Jul. 26, 2007, 3 pages.
Advisory Action received for U.S. Appl. No. 09/734,044 dated May 2, 2008, 3 pages.
International Search Report received for PCT Patent Application No. PCT/US2004/011067, dated Dec. 16, 2005, 1 page.
International Preliminary Report on Patentability received for PCT Application No. PCT/US2004/011066 dated Jul. 22, 2008, 4 pages.
Office Action received for Canadian Patent Application No. 2,431,786, dated Nov. 22, 2011, 3 pages.
Response to Office Action filed on May 15, 2012 for Canadian Patent Application No. 2,431,786, dated Nov. 22, 2011, 11 pages.
Final Office Action received for Chinese Patent Application No. 200480015567.0, dated Jan. 19, 2011, 14 pages (6 pages official copy and 8 pages English translation).
Office Action received for Chinese Patent Application No. 200480015567.0, dated Feb. 12, 2010, 18 pages (4 pages official copy and 14 pages English translation).
Office Action received for Chinese Patent Application No. 200480015567.0, dated Sep. 8, 2010, 12 pages (5 pages official copy and 7 pages English translation).
Response to Non Final Office Action with English translation of claims filed on Dec. 23, 2010 for Chinese Patent Application No. 200480015567.0, dated Sep. 8, 2010, 15 pages (11 pages of Official copy and 4 pages of English Pending Claims).
Response to Office Action filed on Jun. 28, 2010 for Chinese Patent Application No. 200480015567.0, dated Feb. 12, 2010, 16 pages (12 pages official copy and 4 pages English claims).
International Preliminary Report on Patentability received for PCT Application No. PCT/US2004/010084, dated Nov. 8, 2006, 4 pages.
International Search Report received for PCT Patent Application No. PCT/US2004/010084, dated Mar. 17, 2005, 4 pages.
International Written Opinion received for PCT Patent Application No. PCT/US2004/010084, dated Mar. 17, 2005, 4 pages.
Office Action received for Canadian Patent Application No. 2,431,786, dated Jul. 2, 2013, 4 pages.
Decision to Refuse for European Patent No. 01992060.2 dated Sep. 3, 2008, 20 pages.
Extended European Search Report received for European Patent No. 01992060.2 dated Jul. 28, 2005, 2 pages.
Response to Examination Report filed on Nov. 6, 2006 for European Patent No. 01992060.2, dated Jan. 9, 2006, 21 pages.
Summons to Attend Oral Proceedings for European Patent No. 01992060.2 mailed on Apr. 16, 2008, 11 pages.
Summons to Oral Proceedings for European Patent No. 01992060.2 mailed on Oct. 4, 2011, 13 pages.
First Examination Report received for Australian Patent No. 2002232534, dated Oct. 16, 2006, 4 pages.
Response to First Examination Report filed on Nov. 30, 20016 for Australian Patent No. 2002232534, dated Oct. 12, 2006, 18 pages.
Response to Second Examiner's Report filed on Jun. 28, 2007 for Australian Patent No. 2002232534, dated Dec. 8, 2006, 2 pages.

(56) References Cited

OTHER PUBLICATIONS

Second Examiner's Report received for Australian Patent No. 2002232534, dated Dec. 8, 2006, 1 page.
Amendment filed for Australian Patent No. 2007221836 filed on Apr. 7, 2008, 11 pages.
Response to Office Action filed on Jan. 2, 2014 for Canadian Patent Application No. 2,431,786, dated Jul. 2, 2013, 15 pages.
Office Action received for Canadian Patent Application No. 2,431,786, dated Jul. 31, 2014, 4 pages.
International Preliminary Report on Patentability received for PCT Application No. PCT/US2001/047446, dated Apr. 16, 2004, 6 pages.
Written Opinion received for PCT Application No. PCT/US2001/047446, dated Aug. 26, 2003, 6 pages.
International Search Report received for PCT Application No. PCT/US2001/047446, dated Sep. 11, 2002, 2 pages.
Decision on Pre-Appeal Brief Request received for U.S. Appl. No. 09/734,044, mailed on Jul. 11, 2008, 2 Pages.
Appeal Decision Received for U.S. Appl. No. 10/412,017, mailed on Jul. 20, 2017, 7 pages.
Appeal Decision Received for U.S. Appl. No. 10/412,194, mailed on Jun. 13, 2017, 16 Pages.

\* cited by examiner

FIG. 9

Win Your Dream Car on XYZ Motors! 103

Instant Win Prizes

- $50,000.00 towards any car on XYZ Motors
- 50 Oil Changes
- 25 Car Washes

How to Enter and Play:

Each time you submit bid in an auction you receive a game card. Scratch off the three squares that cover the faces of Manny, Moe and Jack and you win!

To Opt-In, select:

☐ 107

YES! I Want to Win!!!

FIG. 22

Win Your Dream Car on XYZ Motors!

Instant Win Prizes

- $50,000.00 towards any car on eBay Motors
- 50 Oil Changes
- 25 Car Washes

How to Enter and Play:

Each time you submit bid in an auction you receive a game card. Scratch off the three squares that cover the faces of Manny, Moe and Jack and you win!

To Opt-Out, select:

109

No! I do not want to Win!!!

Bid Confirmation     117

---

Fun With Ballet for Future Ballerina Dancers

Item # 1545690652

Books:Children:Classics

Bidding is Closed for this item - You are the winner!

Item Price:                 $5.00
Shipping Instructions:    Please submit payment prior to shipment
Other Instructions:       Pay quickly to win an award!!!
                              The sooner you pay, the more valuable the award!!!

FIG. 25

Payment Confirmation 149

You sent US $3.99 to Jski (410) for Item #1545690652.

Description of Item
    Books: Children:Classics
    "Fun With Ballet for Future Ballerina Dancers"
        Books:Children:Classics
Date and time of Payment
    July 10, 2002 at 2:00 PM, PDT

FIG. 26

Listing Description Webpage 186

Book - FUN WITH BALLET FOR FUTURE BALLERINA DANCERS

Good condition
Hard cover
Published 1955
Illustrated
50 Pages

Try the easy to use XYZ Payment Service to pay for this item!!!

Thank You

FIG. 28

Listing Description Webpage  339

Book - FUN WITH BALLET FOR FUTURE BALLERINA DANCERS

Good condition
Hard cover
Published 1955
Illustrated
50 Pages

FIG. 31

METHOD AND SYSTEM TO FACILITATE AN ONLINE PROMOTION RELATING TO A NETWORK-BASED MARKETPLACE

CLAIM OF PRIORITY

This application is a continuation of U.S. application Ser. No. 10/412,017, filed Apr. 11, 2003, which is hereby incorporated by reference in its entirety.

FIELD OF THE INVENTION

The present invention relates generally to the field of online promotions and, more specifically to a method and a system to facilitate an online promotion relating to network-based marketplace.

BACKGROUND OF THE INVENTION

Sellers have traditionally utilized promotional games to incentivize buyers to perform a commercial activity. For example, a seller may offer a prize or an opportunity to win a prize in response to the buyer purchasing a product or sampling a service or performing some other predetermined activity. With the advent of the Internet, the techniques and practices utilized to conduct promotions in an online environment create a number of challenges.

One challenge is distinguishing a user, located at a client machine, who desires to participate in an online promotion from a user who does not desire to participate in an online promotion. Typically a user is informed of an online promotion with a first web page that promises a prize, game card or some other promotional device in exchange for the user performing a predetermined activity. The user elects to participate in the online promotion by utilizing the first web page. Subsequently, the user performs the desired predetermined activity usually by requesting a second web page that is associated with the activity. If the user has elected to participate, then the online promotion is delivered.

The above described sequence of events presents a challenge to a client machine that operates on the World Wide Web (WWW) because the WWW is intrinsically stateless (i.e., each Web page is processed without any knowledge of previous pages). Thus, the users election, as requested with the first web page, is not immediately available to the second web page that is associated with the predetermined activity.

SUMMARY OF THE INVENTION

A method to facilitate an online promotion in a network-based marketplace includes causing a user-provided election to participate in the online promotion to be recorded on a client machine associated with a user; and responsive to a trigger event, requesting a determination of the user-provided election as recorded on the client machine associated with the user, the determination to cause a presentation of the online promotion if so elected.

A method to facilitate an online promotion in a network-based marketplace, the method includes, at a client machine associated with a user, recording a user-provided election to participate in the online promotion on the client machine; responsive to a trigger event, reading the user-provided election; and if the user-provided election indicates participation in the online promotion, presenting the online promotion to the user.

The invention extends to a machine-readable medium for storing instructions that, when executed by the machine, cause the, machine to execute any one of the methods described herein. Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which:

FIG. 9 illustrates an exemplary embodiment of an activity table and an exemplary award table within a database maintained by the exemplary network-based marketplace;

FIGS. 22-31 illustrates user interface screens relating to a network-based marketplace.

DETAILED DESCRIPTION

Methods and systems to facilitate online promotions in a network-based marketplace are described. In the following description, for purposes of explanation, numerous specific details are set forth in order to provide a thorough understanding of the present invention. It will be evident, however, to one skilled in the art that the present invention may be practiced without these specific details.

In general, embodiments described below feature a network-based marketplace that allows users of the marketplace to transact products or services identified in listings, that are offered for sale by sellers. In addition, various embodiments of the network-based marketplace additionally allow users to post and view listings that may be transacted outside the electronic marketplace.

In one embodiment, the present invention is implemented as a network-based service that may be accessed through, for example, the Internet using a client application program such as a web browser. In another embodiment, the present invention is implemented as a network-based service that provides an application program interface that may be accessed through, for example, the Internet using a client application program such as a seller software tool.

Hardware and Software Components

Figure 1:
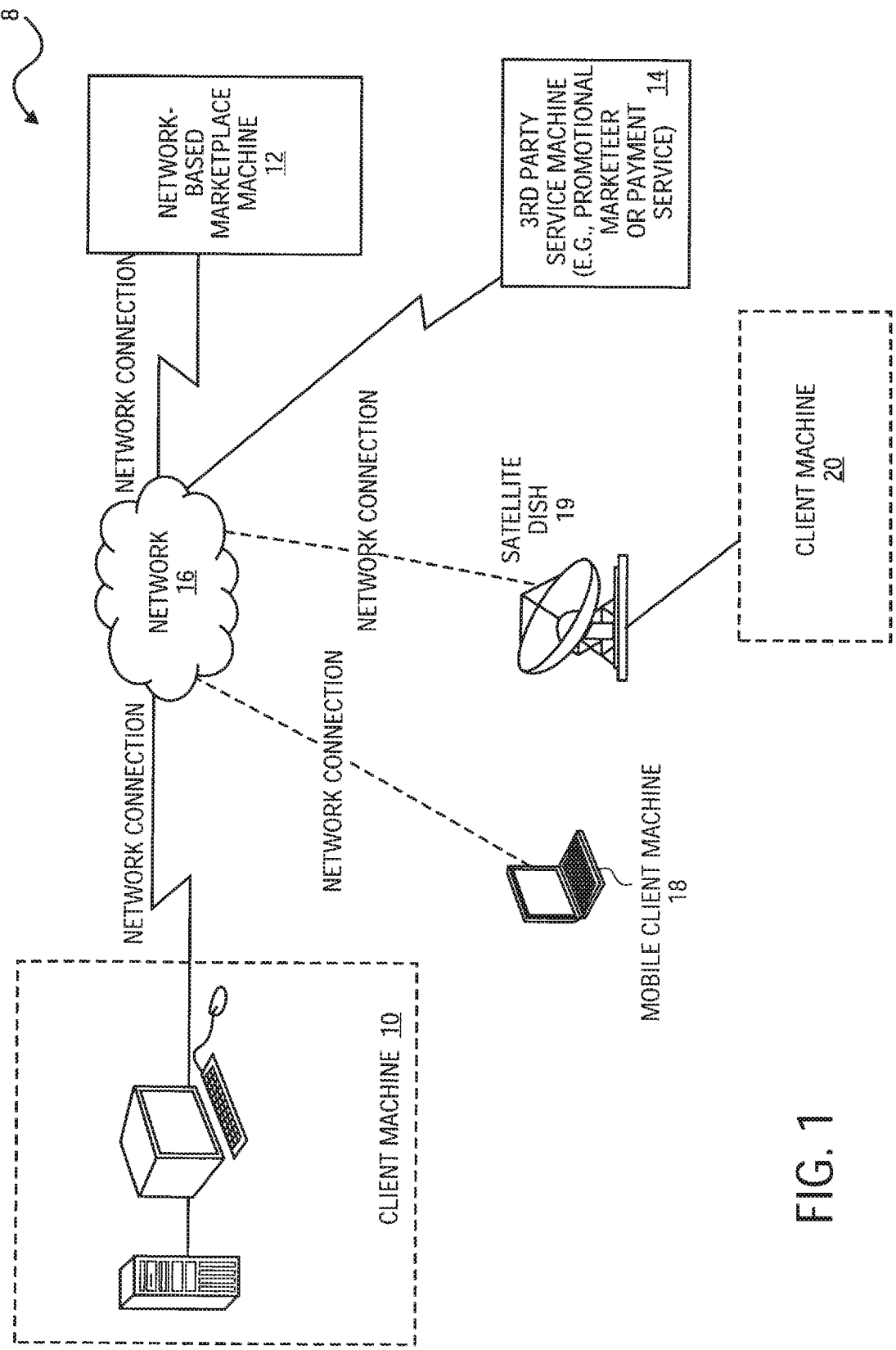
FIG. 1 is a block diagram illustrating an exemplary network-based marketplace machine, client machine, and a third party service machine.

FIG. 1 is a block diagram illustrating hardware components that may form part of a exemplary network-based marketplace 8. A client machine 10, a network-based marketplace machine 12, and a third party service machine 14 are coupled via a network 16. In some embodiments, users may participate in the marketplace using the mobile client machines 18, or the base client machines 20 coupled to the network 16 via a satellite connection 19.

Figure 2:
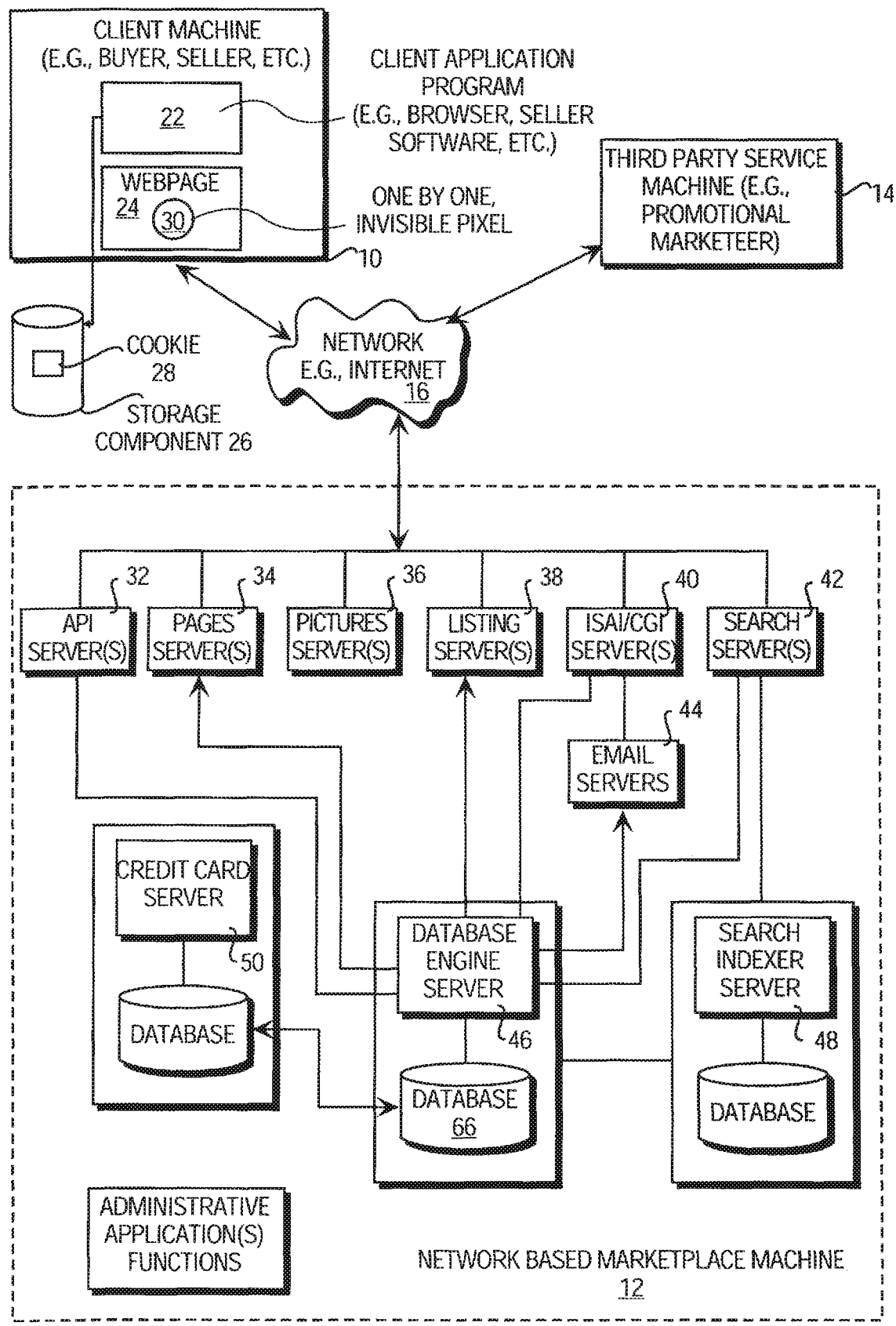
FIG. 2 is a block diagram illustrating software and hardware components utilized by an exemplary network-based marketplace.

FIG. 2 is a block diagram illustrating exemplary software and hardware components. The client machine 10 hosts a client application program 22, (e.g., a web browser, seller application, etc) and also stores and displays a communication in the exemplary form of a web page 24 a storage component 26 (e.g., a dish device) is also shown coupled to the client machine 10.

The client application program 22 may be embodied as a browser (for example, a Microsoft Internet Explorer browser developed by Microsoft™ Corporation of Richmond, Wash. or Navigator™ browser developed by Netscape of Mountain View, Calif.). The client application program 22 executes under an operating system (for example, Microsoft™ Windows developed by Microsoft™ Corporation or MacOS X developed by Apple Computers of Cupertino, Calif.). The client application program 22 may also be embodied as seller software enabling a seller to configure listings that encourage buyers to participate in various network-based marketplace activities. The client application program 22 may read the web page 24, which may include information that is written to the storage component 26. The client application program 22 may store information on the storage component 26 in the form of a cookie 28. Further, the web page 24 may include a one-by-one invisible pixel 30 in the form of HTML code that does not visibly appear on the web page 24 and directs the browser to perform various operations.

Referring now to FIG. 2, the network-based marketplace machine 12 is shown, in one embodiment to include one more of a number of types and servers, for example communication servers in the exemplary form of application program interface (API) servers 32, page servers 34 that deliver web pages (e.g., markup language documents), picture servers 36 that dynamically deliver images to be displayed within web pages, listing servers 38, processing servers in the exemplary form of CGI (or ISAPI) servers 40 that provide an intelligent interface to back-end servers, and search servers 42 that handle search requests to the network-based marketplace machine 12. The e-mail servers 44 provide, inter alia, automated e-mail communications to users of the network-based marketplace machine 12. The back-end servers include a database engine server 46, a search index server 48, and a credit card database server 50, each of which maintains and facilitates access to a respective database.

Figure 3:
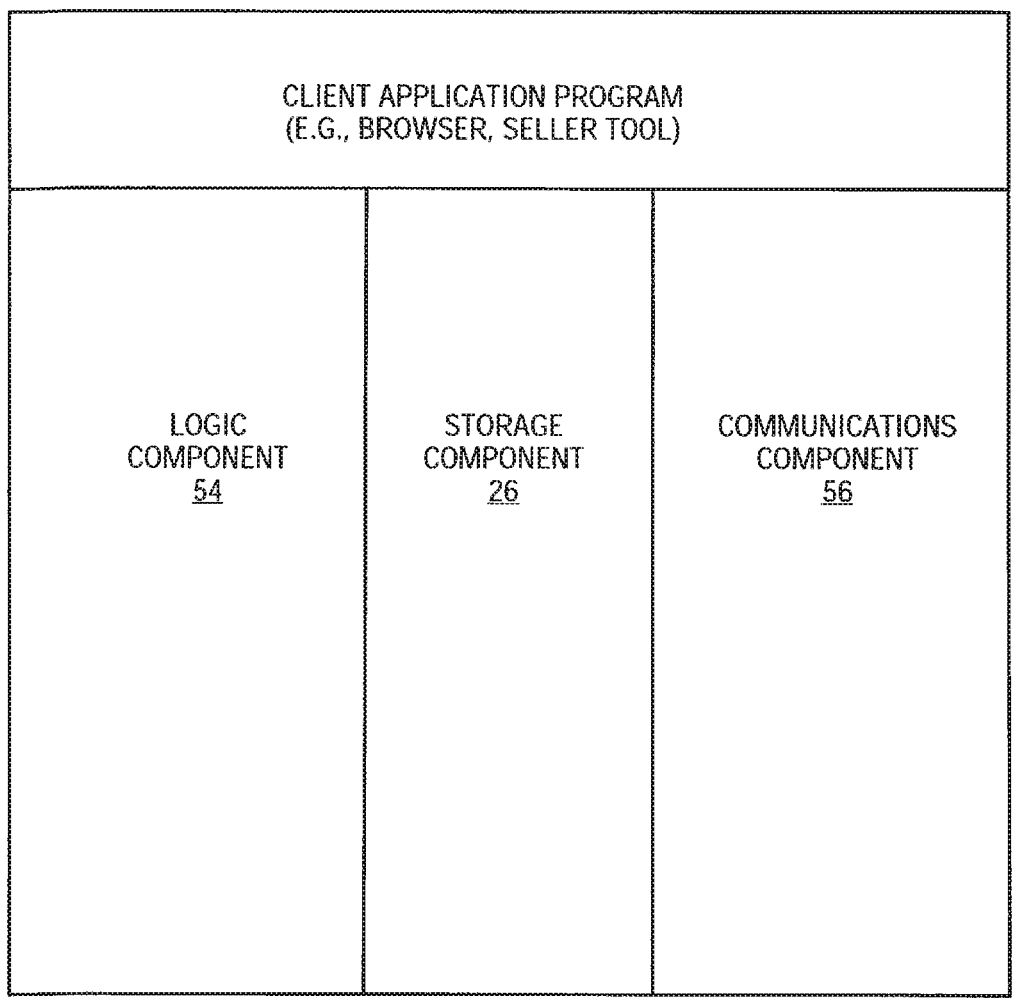
FIG. 3 is a block diagram illustrating an exemplary client application program.

FIG. 3 is a block diagram illustrating an exemplary architecture of the client application program 22. The client application program 22 includes a logic component 54, the storage component 26 and a communications component 56. The client application program 22 executes under the control of an operating system on the client machine 10, as previously described, and may be embodied as a browser, seller tool or some other application that is utilized to facilitate electronic commerce in the network-based marketplace machine 12.

Figure 4:
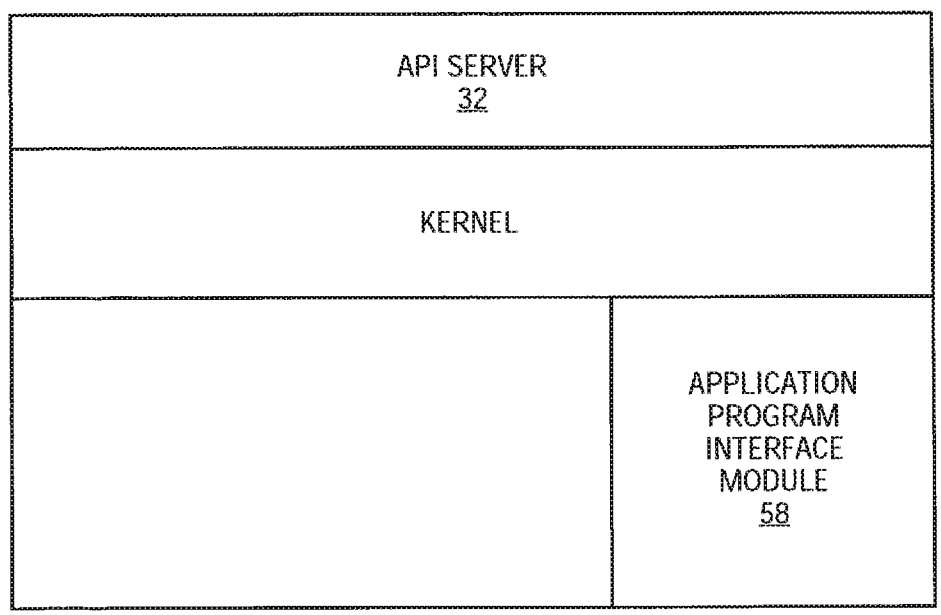
FIG. 4 is a block diagram illustrating an exemplary application program interface utilized for receiving a batch file and communicating messages.

FIG. 4 is a block diagram illustrating an exemplary application program interface in the form of an application program interface module (APIM) 58. The APIM 58 executes on the API server 32 and under kernel operating software to receive a batch file that is created by a seller and that is utilized to facilitate electronic commerce in the network-based marketplace machine 12.

Figure 5:
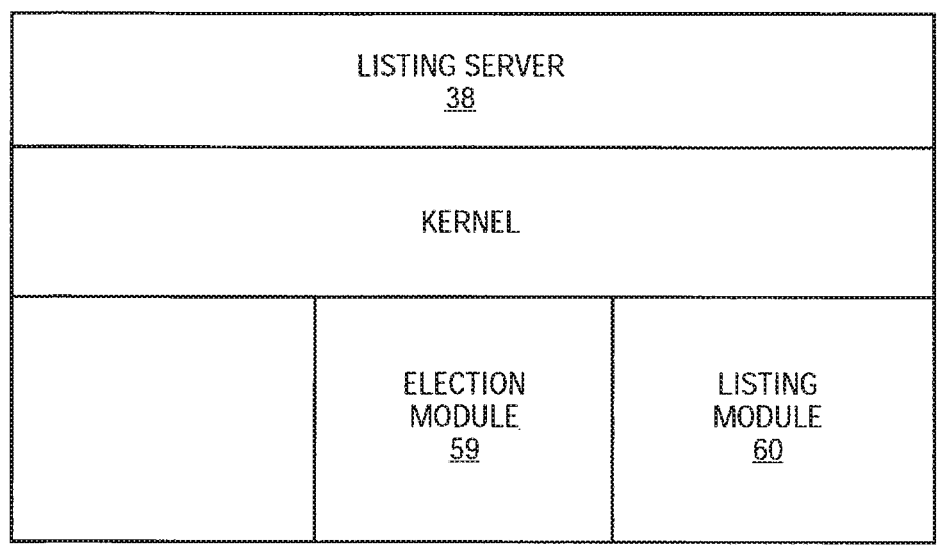
FIG. 5 is a block diagram illustrating an exemplary election module and an exemplary listing module for presenting exemplary user interfaces.

FIG. 5 is a block diagram illustrating an election module 59 and a listing module 60, according to an exemplary embodiment of the present invention, utilized for communicating user interfaces. The election module 59 and the listing module 60 operate under the control of kernel system software on the listing server 38.

Figure 6:
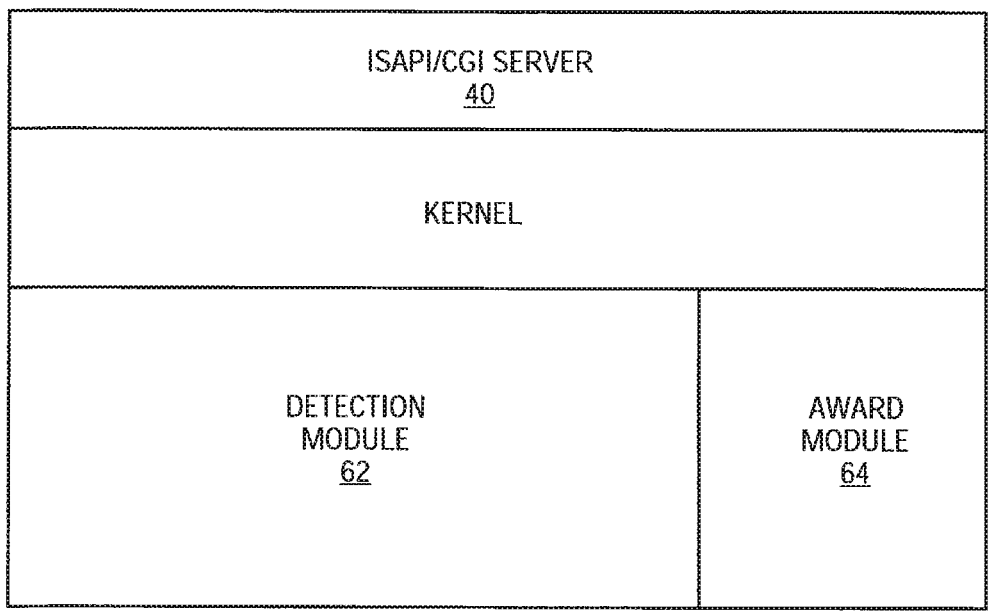
FIG. 6 is a block diagram illustrating an exemplary detection module and an exemplary award module utilized for promotion-related processing in the network-based marketplace.

FIG. 6 is a block diagram illustrating a detection module 62 and an award module 64 according to an exemplary embodiment of the present invention. The detection module 62 is utilized to detect events related to promotions and to record user-associated information. The award module 64 is utilized to determine the value of an award and award a user. The detection module 62 and the award module 64 operate under the control of kernel system software on the ISAPI/CGI server 40.

Figure 7:
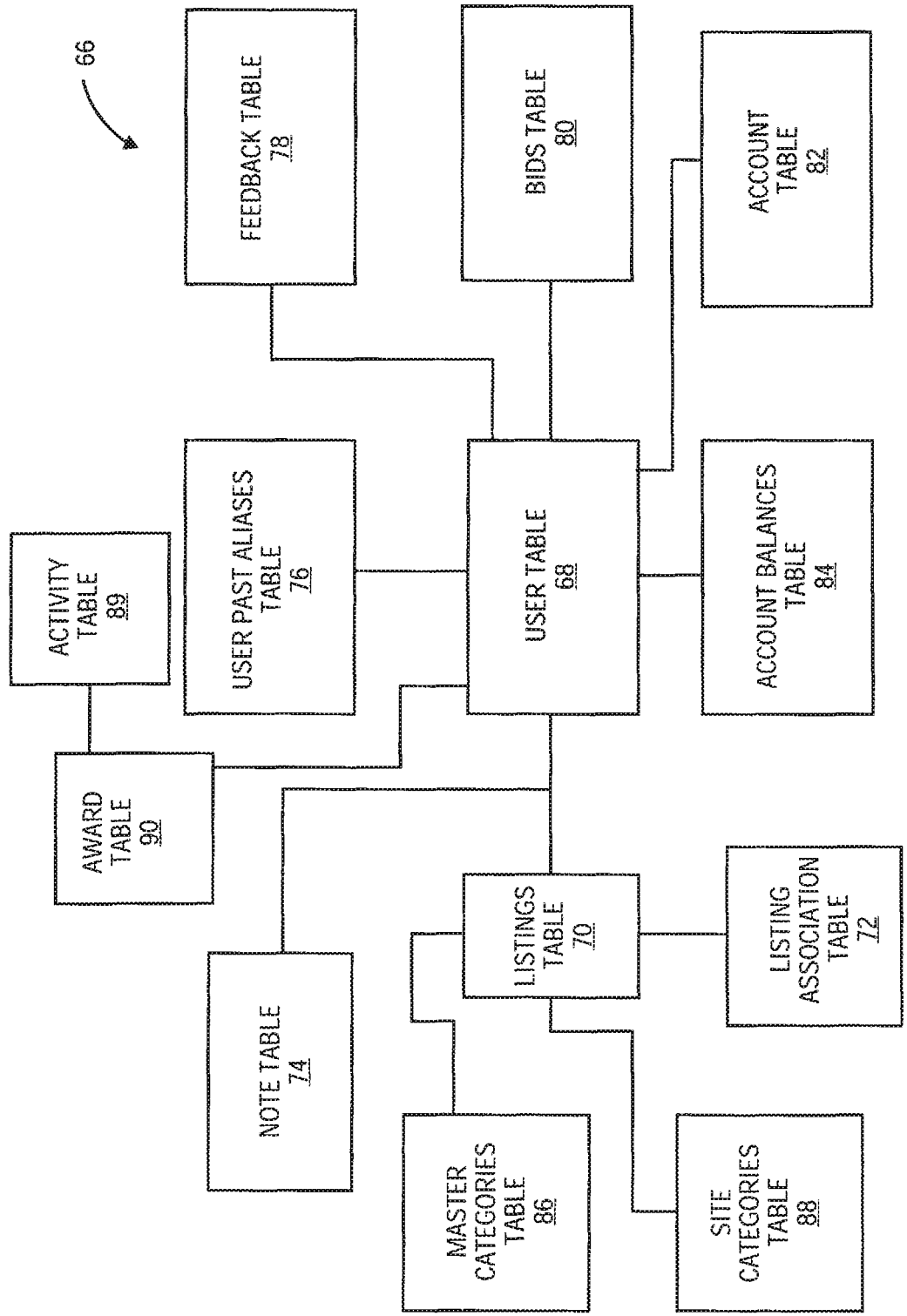
FIG. 7 is a database diagram illustrating an exemplary database maintained and accessed via a database engine server that supports the network-based marketplace.

FIG. 7 is a database diagram illustrating an exemplary database 66 maintained and accessed via a database engine server 46 that supports the network-based marketplace machine 12. The database 66 may, in one embodiment, be implemented as a relational database, and includes a number of tables having entries, or records, that are linked by indices and keys. In an alternative embodiment, the database 66 may be implemented as a collection of objects in an object-oriented database.

The database 66 includes a user table 68, which contains a record for each user of the network-based marketplace machine 12. A user may operate as a seller, buyer, or both, within the network-based marketplace machine 12. The database 66 also includes a listings table 70 that may be linked to the user table 68 and a listing association table 72. A record in the user table 68 is associated with a user and may be linked to multiple items that are being, or have been, transacted via the network-based marketplace machine 12.

The database 66 also includes a note table 74 populated with note records that may be linked to one or more listing records within the listing table 70 and/or to one or more use records within the user table 68. Each note record within the note table 74 may include, inter alia, a comment, description, history or other information pertaining to an item or service being auctioned via the network-based marketplace machine 12, or to a user of the network-based marketplace machine 12.

A number of other tables are also shown to be linked to the user table 68, namely a user past aliases table 76, a feedback table 78, a bids table 80, an accounts table 82, and an account balances table 84.

A master categories table 86 stores records for listing categories presented across multiple views (or presentations) of listing categories via regional or community sites presented by the network-based marketplace machine 12. A site categories table 88 stores records indicating which listing categories are to be presented for respective regional or community sites, (e.g., a country, region or city specific site) presented by the network-based marketplace machine 12.

The database 66 is also shown to include an activity table 89 and an award table 90 to enable an exemplary embodiment of the present invention. The activity table 89 and the award table 90 are utilized to associate a user activity to an elapsed time and an award.

Figure 13:
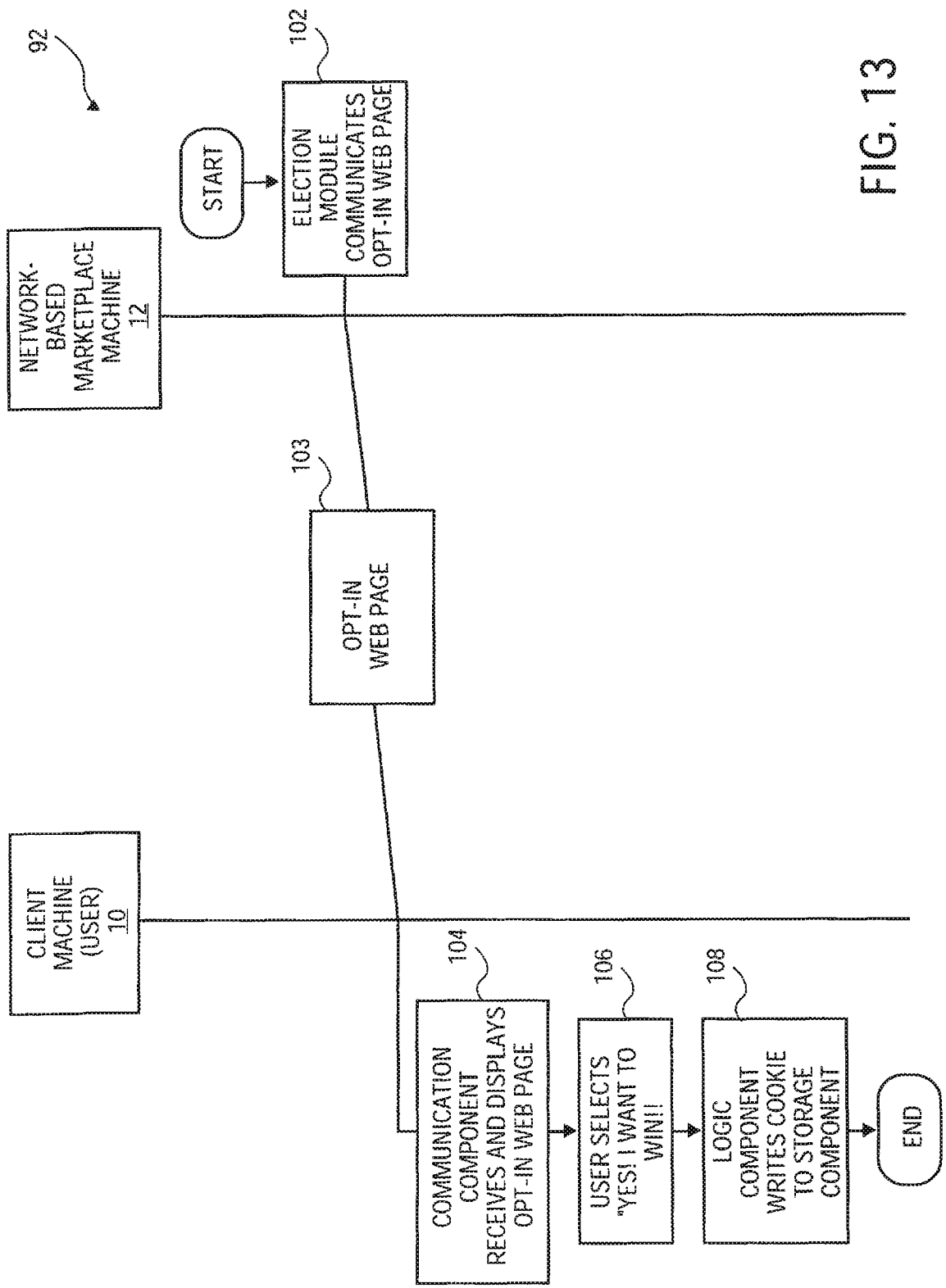
FIG. 13 is an interactive flow chart partially illustrating a method, according to an exemplary embodiment of the present invention, to facilitate an online promotion in a network-based marketplace.

Method to Facilitate an Online Promotion Relating to a Network-Based Marketplace FIG. 13 is an interactive flow chart illustrating a method 92, according to an exemplary embodiment of the present invention, to facilitate an online promotion in a network-based marketplace. Client and server operations are illustrated.

At box 102, the election module 59 on the listing server 38 in the network-based marketplace machine 12 generates and communicates an opt-in web page 103 to the user at the client machine 10. In one embodiment, the opt-in web page 103 is communicated to the user in response to the user selecting a promotion screen element that may appear on various pages presented by the network-based marketplace or other third-party services. In other embodiments, the opt-in web page 103 is communicated in response to a predetermined user activity.

Figure 23:
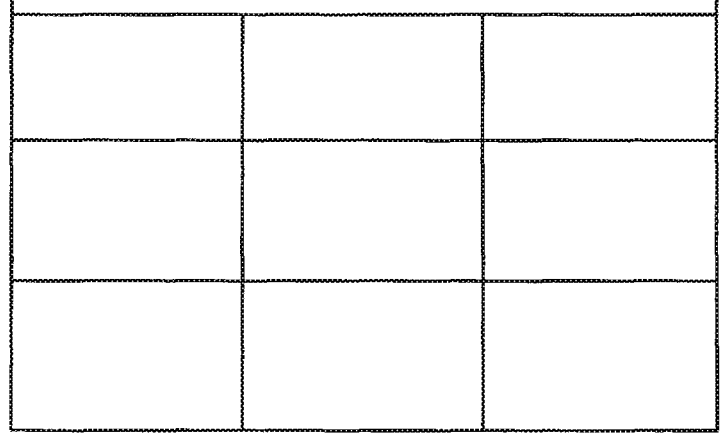

At box 104, the communications component 56 at the client machine 10 receives and displays the opt-in web page 103 to the user. FIG. 22 illustrates an exemplary embodiment of the opt-in web page 103 that includes an exemplary user-provided election in the form of an opt-in box 107. The opt-in web page 103 informs the user that each time a bid is submitted in an auction they will receive an exemplary online promotion in the form of a promotion game card 125 that appears in a pop-up window screen at the client machine 10 and enables the user to win a prize. FIG. 23 illustrates an exemplary promotion game card 125 in the form of a virtual scratch card game whereby the user wins a prize by "scratching" out the squares covering the faces of Manny, Moe and Jack. Other embodiments of the promotion game card 125 may include a watch and win promotion game card that provides a code to the user. The user must then watch a television program to see if the provided code corresponds to a code displayed during the television program.

Returning to FIG. 13, at box 106, the user asserts an election to opt-in to a promotional contest by selecting the opt-in box 107 "Yes! I want to win!!!" Otherwise the user implicitly opts-out.

At box 108, the logic component 54 on the client machine 10 writes the contents (e.g., a yes/no indication) of the opt-in box 107 into a cookie 28 located on the storage component 26 on the client machine 10 and ends.

Figure 14:
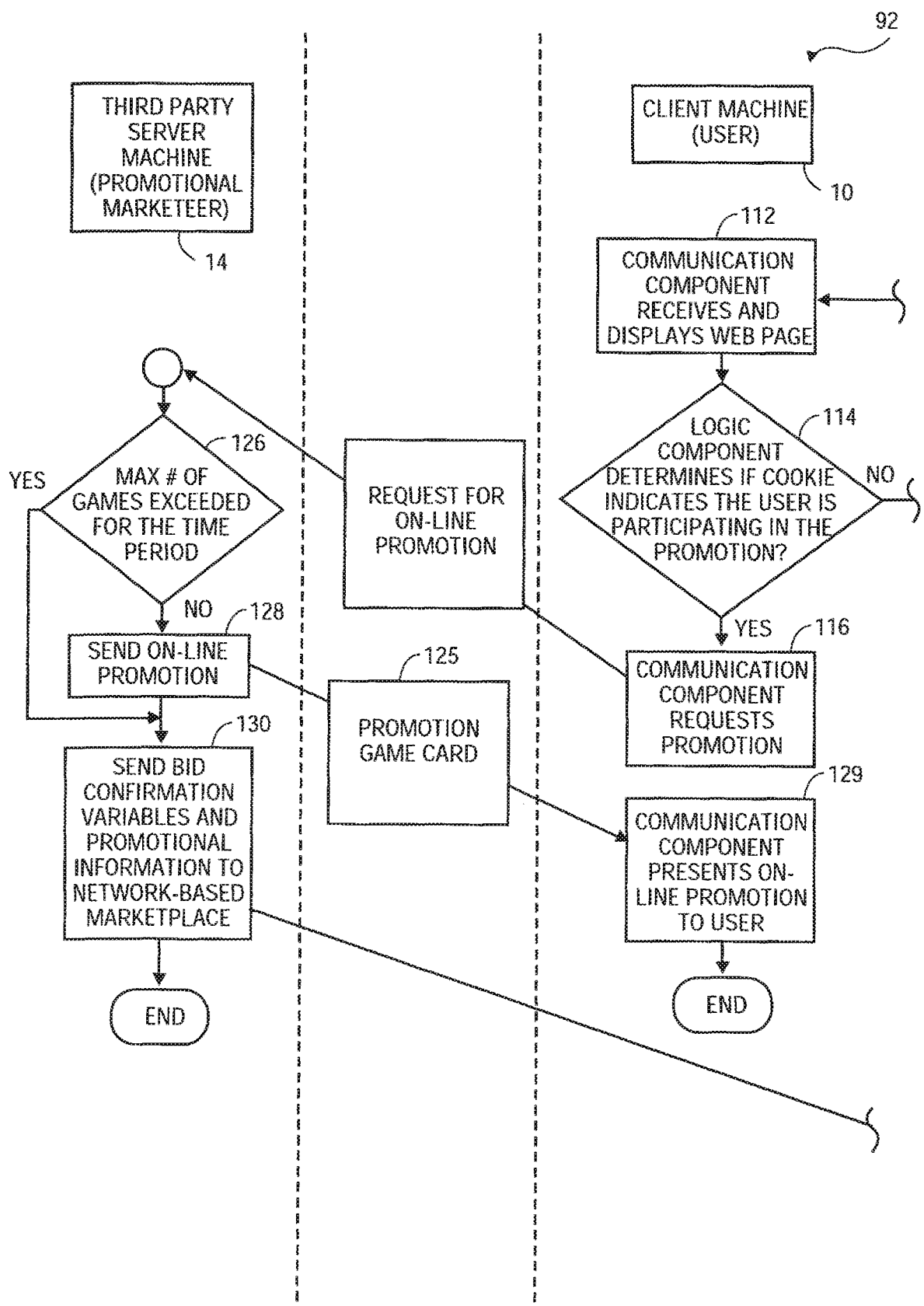
FIG. 14 is an interactive flow chart partially illustrating the method, according to an exemplary embodiment of the present invention, to facilitate an online promotion relating to a network-based marketplace.
Figure 14:
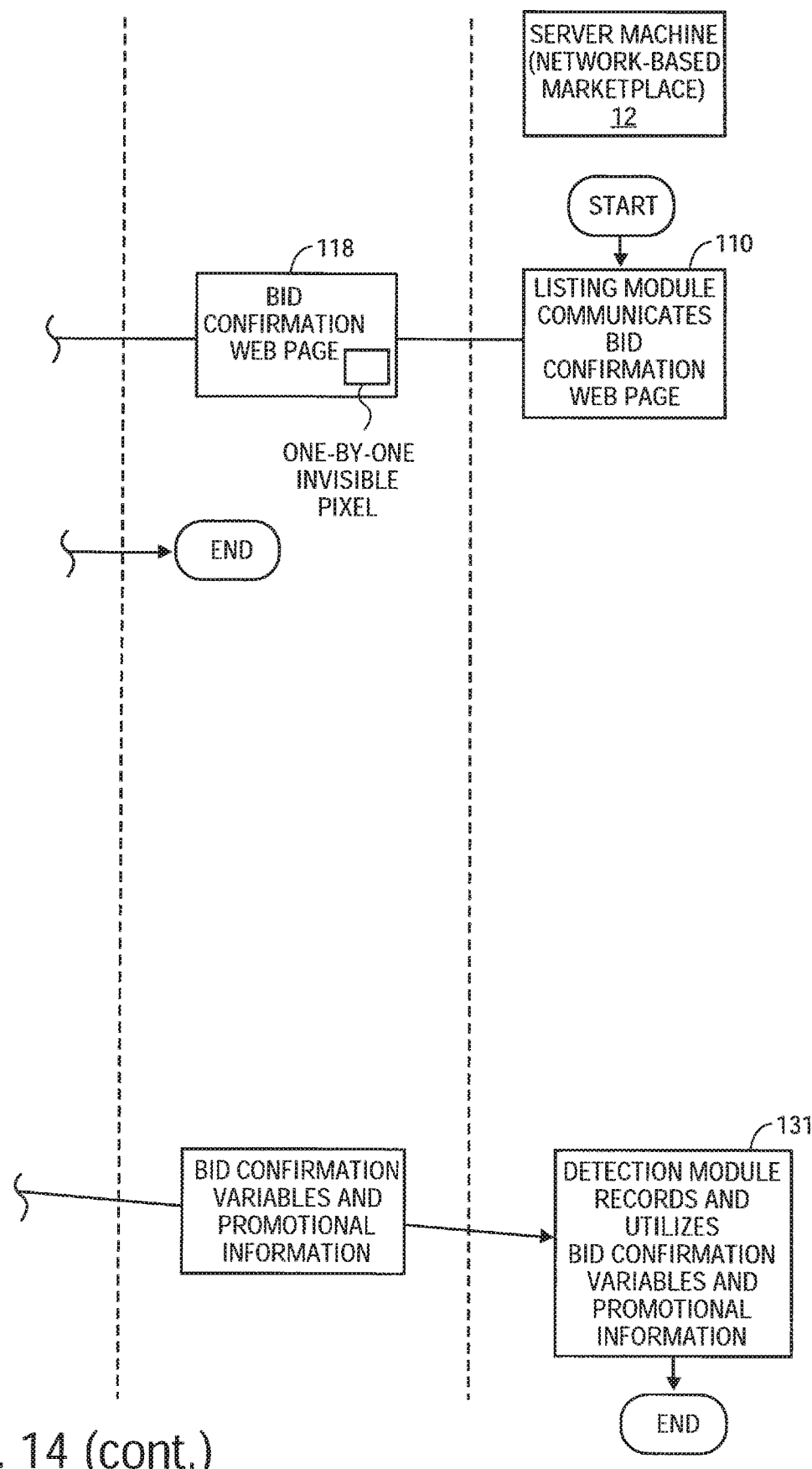

FIG. 14 is an interactive flow chart further illustrating a method 92, according to an exemplary embodiment of the present invention, to facilitate an online promotion in a network-based marketplace 8. Client and server operations are illustrated.

Figure 10:
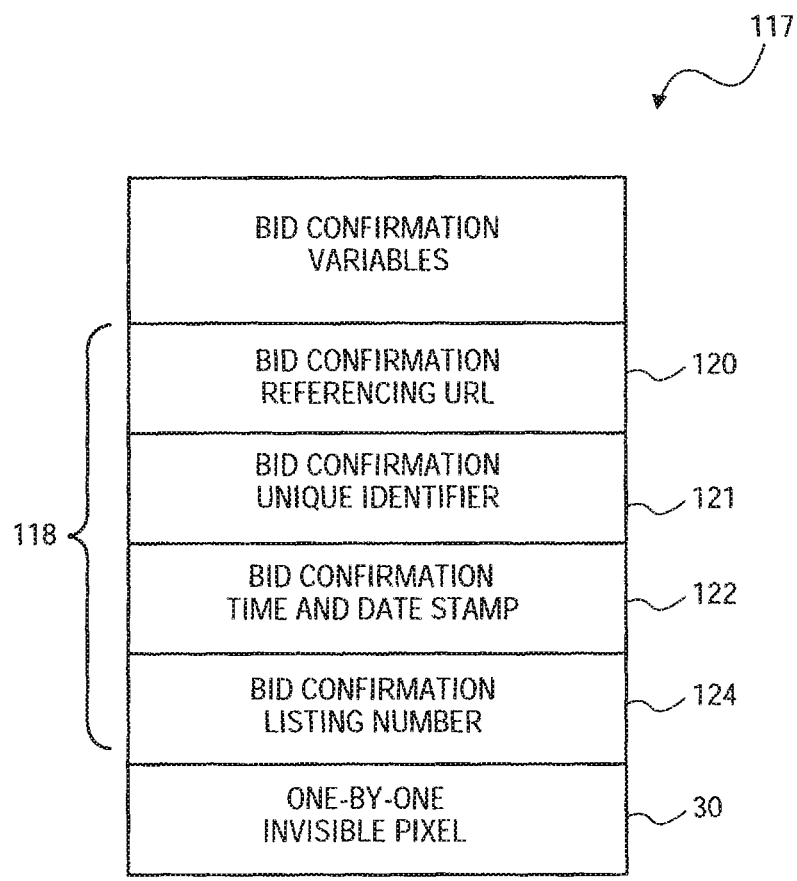
FIG. 10 illustrates an exemplary embodiment of Java script variables embedded in a bid confirmation web page.

At box 110, the listing module 60 communicates a bid confirmation web page 117, an example of which is illustrated in FIG. 25, in response to the user at the client machine 10 performing an exemplary triggering event in the form of submitting a bid. Other embodiments may include communicating a web page in response, for example, to the user entering a listing, making a purchase, updating user profile information or any other activity performed by the user in a network-based marketplace 8. As illustrated in FIG. 10, the bid confirmation web page 117, according to an exemplary embodiment of the present invention, includes exemplary user information in the form of JavaScript that contains bid confirmation variables 118 including a bid confirmation referencing URL 120 that identifies bid confirmation activity that is utilized by the third party service machine 14 to verify that the information received from the client machine 10 indeed originates from a trusted source (e.g., the network-based marketplace machine 12); a bid confirmation unique identifier 121 that is utilized by the third party service machine 14 and the network-based marketplace machine 12 to identify the user associated with the client machine 10; a bid confirmation time and date stamp 122 that is utilized to perform qualification checks (e.g., restricting a number of contest entries within a predetermined time period), a bid confirmation listing number 124 that is utilized to identify the item or service associated with the bid confirmation and the one-by-one invisible pixel 30.

Returning to FIG. 14, at box 112, the communications component 56 at the client machine 10 receives and displays the bid confirmation web page 117. The communications component 56 passes control to the logic component 54 that reads the one-by-one invisible pixel 30 from the HTML CODE of the bid confirmation web page 117. The one-by-one invisible pixel 30 directs the communications component 54 to read the cookie 28 from the storage component 26 and determine if the user has elected to participate in the online promotion. If the user has elected to participate in the online promotion then the logic component 54 invokes the communications component 56 and processing continues at box 116. Otherwise processing ends.

At box 116, the communications component 56 reads the one-by-one invisible pixel 30 which directs the communications component 56 to generate a non-visible pop-up window (e.g., to display the online promotion), to request the online promotion from the third party service machine 14 and to communicate the bid confirmation variables 118 to the third party service machine 14 including the bid confirmation referencing URL 120, the bid confirmation unique identifier 121, the bid confirmation time and date stamp 122, and the bid confirmation listing number 124. In one embodiment, the client machine 10 communicates the bid confirmation variables 118 as URL parameters to the third party service machine 14. In other embodiments the client machine 10 may communicate the bid confirmation variables 118 in a network message.

At decision box 126, the third party service machine 14 utilizes the bid confirmation time and date stamp 122 and the bid confirmation unique identifier 121 to identify if the request for a promotional game will cause the user at the client machine 10 to exceed the maximum number of promotional games in a predetermined period of time. If the user has exceeded the maximum number of promotional games, then the promotional game card 125 is not sent to the user and processing continues at box 130. Otherwise, at box 128, the third party service machine 14 records an additional promotional game played by the user in a database at the third party service machine 14 and communicates the promotion game card 125 to the client machine 10.

At box 129, the communication component 56, at the client machine 10, receives and populates the pop-up screen with the promotion game card 125 thereby enabling the user to view and participate in the online promotion.

At box 130, the third party service machine 14 communicates the bid confirmation variables 118 and promotional information 127 regarding the promotion (e.g., number of games played by the user, number of prizes won by the user, etc.) to the network-based marketplace machine 12.

At box 131, the detection module 62, at the network-based marketplace machine 12, receives the bid confirmation variables 118 and promotional information 127. The detection module 62 utilizes the bid confirmation variables 118 and the promotional information 127 to search the database 66 in the network-based marketplace machine 12 and obtain additional information for the purpose of generating management, demographic, and marketing reports.

Figure 24:
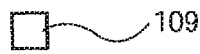

An alternate embodiment of the above method may include testing the maximum number of promotional games at the client machine 10 or at the network-based marketplace machine 12. Further, another embodiment of the present invention may present the user at the client machine 10 an opt-out election instead of the opt-in election. In this embodiment, user action is required to not participate in the promotion. Otherwise, the user is automatically prompted to complete a registration form and presented with an online promotion game. FIG. 24 illustrates a user interface screen with an opt-out election box 109, according to an exemplary embodiment of the present invention.

Figure 15:
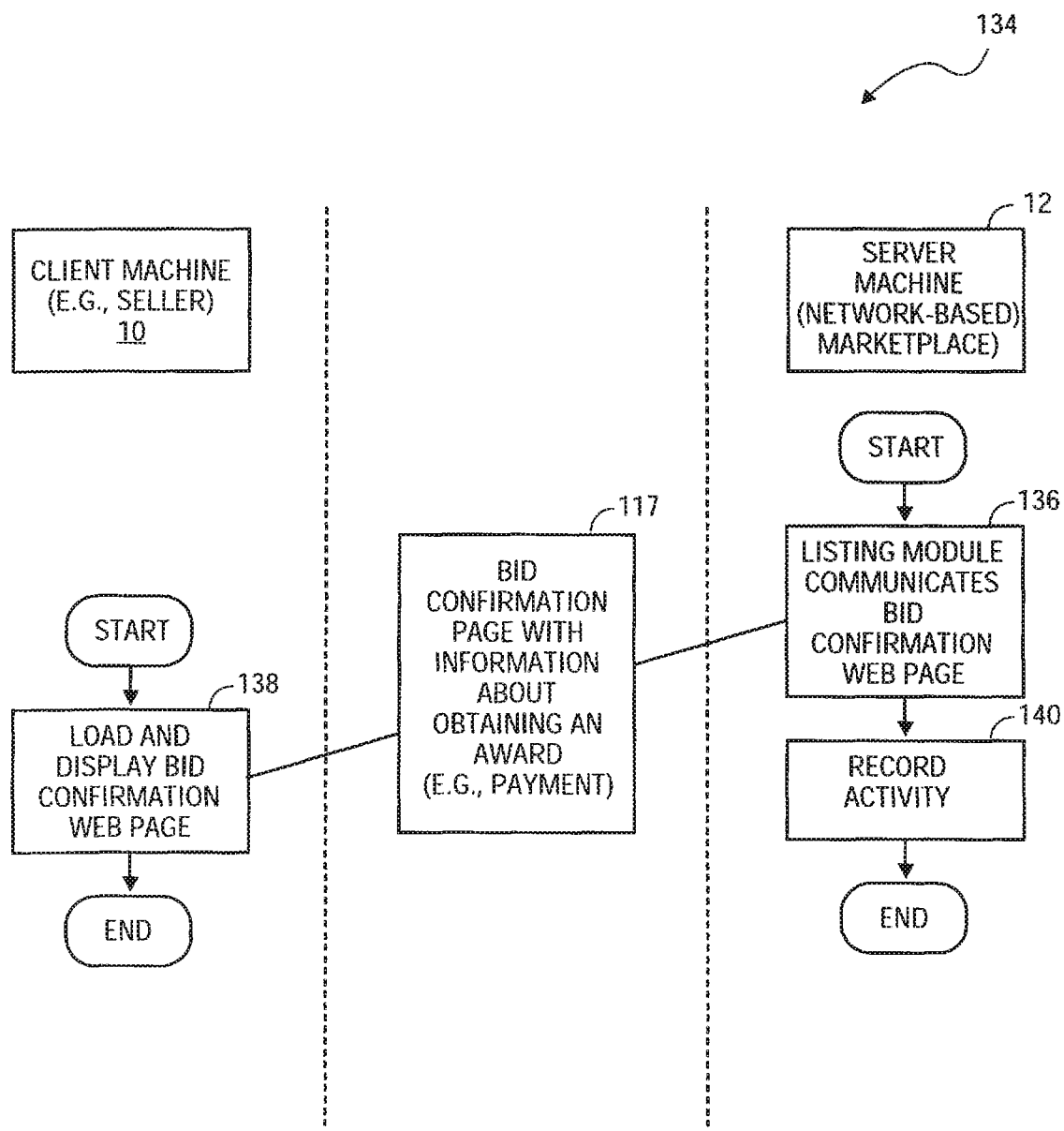
FIG. 15 is an interactive flow chart partially illustrating a method, according to an exemplary embodiment of the present invention, to incentivize a user to perform an activity relating to a network-based marketplace in a timely manner.

Method to Incentivize a Seller to Perform an Activity Relating to a Network-Based Marketplace in a Timely Manner FIG. 15 is an interactive flow chart partially illustrating a method 134, according to an exemplary embodiment of the present invention, to incentivize a user to promptly perform an activity relating to a network-based marketplace in a timely manner. Client and server operations are illustrated.

At box 136, the listing module 60, at the network-based marketplace machine 12, communicates an exemplary user-interface in the form of a bid confirmation web page 117 to the user at the client machine 10. Further, the bid confirmation web page 117 includes JavaScript bid confirmation variables 118, as previously described. In the present example the bid confirmation variables 118 include a reference time that chronicles the moment of bid confirmation in the form of the bid confirmation time and date stamp 122 that is utilized by the network-based marketplace machine 12 to compute an elapsed time.

At box 138, the client machine 10 receives and displays the bid confirmation web page 117 to the user on the client machine 10. FIG. 25 illustrates the bid confirmation web page 117 as viewed by the user at the client machine 10, according to an exemplary embodiment of the present invention. In the present example, the bid confirmation web page 117 informs the user at the client machine 10 that bidding is closed and the user at the client machine 10 is the winner of the auction for a book entitled, "Fun With Ballet for Future Ballerina Dancers." In the present example, the bid confirmation web page 117 informs the buyer that the seller requires payment prior to shipment of the book. To encourage quick payment, the bid confirmation web page 117 informs the user that prompt payment is awarded and that the value of the award may be maximized by making payment in a timely manner.

Returning to FIG. 15, at box 140, bid confirmation activity is recorded at the network-based marketplace machine 12.

Figure 16:
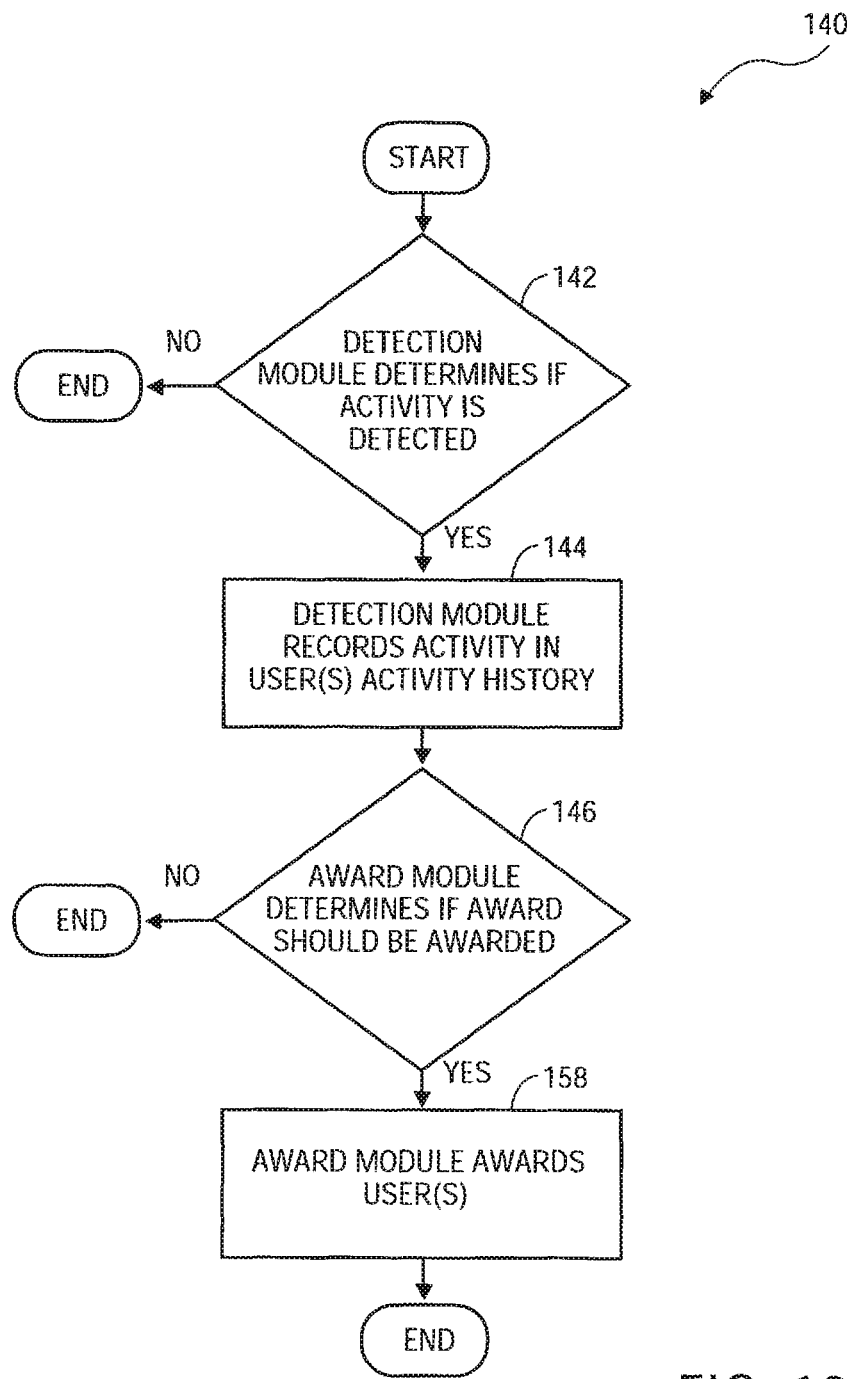
FIG. 16 is a flow chart illustrating an exemplary method to record an activity and determine if an activity should be awarded.

FIG. 16 is a flow chart illustrating the processing executed in box 140.

Figure 9:
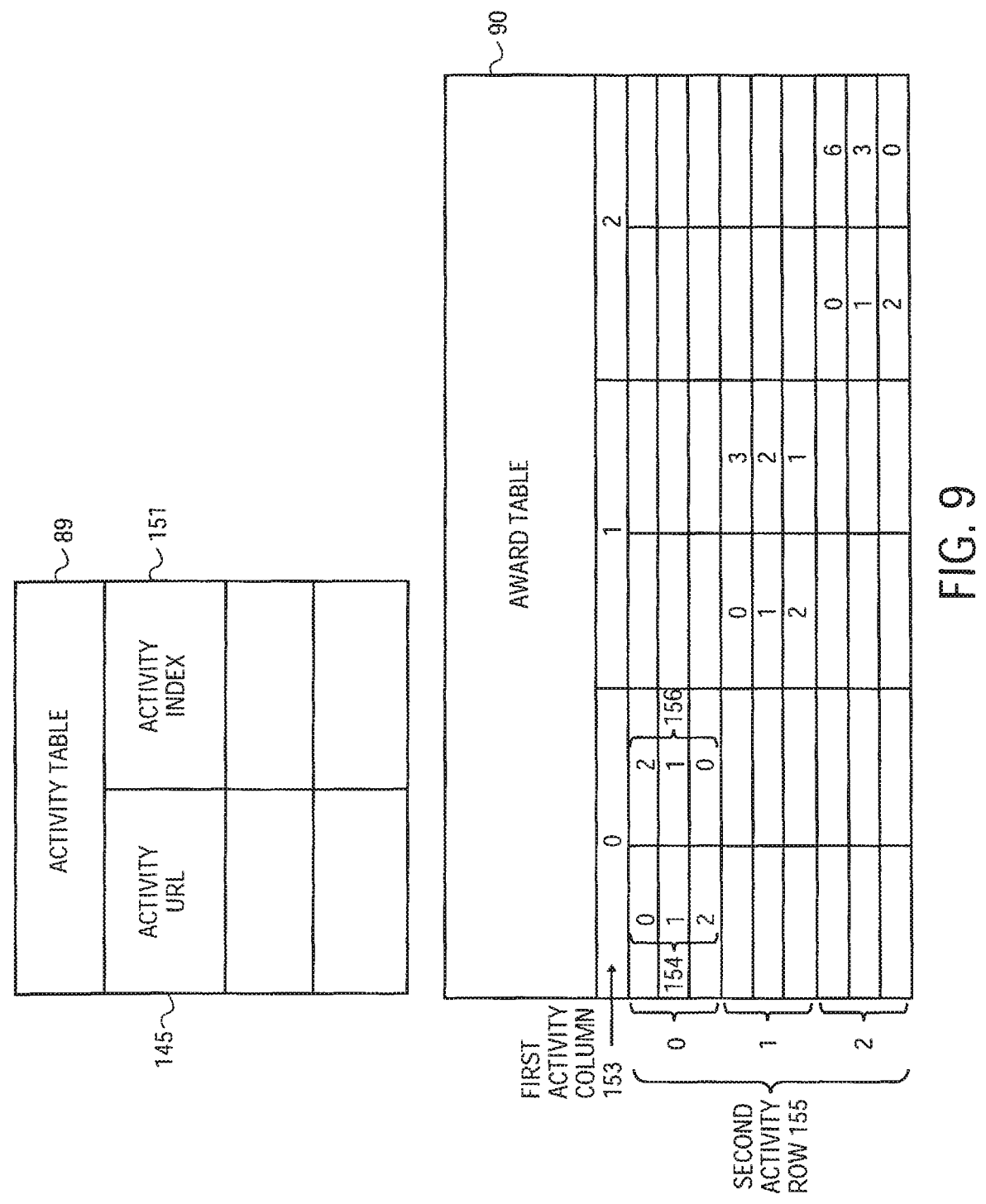

At decision box 142, the detection module 62 determines if bid confirmation is an activity that should be recorded. The detection module 62 receives the bid confirmation variables 118 and utilizes the bid confirmation referencing URL 120 to search an activity table 89 to a match an activity URL 145 as illustrated in FIG. 9. The activity URL 145 is associated with an activity index 151. Returning to FIG. 16, the detection module 62 compares the bid confirmation referencing URL 120 with the activity URL 145. The detection module 62 branches to box 144 if a match is found. Otherwise the method ends.

Figure 11:
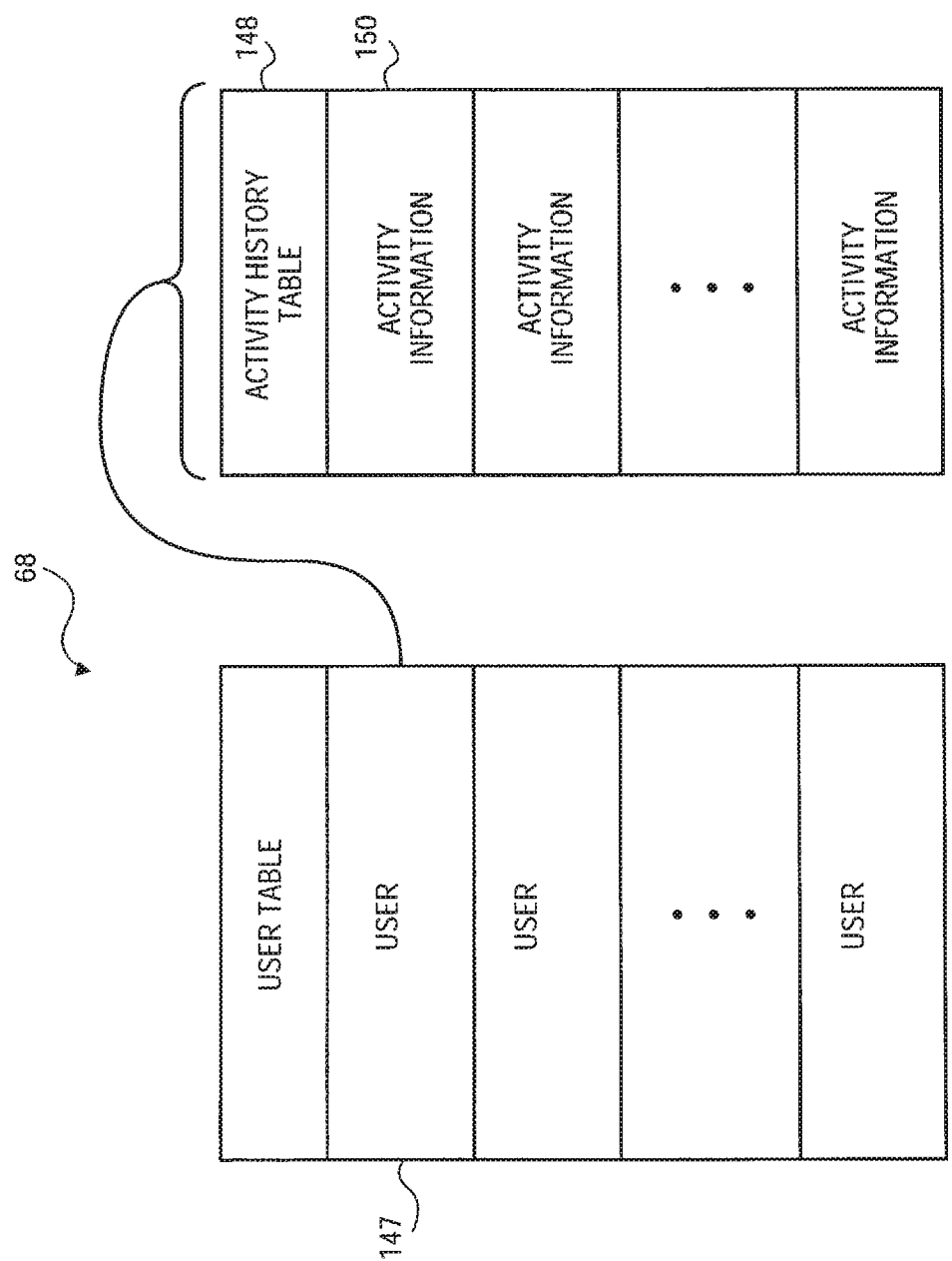
FIG. 11 illustrates an exemplary embodiment of a user table within a database maintained by the exemplary network-based marketplace.

At box 144, the detection module 62 records the activity in one or more entries in the user table 68 as illustrated in FIG. 11. The user table 68 includes a user entry 147 for each user in the system. Each user entry 147 also includes an activity history table 167 that may include multiple entries of activity information 150. Further, a set of index pointers (not illustrated) are maintained such that the most recent activity information 150 is maintained. Thus, the activity information 150 is entered into the activity history table 148 in a round robin fashion where the most recent entry overwrites the oldest entry, presuming the activity history table 148 is full. In the present embodiment the activity information 150 includes the bid confirmation variables 118 and the associated activity index 151; however, it will be appreciated that other embodiments may include additional or different information.

Returning to FIG. 16 and box 144, the detection module 62 utilizes the bid confirmation listing number 124 to identify the appropriate listing entry in the listings table 70 and extract the corresponding user identification index 182 (e.g., entry of the seller). The detection module 62 utilizes the user identification index 182 to write the bid confirmation variables 118 into the activity information 150 entry in the activity history table 148 associated with the seller. Further, the detection module 62 utilizes the bid confirmation unique identifier 121 to write the bid confirmation variables 118 into the activity history table 148 associated with the buyer. Finally, the detection module 62 invokes the award module 64 for the buyer and the seller.

It will be appreciated that for other activity the detection module 62 may update the activity history table 148 for a single user. For example, a seller creating a listing for an item or service would cause the detection module 62 to update activity information 150 only for the seller and not a buyer (e.g., no buyer yet).

At decision box 146, the award module 64 determines if an award should be awarded based on activity information 150 in the respective activity history table 148 for which it was invoked. In the present example the bid confirmation is the most recent activity entered into the activity history table 148. Thus the logic for bid confirmation is utilized to analyze the other entries in the table (e.g., activity that has chronologically preceded the bid confirmation). In the present example, no other activity has preceded the bid confirmation, therefore the award module 64 ends. Processing within decision box 158 is discussed in greater detail upon the detection of a second activity.

Figure 17:
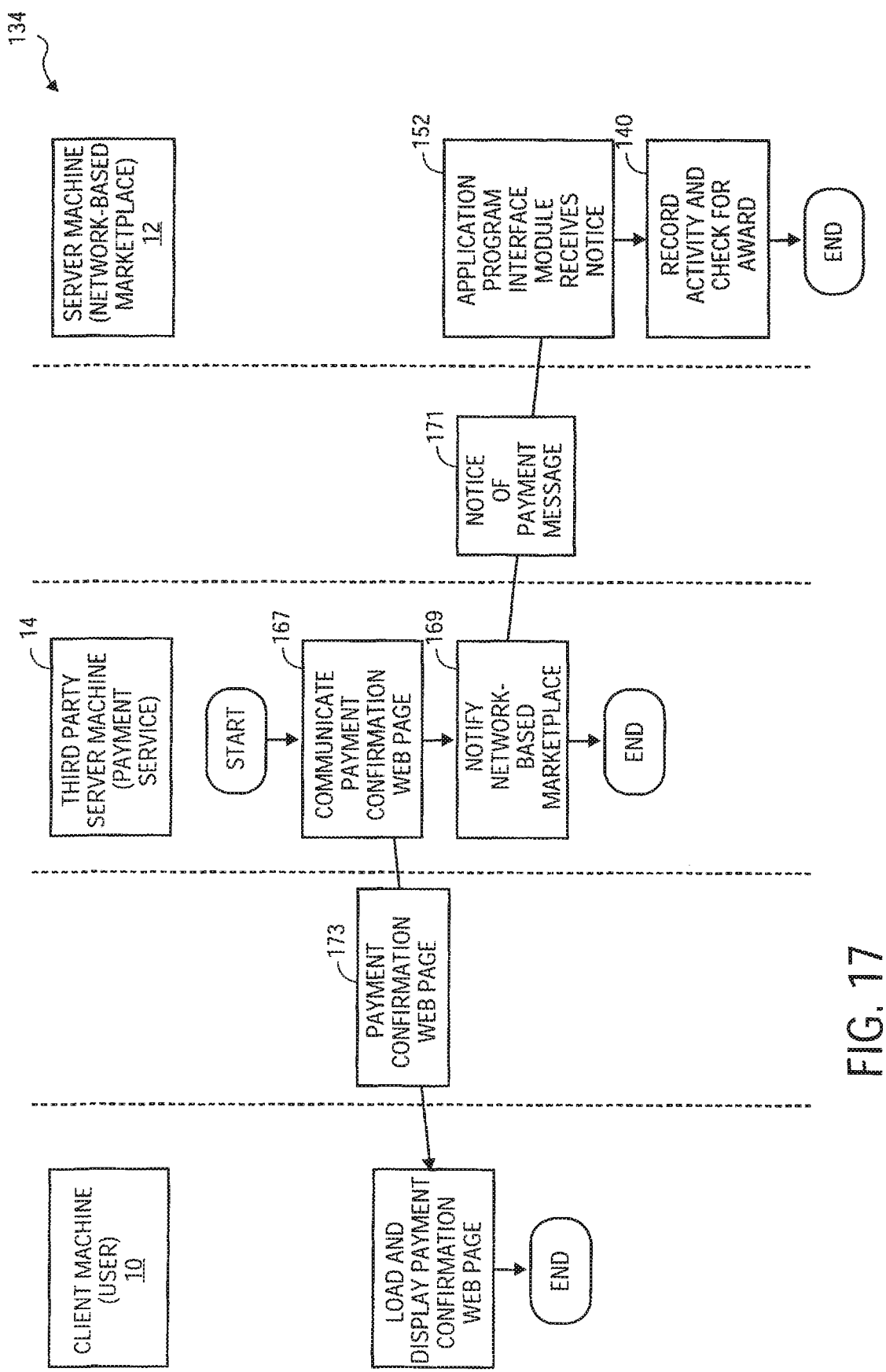
FIG. 17 is an interactive flow chart partially illustrating the method, according to an exemplary embodiment of the present invention, to incentivize a user to perform an activity relating to a network-based marketplace in a timely manner.

FIG. 17 is an interactive flow chart partially illustrating the method 134, according to an exemplary embodiment of the present invention, to incentivize a user to promptly perform an activity related to a network-based marketplace. Processing of two servers and a client are illustrated.

At box 167, the third party service machine 14 communicates a payment confirmation web page 149, as illustrated in FIG. 26, to the client machine 10. The payment confirmation web page 149 is received at the client machine 10 in response to the user utilizing the third party service machine 14 to pay for an item or service that was listed on the network-based marketplace machine 12. Merely for example, the third party service machine 14 may deploy a service embodied in the form of the PayPal online payment service, provided by Ebay Corporation of San Jose, Calif. The PayPal service enables a business or consumer with an email address to send and receive payments online.

Figure 12:
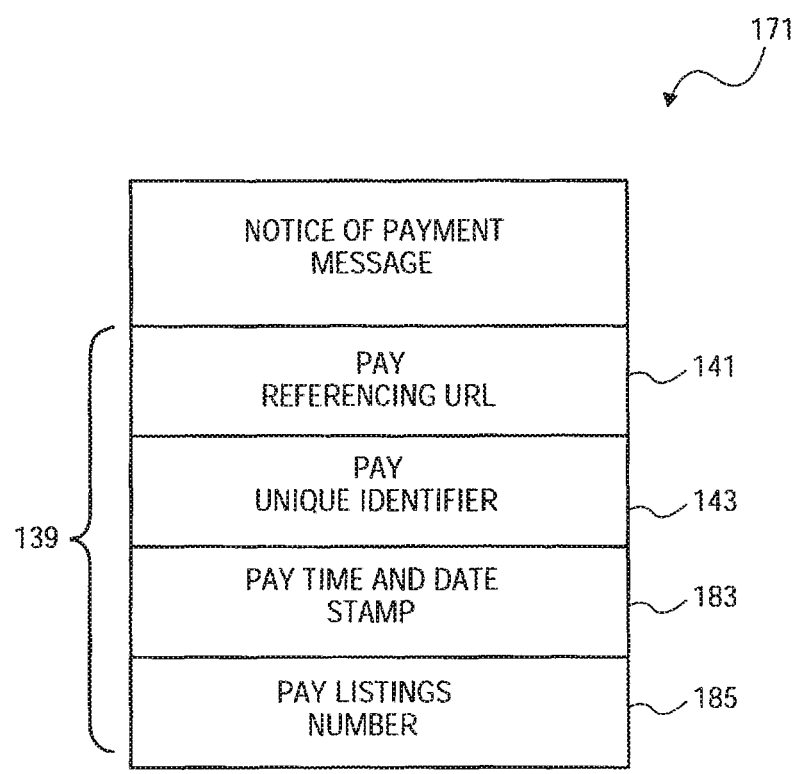
FIG. 12 illustrates an exemplary notice of payment message.

Returning to FIG. 17 at box 169, the third party service machine 14 communicates a notice of payment message 171 to the network-based marketplace machine 12. The notice of payment message 171 includes a set of payment confirmation variables 173 obtained from JavaScript variables that are included in the payment confirmation web page 149. FIG. 12 illustrates the payment confirmation variables 173 including a pay referencing URL 141 that identifies the payment confirmation web page 149 and is utilized by the network-based marketplace machine 12 to identify payment confirmation as an activity; a pay unique identifier 143 that is utilized by the network-based marketplace machine 12 to identify the user at the client machine 10; an exemplary reference time that chronicles the moment of payment confirmation in the form of a pay time and date stamp 183 and is utilized by the network-based marketplace machine 12 to compute an exemplary elapsed time; and a pay listing number 185 that is utilized by the network-based marketplace machine 12 to identify the listing associated with the payment confirmation.

Returning to FIG. 17 at box 152, an application program interface module 58 receives the notice of payment message 171, extracts the payment confirmation variables 173 and invokes the detection module 62.

At box 140, the payment confirmation activity is recorded and a determination is made regarding whether to award the user.

Returning to FIG. 16, at decision box 142 the detection module 62 determines if payment confirmation is an activity that should be recorded. The detection module 62 receives the notice of payment message 171 including the payment confirmation variables 173. The detection module 62 utilizes the pay referencing URL 141 to search the activity table 89 and to match the corresponding activity URL 145, thereby identifying payment confirmation as the activity to be recorded.

At box 144, the detection module 62 records the payment confirmation activity in the buyer and seller activity history tables 148 in the user table 68. In the present embodiment the activity information 150 in the activity history table 148 and is updated with the payment confirmation variables 173 included in the notice of payment message 171 and the associated activity index 151; however, other embodiments may include additional or different information. Finally, the detection module 62 invokes the award module 64 for the activity history table 148 associated with the buyer and the activity history table 148 associated with the seller.

At decision box 146 the award module 64 determines if an award should be awarded. In the present example the payment confirmation activity is the most recent entry in the activity history table 148. Thus the logic for the payment confirmation is utilized to analyze the other activity entries in the table (e.g., activity that has preceded the payment confirmation) to determine if an award should be awarded. It will be appreciated that each activity has unique logic to determine if an award should be awarded. In the present example, the logic executed upon detecting payment confirmation causes the award module 64 to search the activity history table 148 associated with the buyer for corresponding bid confirmation activity (e.g., the same listing number, the same unique identifier, etc.). Upon detecting corresponding bid confirmation activity the award module 64 computes an exemplary elapsed time by subtracting the bid confirmation time and date stamp 122 associated with the bid confirmation activity from the pay time and date stamp 183 associated with the payment confirmation activity. For example, the award module 64 may compute elapsed time in seconds, minutes, hours, days or any standard unit of time. Next, the award module 64 determines the award based on the elapsed time by utilizing an award table 90. FIG. 9 is a block diagram illustrating the award table 90, according to an exemplary embodiment of the present invention. The award table 90 is a two dimensional array indexed by the activity index 151. The activity index 151 for the first activity is used by the award module 64 to identify a first activity column 153 in the award table 90. The activity index 151 for the second activity is used by the award module 64 to identify a second activity row 155 in the award table 90. Each intersected first activity column 153 and second activity row 155 represents a first and second activity combination that is associated with a set of elapsed times 154 that correspond to a set of award values 156. In the present example, the set of elapsed times 154 (e.g., 0, 1 and 2 days) corresponds to award values 156 (e.g., 2, 1 and 0 online promotions). Thus, the award table 90, in the present example, is configured to award fewer online promotions in proportion to an increase in elapsed time (e.g., 2 virtual scratch card games are delivered to a user that submits payment on the same day of bid confirmation).

It will be appreciated that a set of elapsed times 154 and award values 156 may be configured for any combination of network-based marketplace activities including a first activity and second activity with the same activity index 151.

Returning to FIG. 16 and decision box 146, the award module 64 utilizes the award table 90 as described above to determine if the user has indeed won an award and also the value or quantity of the award.

At box 158, the award module 64 awards the user for promptly performing an activity. In the present example, the award value 156 corresponds to a quantity of online promotions in the form of virtual scratch card games. In other embodiments the award value may correspond to a discount percentage or a number of free listings or a percentage reduction in fees or any other benefit that may provide an incentive to the user.

The present embodiment illustrates a buyer that performs a first activity (e.g., a bid confirmation) and is awarded for promptly performing a second activity (e.g., submitting payment using a third party service). In another embodiment, the buyer may be awarded for using a third party service for payment; however, receiving an award could additionally require the buyer to utilize a bank account as a source of payment rather than a credit card account.

Further, it will be appreciated that first and second activities might be any two activities performed by any user in the network-based marketplace. For example, a buyer that purchases a first item may be awarded for promptly purchasing a second item (e.g., from the same or different seller; from the same or different category; utilizing the same or different purchasing method including auctions, purchasing, etc.). In another example, a seller might list a first item and be awarded for promptly listing a second item (in the same or different category; for approximately the same or different prices, etc.). Indeed any first user activity that is performed in a network-based marketplace might be rewarded for timely performing any second user activity that is performed in a network-based marketplace including a second activity that is the same type as the first.

It will also be appreciated that in other embodiments both the buyer and the seller may be awarded. Further, other embodiments may award the buyer and the seller for an activity performed by the seller and an activity performed by the buyer. Thus, the buyer and the seller are awarded for cooperating to complete the first activity and the second activity in a timely manner.

Figure 18:
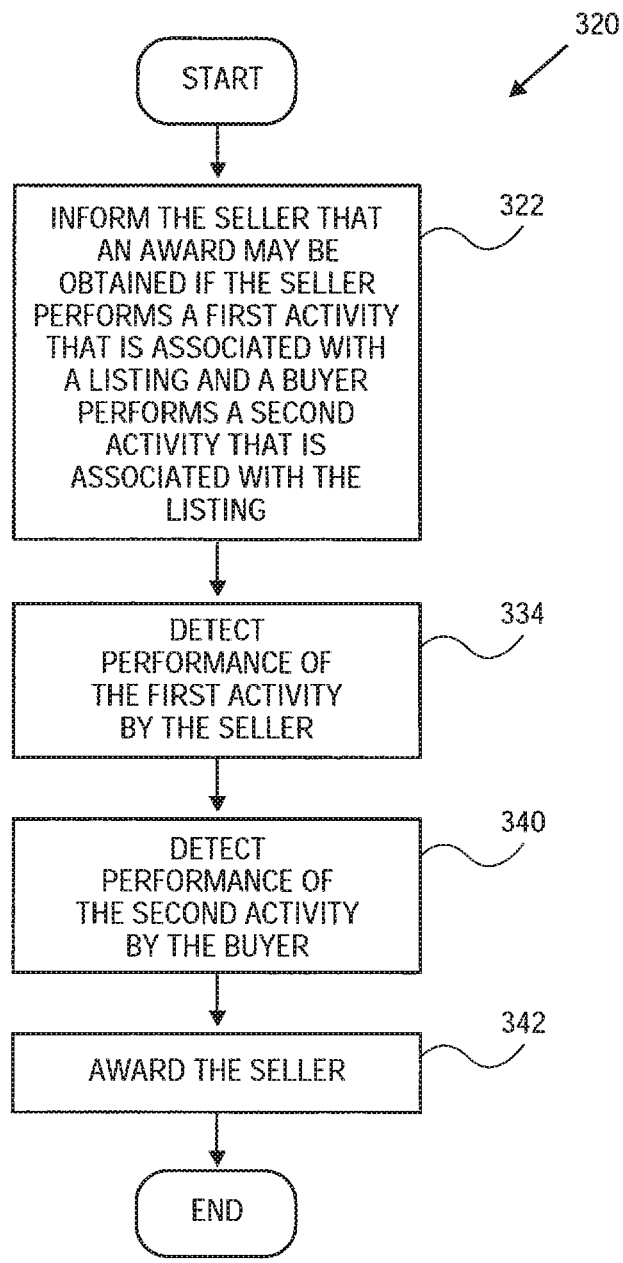
FIG. 18 is a flow chart illustrating a method, according to an exemplary embodiment of the present invention, to incentivize a seller to perform an activity relating to a network-based marketplace.
Figure 29:
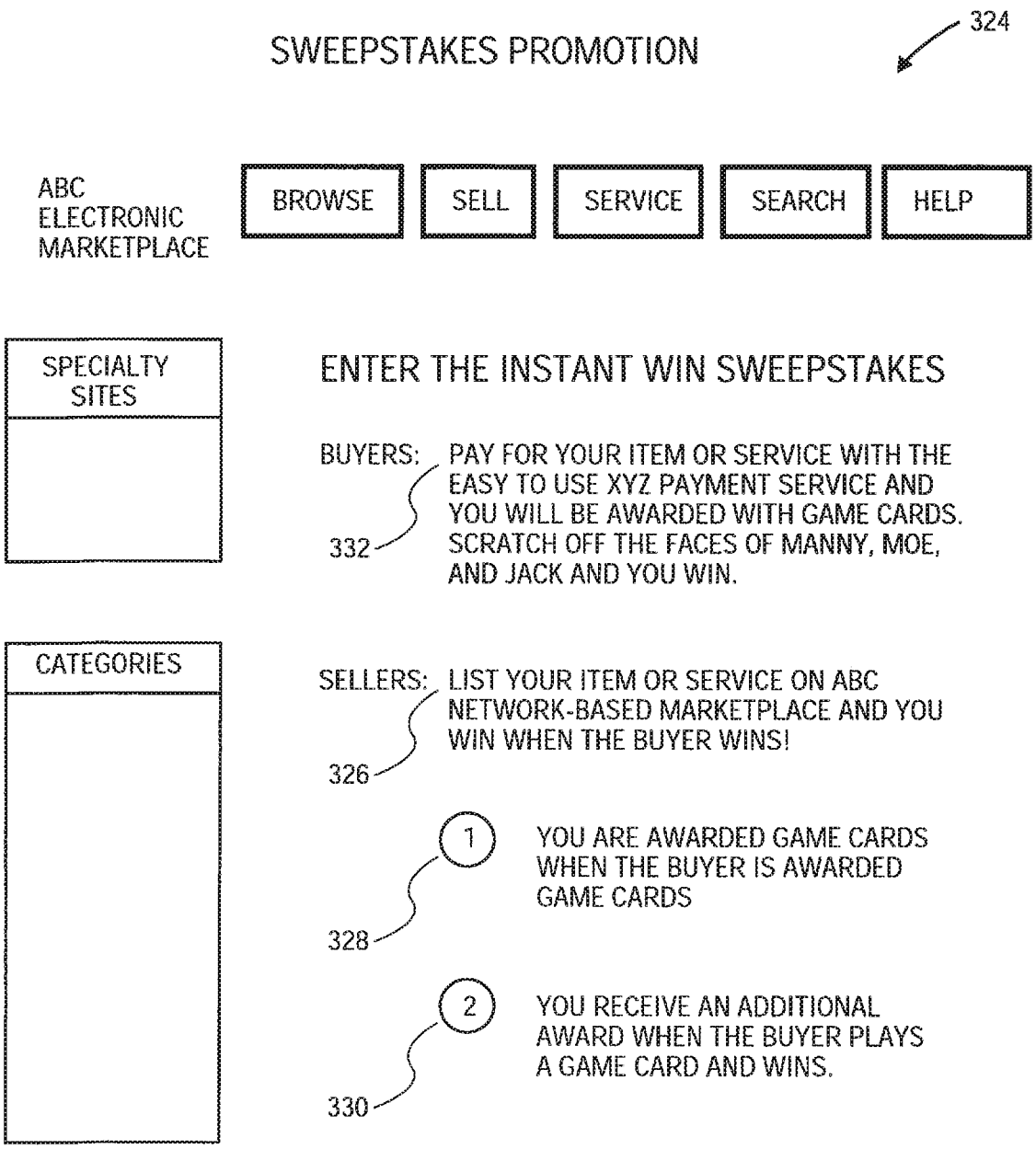

Method to Incentivize a Seller to Perform an Activity Relating to a Network-Based Marketplace Seller Enters Listing FIG. 18 is a flow chart illustrating a method 320, according to an exemplary embodiment of the present invention, to incentivize a seller to perform an activity relating to a network-based marketplace. At box 322, a listing module 60 on the network-based marketplace machine 12 informs a seller at client machine 10 that an award may be obtained. The listing module 60 informs the seller by communicating a user interface screen in the exemplary form of a sweepstakes promotion screen 324, as illustrated in FIG. 29. Specifically, the seller is informed, via a text 326, that by performing a first activity, in the exemplary form of entering a listing for an item or service on the ABC Network-based Marketplace, that a first activity award may be received when the buyer of the listed item or service wins an award in an Instant Win Instant Sweepstakes. Specifically, the seller is informed, via a text 328, that they will win a first activity award in the exemplary form of promotion game cards 125 when the buyer is awarded promotion game cards 125. FIG. 23 illustrates the promotion game card 125 in the form of a virtual scratch card game whereby the seller and/or buyer may win a prize by scratching out the squares covering the faces of Manny, Moe and Jack. Returning to FIG. 29, the seller is further informed, via a text 330, that the seller may win a first activity award if the buyer plays the promotion game card 125 and wins. The seller may win the first activity award in the exemplary form of sharing in the proceeds awarded to the buyer or by receiving an award independent of the proceeds of the buyer. Nevertheless, the text 328 and the text 330 indicate that the seller receives an award when the buyer receives an award.

The seller is further informed, via a text 332, of the activity that must be performed by the buyer to qualify the buyer to receive an award in the form of promotion game cards 125. The buyer may receive an award by paying for the item or service with the "XYZ Payment Service" as described by a text 332. It will be appreciated that other activities related to a network-based marketplace may also result in awarding the buyer the promotion game cards 125 (e.g., submitting the winning bid, paying for the item or service by identifying a bank account as a source of payment, etc.).

Figure 30:
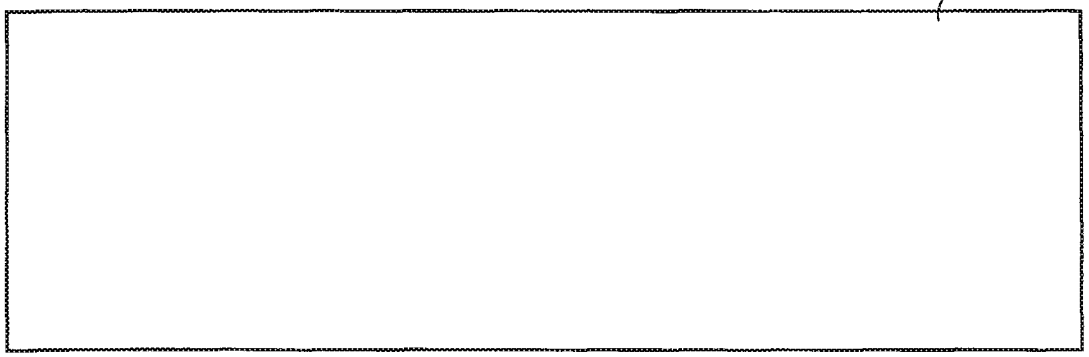

Returning to FIG. 18, at box 334, the seller receives a listing description form 336 that is utilized by the seller to enter a description of an item or a service that is listed on the network-based marketplace machine 12. FIG. 30 illustrates the listing description form 336, according to an exemplary embodiment of the present invention. The listing description form 336 includes a window 338 to enter a listing description. Returning to FIG. 18, the seller at the client machine 10 enters the listing description thus completing the listing description form 336, which is subsequently communicated to the network-based marketplace machine 12.

The listing module 60 at the network-based marketplace machine 12 receives the listing description form 336 and creates a listing description web page 339 that is stored in the listing information field 184 in the listings table 70. FIG. 31 illustrates the listing description web page 339 that describes a Book entitled "Fun with Ballet for Future Ballerina Dancers." Returning to FIG. 18, the listing module 60 writes the listing description webpage 339 to the listings table 70 and invokes the detection module 62.

Figure 8:
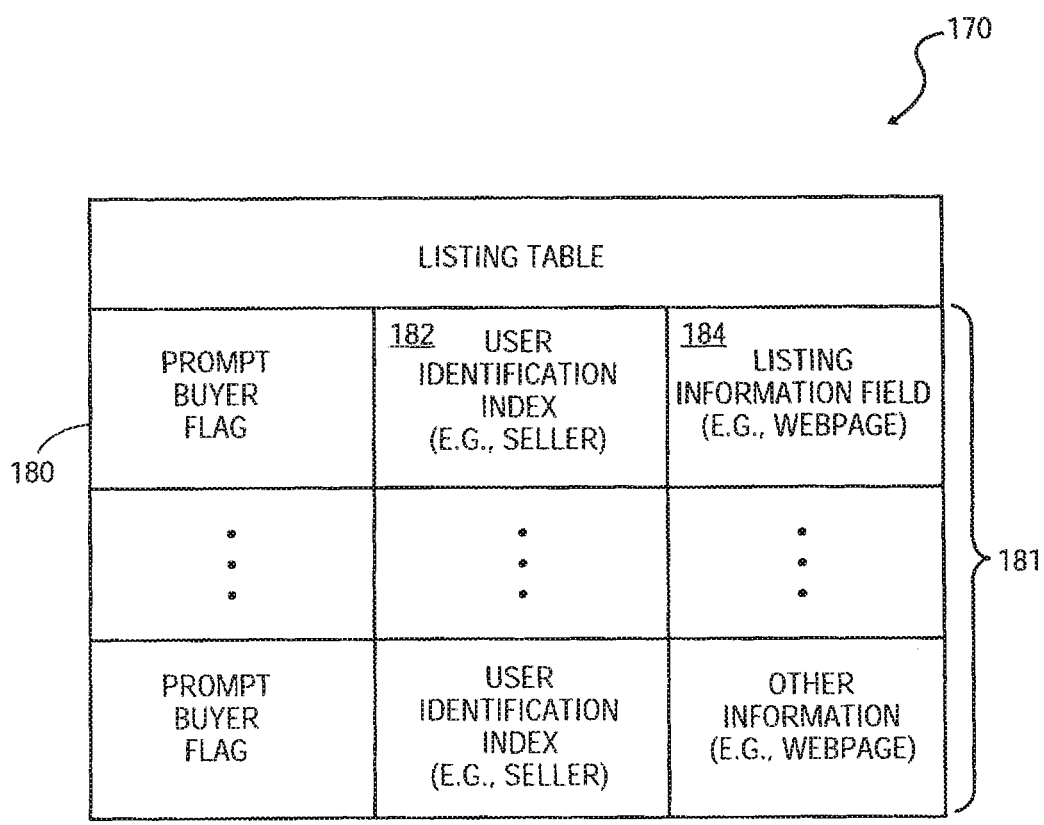
FIG. 8 illustrates an exemplary embodiment of a listing table within a database maintained by the exemplary network-based marketplace.

The detection module 62 updates the listing table 70. FIG. 8 illustrates the listing table 70, according to an exemplary embodiment of the present invention. The listing table 70 includes multiple listing entries that are accessed with a listing index 181. Among other fields, each listing entry includes a prompt buyer flag 180 that is not utilized in the present embodiment and described below. Further, each listing entry includes a user identification index 182 that is utilized to associate the listing entry to the seller that created the listing entry and a listing information field 184 that is utilized to store the listing description form 336, as previously described. Returning to FIG. 18, the detection module 62 ends after updating the user identification index 182.

At box 340, the detection module 62 detects that a buyer has paid for an item or service with the "Easy to use XYZ Payment Service." Further, by utilizing the payment service the buyer has become qualified to win promotion game cards 125. The detection module 62 detects the payment and the qualification to receive promotion game cards 125 by receiving a message from a third party service machine 14 (e.g., a promotional marketeer) that provides online gaming services to the network-based marketplace machine 12. A promotional marketeer interfaces with the network-based marketplace machine 12 to monitor, process and award user activity on the network-based marketplace machine 12. For example, online gaming services may be provided by Maritz® of Fenton, Mo. or Milepoint® of Minneapolis, Minn. or Fairmarket of Woburn, Mass. In an alternate embodiment, the online gaming services may be provided by the network-based marketplace machine 12.

The detection module 62 extracts the listing index 181 included in the message from the third party service machine 14 to access the listing table 70 and extract the user identification index 182 thereby identifying the seller. Finally, the detection module 62 ends after invoking the award module 64 with the user identification index 182.

At box 342, the award module 64 awards the seller for entering the listing on the network-based marketplace machine 12. The award module 64 communicates a message to the third party service machine 14 (e.g. promotional marketeer) that includes the user identification index 182 and triggers the third party service machine 14 to award promotion game cards 125 to the seller identified by the user identification index 182. Other embodiments may award the seller with discounted fees, a free listing, a prize or any other benefit that might provide an incentive to the seller.

In yet another embodiment of the present invention the buyer may perform the second activity by winning proceeds from an online promotion. For example, a promotional marketer may communicate to the network-based marketplace machine 12 that the buyer has been awarded proceeds by scratching off the faces of Manny, Moe and Jack on a virtual scratch card (e.g., promotion game card 125). In this embodiment the associated seller may also receive an award. The seller may receive a percentage of the buyer's proceeds or receive an award in addition to the buyer's proceeds.

In yet another embodiment, the seller may be awarded when the buyer uses a third party service to pay for the service or item and uses a bank account as a source of payment rather than a credit card account.

Seller Elects to Promote

Figure 19:
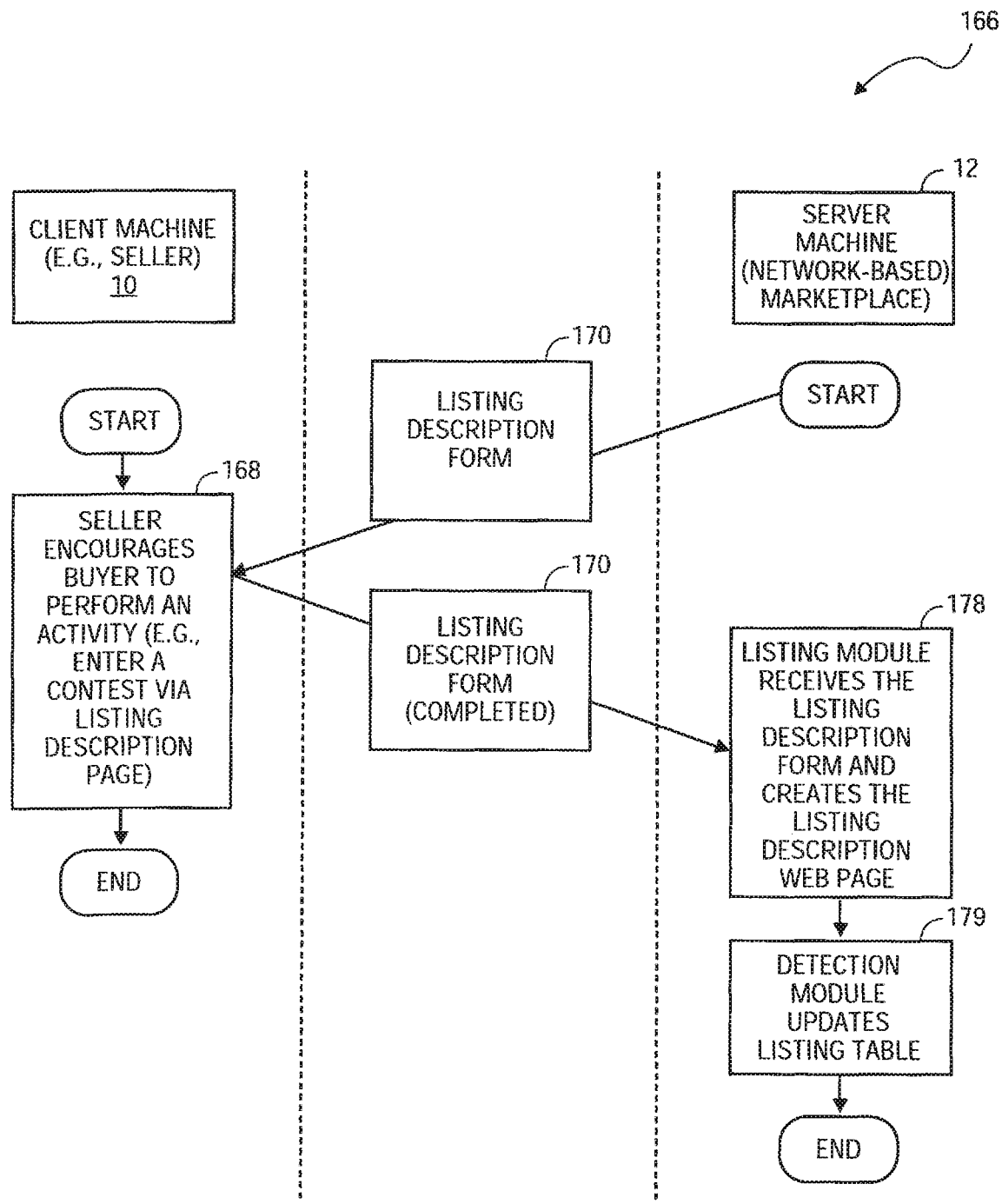
FIG. 19 is an interactive flow chart partially illustrating a method, according to an exemplary embodiment of the present invention, to incentivize a seller to perform an activity relating to a network-based marketplace.

FIG. 19 is an interactive flow chart partially illustrating a method 166, according to an exemplary embodiment of the present invention, to incentivize a seller to perform an activity relating to a network-based marketplace 8. Client and server operations are illustrated.

Figure 27:
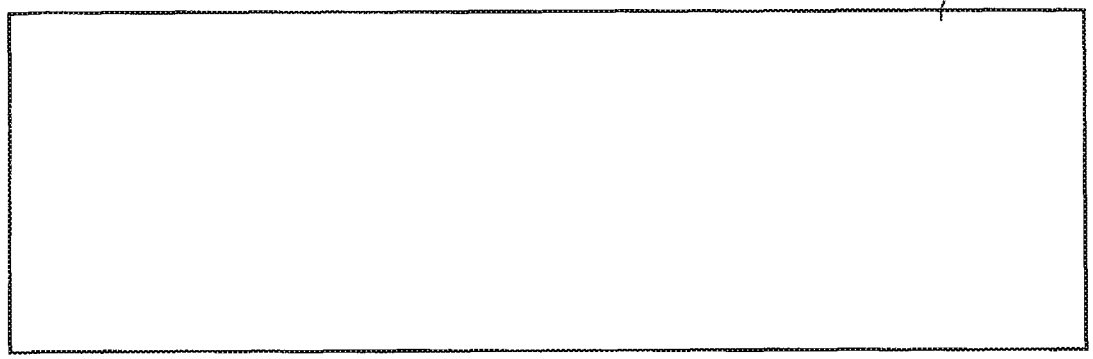

At box 168, the seller receives a listing description form 170 that is utilized by the seller to enter a description of an item or service that is listed on the network-based marketplace machine 12. FIG. 27 illustrates the listing description form 170, according to an exemplary embodiment of the present invention. The listing description form 170 includes a window 172 to enter a listing description; a message 174 informing the seller of an award that may be obtained in the form of the promotion game card 125 for performing a first activity in the exemplary form of prompting a potential buyer to use the XYZ Payment Service to pay for the seller's item; and an election box 176 enabling the seller to elect to encourage the buyer to use the XYZ Payment Service for payment. Returning to FIG. 19 and box 168, the seller at the client machine 10 enters the listing description and elects to encourage the buyer to use the XYZ payment service by marking the election box 176 thus completing the listing description form 170, which is subsequently communicated to the network-based marketplace machine 12.

At box 178, the listing module 60 at the network-based marketplace machine 12 receives the listing description form 170 and creates a listing description web page 186 that is stored in the listing information field 184 in the listings table 70. In the present embodiment, the listing module 60 inserts a text string into the listing description web page 186 upon detecting an affirmative election recorded by user at the client machine 10 in the election box 176. FIG. 28 illustrates the listing description web page 186 that describes a Book entitled "Fun with Ballet for Future Ballerina Dancers" and encourages the potential buyer to "Try the easy use XYZ Payment Service to pay for this item". Other embodiments may encourage to the potential buyer by inserting a graphic, an illustration, a streaming video, an audio recording or any other media form capable of prompting the buyer to perform an activity. Note that the seller has exclusive control over the appearance of the listing, as illustrated by the listing description web page 186, and that encouragement to use the XYZ Payment Service will not appear without the seller's permission. Thus, the network-based marketplace machine 12 enlists the advertising support of the seller by offering an incentive in the form of one or more promotion game cards 125.

Returning to FIG. 19, the listing module 60 writes the listing description web page 186 to the listings table 70 and invokes the detection module 62.

At box 179, the detection module 62 updates the listing table 70. Each listing entry includes a prompt buyer flag 180 that is utilized to record the seller's election as recorded by the election box 176. The detection module 62 ends after copying the election as recorded in the election box 176 into the prompt buyer flag 180 and updating the user identification index 182.

Figure 20:
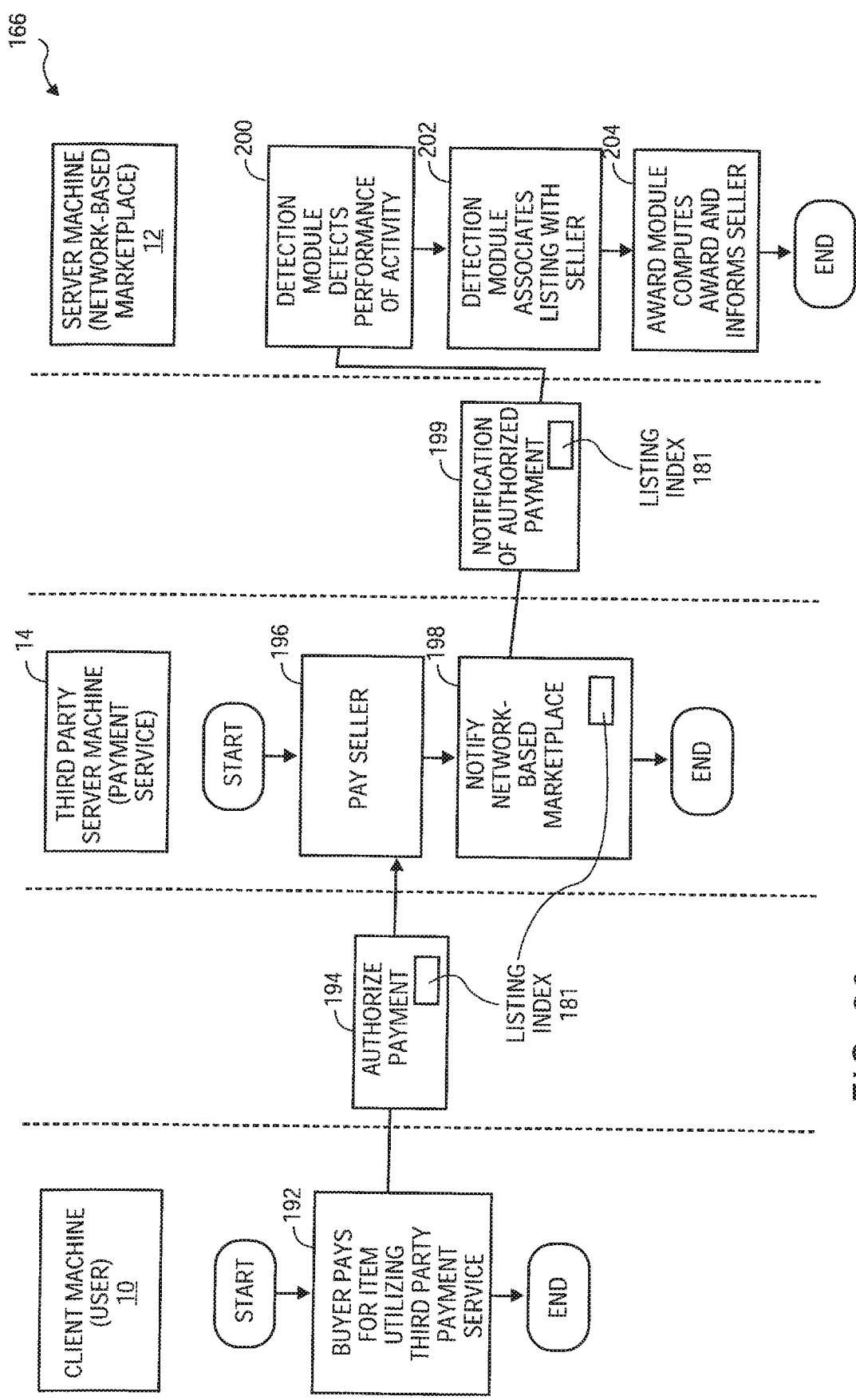
FIG. 20 is an interactive flow chart partially illustrating the method, according to an exemplary embodiment of the present invention, to incentivize a seller to perform an activity relating to a network-based marketplace.

FIG. 20 is an interactive flow chart partially illustrating the method 166, according to an exemplary embodiment of the present invention, to incentivize a seller to perform an activity relating to a network-based marketplace 8. Client and server operations are illustrated.

At box 192, the buyer performs an exemplary second activity by paying for the item or service with a third party service. The buyer may enter the third party service by selecting a third party service button which appears on one of the web pages provided by the network based marketplace machine 12. A buyer that has not previously joined the third party service may do so by utilizing a graphical representation and reference describing how to join the service. Once the buyer has joined the service, the buyer may pay for the item or service by using the third party service machine 14.

The client machine 10 communicates an authorization of payment 194 that includes the listing index 181 and other information, to the third party service machine 14. It will be appreciated that the buyer may acquire the item service from the seller in different ways. In one embodiment the buyer may submit a winning bid in an auction. In another embodiment the buyer may purchase the item from the seller.

At box 196, the third party service machine 14 receives and processes the authorization of payment 194 by debiting the account of the buyer and crediting the account of the seller.

At box 198, the third party service machine 14 communicates a notification of authorized payment 199 to the network-based marketplace machine 12. The notification of authorized payment 199 includes the listing index 181 in addition to other information.

At box 200, the detection module 62 detects the notification of authorization of payment 199 associated with the listing index 181.

At box 202, the detection module 62 associates the notification of authorization of payment 199 with a seller by utilizing the listing index 181 to extract the user identification index 182 of the seller from the listing table 70. Further, the detection module 62 invokes the award module 64 upon identifying an asserted prompt buyer flag 180 in the listing table 70.

At box 204, the award module 64 awards the seller for encouraging the buyer to pay for the item or service with the XYZ Payment Service. In the present example, the seller is awarded the opportunity to win a prize by receiving a promotion game card 125 in the form of a virtual scratch card game as illustrated in FIG. 23. Further, in the present embodiment, the award module 64 delivers the award to the seller by communicating a message to the third party service machine 14 (e.g., promotional marketeer).

In another embodiment the award module 64 may count the number of successful referrals to the third party service made by the seller and award the seller proportionately. For example, the seller may receive three promotion game cards 125 in response to a third buyer using the XYZ Payment Service where each buyer (e.g., first, second and third) has been encouraged by the seller to use the XYZ Payment Service and has used the XYZ Payment Service. Still other embodiments may reward the seller in forms other than the promotion game card 125 (e.g., cash back, fee discounts, free listings, or any benefit which may provide an incentive to the seller).

Other embodiments may award the seller from the network-based marketplace machine 12 (e.g., award the seller with discounted fees, a free listing, or any other benefit that might provide an incentive to the seller).

Figure 21:
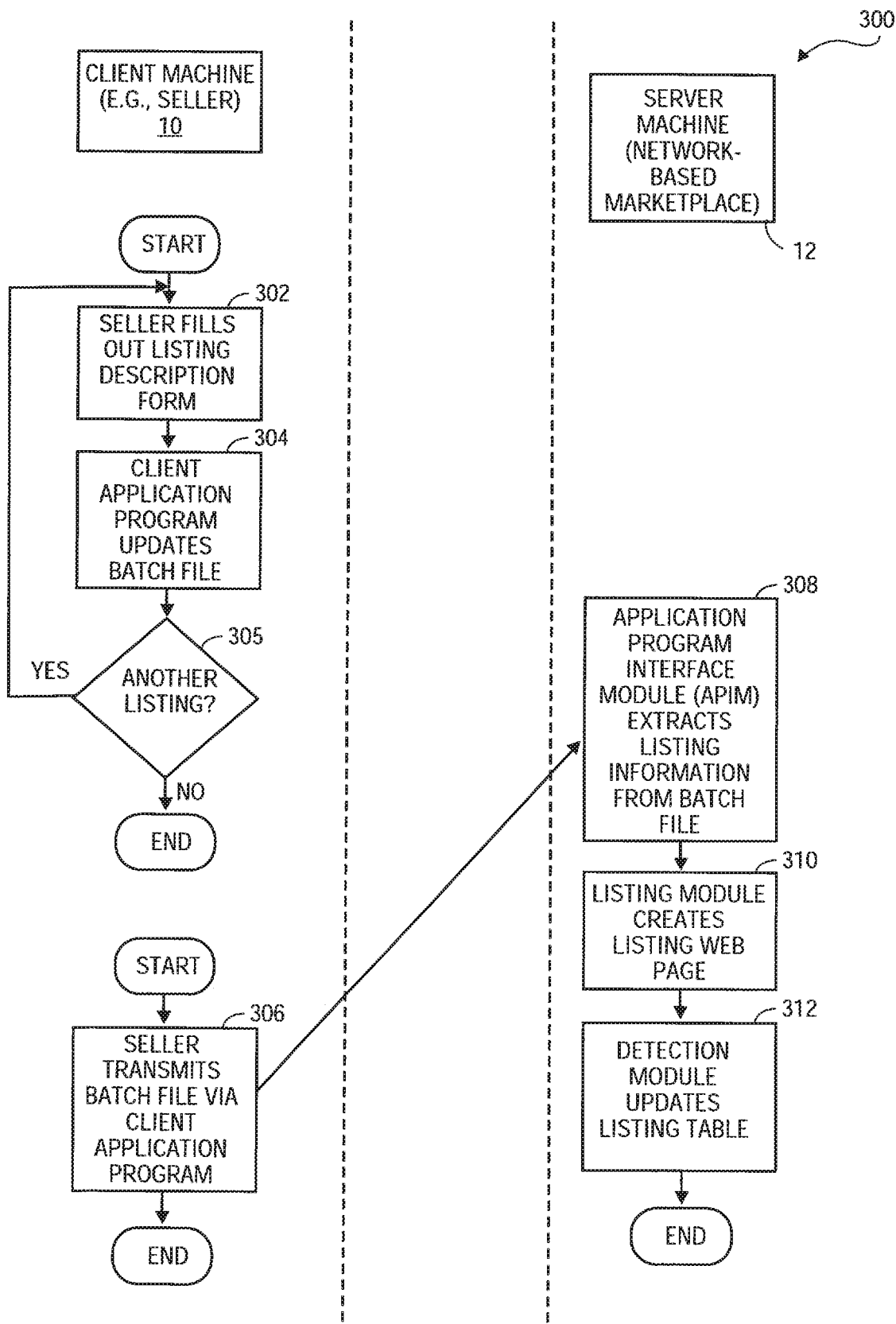
FIG. 21 is an interactive flow chart illustrating a method, according to an exemplary embodiment of the present invention, to collect seller configured incentives relating to a network-based marketplace.

FIG. 21 is an interactive flow chart illustrating a method 300, according to an exemplary embodiment of the present invention, to collect seller configured incentives for a network-based marketplace 10. Client processing is illustrated on the left and server processing is illustrated on the right. The method 300 enables a user to input large quantities of item or service listings and elect to prompt the prospective buyer to perform an activity thus reducing interactions with the network-based marketplace machine 12. The method 300 may be embodied as the client application program 22 executing on the client machine 10 or the mobile client machine 18.

At box 302, the seller inputs an item or service listing description including an election to encourage the potential buyer to perform an activity via the listing description form 170. As previously described the listing description form 170 includes the window 172 to enter a listing description, the message 174 that informs the seller of an opportunity to receive a game card for encouraging a potential buyer to use the XYZ third party payment service and the election box 176 that enables the seller to elect to encourage the buyer to use the XYZ third party payment service.

The client application program 22 receives the listing description form 170 via a communications component 56 and communicates the listing description form 170 to a logic component 54.

At box 304, the logic component 54 of the client application program 22 updates a batch file in a storage component 26 on the client machine 10 with the contents of the listing description form 170 including the contents of the window 172 and the election box 176.

At decision box 305, the logic component 54 of the client application program 22 ends upon determining that the seller does not wish to complete another listing description form 170. Otherwise the logic component 54 branches to box 302.

At box 306, the seller transmits the batch file via the client application program 22. The communications component 56 receives the request to transmit the batch file from the seller and invokes the logic component 54. The logic component 54 reads the batch file from the storage component 26 and communicates the batch file to an application program interface module (APIM) 58 at the network-based marketplace machine 12.

At box 308, on the server side, the APIM 58 receives the batch file, extracts the listing information from the batch file and invokes the listing module 60 for each listing description form 170.

At box 310, the listing module 60 creates a listing description web page 186 for each listing description form 170 and stores the newly created listing description web page 186 in the listings table 70. In the present embodiment, the listing module 60 inserts a text string into the listing description page upon detecting an affirmative election recorded by user at the client machine 10 in the election box 176. FIG. 28 illustrates the listing description web page 186 as previously described. Other embodiments may encourage the potential buyer by inserting a graphic, an illustration, a streaming video, an audio recording or any other media form capable of communicating a message to the potential buyer. Returning to FIG. 21, the listing module 60 writes the newly created listing description web page 186 to the listings table 70 and invokes the detection module 62.

At box 312, the detection module 62 copies the election as recorded in the election box 176 into the prompt buyer field 174 of the listing table 70 and ends.

Figure 32:
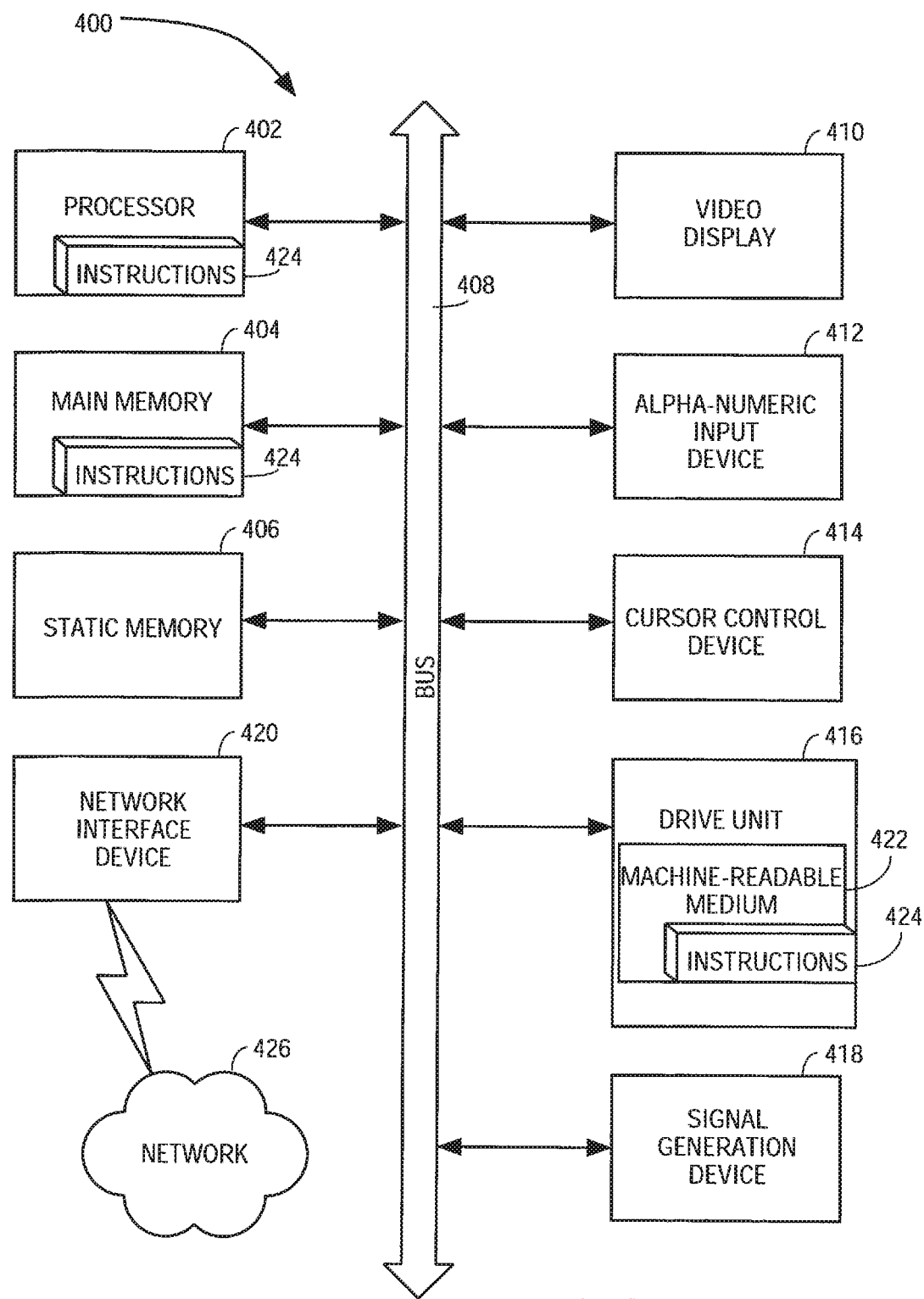
FIG. 32 illustrates a diagrammatic representation of a machine in the exemplary form of a computer system.

FIG. 32 shows a diagrammatic representation of a machine in the exemplary form of a computer system 400 within which a set of instructions, for causing the machine to perform any one or more of the methodologies discussed herein, may be executed. In alternative embodiments, the machine operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processor 402 (e.g., a central processing unit (CPU) a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alpha-numeric input device 412 (e.g., a keyboard), a cursor control device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions (e.g., software 424) embodying any one or more of the methodologies or functions described herein. The software 424 may also reside, completely or at least partially, within the main memory 404 and/or within the processor 402 during execution thereof by the computer system 400, the main memory 404 and the processor 402 also constituting machine-readable media.

The software 424 may further be transmitted or received over a network 426 via the network interface device 420.

While the machine-readable medium 492 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to included, but not be limited to, solid-state memories, optical and magnetic media, and carrier wave signals.

Thus, methods and systems to facilitate online promotions in a network-bases marketplace have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A method to facilitate an online sales promotion in a network-based marketplace, the method comprising:
    transmitting, by a network-based marketplace machine, a web page to a client machine, the web page comprising a promotion screen element;
    generating, by the network-based marketplace machine, an opt-in web page, the opt-in web page comprising a user-provided election to opt-in to the online sales promotion based on the promotion screen element;
    transmitting the opt-in web page to the client machine;
    receiving, from the client machine, the user-provided election to opt-in to the online sales promotion from the generated opt-in web page;
    in response to receiving the user-provided election to opt-in, generating, by the network-based marketing machine, a bid web page, the bid web page comprising a script, a one-by-one invisible pixel that directs a cookie component and at least one active referencing URL, the at least one active referencing URL being associated with online sales promotion and bid information from the network-based marketplace machine, the cookie component comprising the user-provided election to opt-in to the online sales promotion;
    responsive to determining that the cookie component includes the user-provided election to opt-in, executing the script and the one-by-one visible pixel in the bid web page to verify the user-provided election and generating a promotion game card associated with the online sales promotion;
    receiving, by the client machine, the generated bid web page comprising the script, the one-by-one invisible pixel, and the at least one active referencing URL; and
    presenting, by the client machine, after a bid is submitted by user, an award of the online sales promotion to the user and a non-visible pop-up window comprising the promotion screen element based on the one-by-one invisible pixel directions; and
    updating the non-visible pop-up window with the promotion game card, the promotion game card comprising virtual graphical elements associated with the online sales promotion, thereby causing the non-visible pop-up window to be visible.

2. The method of claim 1, wherein the presenting is based on activities performed by the user in the network-based marketplace, as recorded in an activity history table.

3. The method of claim 1, wherein the presenting is based on submission of a listing bid by the user.

4. The method of claim 1, wherein the presenting comprises providing the user with a number of awards, wherein at least one of the number of awards and a value of the awards is based on how little time elapses between a purchase by the user and a payment by the user for the purchase.

5. The method of claim 1, wherein a value of the award corresponds to at least one of a price discount percentage, a number of free listings, a percentage reduction in fees, and a cash prize.

6. The method of claim 1, further comprising presenting an additional award to the user for promptly making a future purchase.

7. The method of claim 1, further comprising providing a second award to a particular seller who posts a listing on the network-based marketplace upon promptly posting an additional listing.

8. The method of claim 1, further comprising:
    informing the sellers, by the network-based marketplace, that a second award will be provided to a particular seller if that particular seller performs a first activity associated with a particular listing and the user performs a second activity associated with the particular listing;
    detecting performance of the first activity by the particular seller;
    detecting performance of the second activity by the user; and
    providing the second award to the particular seller.

9. The method of claim 8, wherein the second award has a value based on a percentage of the award presented to the user.

10. The method of claim 8, wherein the second activity comprises using at least one of a particular payment service and a particular funding source to pay for a purchase.

11. A system to facilitate an online sales promotion in a network-based marketplace, the system comprising:
    a network-based marketplace machine including a listing server configured to perform operations comprising:
    transmitting a web page to a client machine, the web page comprising a promotion screen element;
    generating an opt-in web page, the opt-in web page comprising a user-provided election to opt-in to the online sales promotion based on the promotion screen element;
    transmitting the opt-in web page to the client machine;
    receiving, from the client machine, the user-provided election to opt-in to the online sales promotion from the generated opt-in web page;
    in response to receiving the user-provided election to opt-in, generating, by the network-based marketing machine, a bid web page, the bid web page comprising a script, a one-by-one invisible pixel that directs a cookie component, and at least one active referencing URL, the at least one active referencing URL being associated with online sales promotion and bid information from the network-based marketplace machine, the cookie component comprising the user-provided election to opt-in to the online sales promotion;

responsive to determining that the cookie component includes the user-provided election to opt-in, executing the script and the one-by-one visible pixel in the bid web page to verify the user-provided election and generating a promotion game card associated with the online sales promotion;

receiving, by the client machine, the generated bid web page comprising the script, the one-by-one invisible pixel, and the at least one active referencing URL;

presenting, by the client machine, after a bid is submitted by user, an award of the online sales promotion to the user and a non-visible pop-up window comprising the promotion screen element based on the one-by-one invisible pixel directions; and updating the non-visible pop-up window with the promotion game card, the promotion game card comprising virtual graphical elements associated with the online sales promotion, thereby causing the non-visible pop-up window to be visible.

12. A non-transitory machine-readable medium storing a set of instructions that, when executed by a cent machine and a network-based marketplace server machine, cause the client machine and the network-based marketplace server machine to perform operations comprising:

transmitting, by a network-based marketplace machine, a web page to a client machine, the web page comprising a promotion screen element;

generating, by the network-based marketplace machine, an opt-in web page, the opt-in web page comprising a user-provided election to opt-in to the online sales promotion based on the promotion screen element;

transmitting, the opt-in web page to the client machine;

receiving a user-provided election to opt-in to the online sales promotion from the generated opt-in web page;

in response to receiving the user-provided election to opt-in, generating, by the network-based marketing machine, a bid web page, the bid web page comprising a script, a one-by-one invisible pixel that directs a cookie component, and at least one active referencing URL, the at least one active referencing URL being associated with online sales promotion and bid information from the network-based marketplace machine, the cookie component comprising the user-provided election to opt-in to the online sales promotion;

responsive to determining that the cookie component includes the user-provided election to opt-in, executing the script and the one-by-one visible pixel in the bid web page to verify the user-provided election and generating a promotion game card associated with the online sales promotion;

receiving, by the client machine, the generated bid web page comprising the script, the one-by-one invisible pixel, and the at least one active referencing URL;

presenting, by the client machine, after a bid is submitted by user, an award of the online sales promotion to the user and a non-visible pop-up window comprising the promotion screen element based on the one-by-one invisible pixel directions; and updating the non-visible pop-up window with the promotion game card, the promotion game card comprising virtual graphical elements associated with the online sales promotion, thereby causing the non-visible pop-up window to be visible.

13. The computer-readable medium of claim 12, wherein the presenting is based on activities performed by the user in the network-based marketplace, as recorded in an activity history table.

14. The computer-readable medium of claim 12, wherein the presenting is based on submission of a listing bid by the user.

15. The computer-readable medium of claim 12, wherein the presenting comprises providing the user with a number of awards, wherein at least one of the number of awards and a value of the awards is based on how little time elapses between a purchase by the user and a payment by the user for the purchase.

16. The computer-readable medium of claim 12, wherein a value of the award corresponds to at least one of a price discount percentage, a number of free listings, a percentage reduction in fees, and a cash prize.

17. The computer-readable medium of claim 12, the operations further comprising presenting an additional award to the user for promptly making a future purchase.

18. The computer-readable medium of claim 12, the operations further comprising providing a second award to a particular seller who posts a listing on the network-based marketplace upon promptly posting an additional listing.

19. The computer-readable medium of claim 12, the operations further comprising:

informing the sellers, by the network-based marketplace, that a second award will be provided to a particular seller if that particular seller performs a first activity associated with a particular listing and the user performs a second activity associated with the particular listing;

detecting performance of the first activity by the particular seller;

detecting performance of the second activity by the user; and providing the second award to the particular seller.

20. The computer-readable medium of claim 19 wherein the second activity comprises using at least one of a particular payment service and a particular funding source to pay for a purchase.

* * * * *